US006991722B2

(12) United States Patent
  Max

(10) Patent No.: US 6,991,722 B2
(45) Date of Patent: Jan. 31, 2006

(54) HYDRATE DESALINATION FOR WATER PURIFICATION

(75) Inventor: Michael D. Max, Washington, DC (US)

(73) Assignee: Marine Desalination Systems, L.L.C., Washington, DC (US)

(*) Notice: Subject to any disclaimer, the term of this patent is extended or adjusted under 35 U.S.C. 154(b) by 104 days.

(21) Appl. No.: 10/686,743

(22) Filed: Oct. 17, 2003

(65) Prior Publication Data

US 2005/0082214 A1    Apr. 21, 2005

Related U.S. Application Data

(62) Division of application No. 09/941,545, filed on Aug. 30, 2001, now Pat. No. 6,767,471.

(60) Provisional application No. 60/230,790, filed on Sep. 7, 2000, provisional application No. 60/240,986, filed on Oct. 18, 2000.

(51) Int. Cl.
  *B01D 33/70* (2006.01)
(52) U.S. Cl. .................... 210/150; 210/151; 210/220
(58) Field of Classification Search ........ 210/150–151, 210/220
  See application file for complete search history.

(56) References Cited

U.S. PATENT DOCUMENTS

| 135,001 | A | 1/1873 | Meylert |
|---|---|---|---|
| 2,904,511 | A | 9/1959 | Donath |
| 2,974,102 | A | 3/1961 | Williams |
| 3,027,320 | A | 3/1962 | Buchanan |
| 3,119,771 | A | 1/1964 | Cottle |
| 3,119,772 | A | 1/1964 | Hess et al. |
| 3,126,334 | A | 3/1964 | Harlow |
| 3,132,096 | A | 5/1964 | Walton |
| 3,148,143 | A | 9/1964 | Donath |
| 3,155,610 | A | 11/1964 | Williams |
| 3,171,727 | A | 3/1965 | Brown et al. |
| 3,214,371 | A | 10/1965 | Tuwiner |
| 3,217,505 | A | 11/1965 | Tuwiner |

(Continued)

FOREIGN PATENT DOCUMENTS

GB    1 320 134 GB    6/1973

(Continued)

OTHER PUBLICATIONS

EPO—Patent Abstracts of Japan, Publication No. 61136481, Publication date Jun. 24, 1986, Muneschichi, Concentration of Aqueous Solution English language abstract.

(Continued)

*Primary Examiner*—Chester T. Barry
(74) *Attorney, Agent, or Firm*—Kenneth M. Fagin, Esq.

(57) ABSTRACT

An apparatus is disclosed which allows the hydrate formed in the hydrate formation region of a desalination fractionation apparatus to be cooled as it rises in the apparatus. This has the beneficial effect of increasing its stability at lower pressures and reducing the depth at which the hydrate will begin to dissociate. The present invention provides for more efficient management of the distribution of thermal energy within the apparatus as a whole by controlling the flow of water through the system—particularly residual fluids remaining after hydrate forms—such that it is substantially downward through the fractionation column and out through a lower portion thereof. Hydrate thus separates from the residual fluid at or nearly at the point of formation, which helps keep the hydrate formation region of the apparatus at a temperature suitable for the formation of hydrate and improves efficiency. Hydrate formation may be enhanced, thereby further improving efficiency, by pre-treating the water-to-be-treated so as to dissolve hydrate-forming gas in it, before further hydrate-forming gas is injected into the water-to-be-treated under conditions conducive to the formation of gas hydrate.

3 Claims, 29 Drawing Sheets

U.S. PATENT DOCUMENTS

| | | |
|---|---|---|
| 3,243,966 A | 4/1966 | Glew |
| 3,308,063 A | 3/1967 | Hess et al. |
| 3,350,299 A | 10/1967 | Hess et al. |
| 3,350,300 A | 10/1967 | Hess et al. |
| 3,371,035 A | 2/1968 | Jacobs et al. |
| 3,675,436 A | 7/1972 | Ganiaris |
| 3,712,075 A | 1/1973 | Smith et al. |
| 3,813,892 A | 6/1974 | Johnson |
| 3,856,492 A | 12/1974 | Klass |
| 3,892,103 A | 7/1975 | Antonelli |
| 3,983,032 A | 9/1976 | Hess et al. |
| 3,992,170 A | 11/1976 | Karnofsky |
| 4,170,328 A | 10/1979 | Kirk et al. |
| 4,207,351 A | 6/1980 | Davies |
| 4,267,022 A | 5/1981 | Pitcher ...................... 203/100 |
| 4,272,383 A | 6/1981 | McGrew |
| 4,278,645 A | 7/1981 | Filss |
| 4,376,462 A | 3/1983 | Elliott et al. ................ 166/267 |
| 4,392,959 A | 7/1983 | Coillet |
| 4,424,858 A | 1/1984 | Elliott et al. .................. 166/52 |
| 4,643,832 A | 2/1987 | Iniotakis et al. |
| 4,652,375 A | 3/1987 | Heilweil et al. |
| 4,670,159 A | 6/1987 | Garrett et al. |
| 4,678,583 A | 7/1987 | Wilson, III et al. |
| 4,686,833 A | 8/1987 | Hino et al. |
| 4,696,338 A | 9/1987 | Jensen et al. |
| 4,718,242 A | 1/1988 | Yamauchi et al. |
| 4,767,527 A | 8/1988 | Iniotakis et al. |
| 4,821,794 A | 4/1989 | Tsai et al. |
| 5,037,555 A | 8/1991 | Pasternak et al. |
| 5,055,178 A | 10/1991 | Sugier et al. |
| 5,076,934 A | 12/1991 | Fenton |
| 5,110,479 A | 5/1992 | Frommer et al. |
| 5,128,042 A | 7/1992 | Fenton |
| 5,159,971 A | 11/1992 | Li |
| 5,167,838 A | 12/1992 | Wilensky |
| 5,304,356 A | 4/1994 | Iijima et al. |
| 5,362,467 A | 11/1994 | Sakai et al. |
| 5,364,611 A | 11/1994 | Iijima et al. |
| 5,397,553 A | 3/1995 | Spencer et al. |
| 5,444,986 A | 8/1995 | Hino |
| 5,448,892 A | 9/1995 | Cheng |
| 5,473,904 A | 12/1995 | Guo et al. |
| 5,497,630 A | 3/1996 | Stein et al. |
| 5,512,176 A | 4/1996 | Blair |
| 5,553,456 A | 9/1996 | McCormack |
| 5,562,891 A | 10/1996 | Spencer et al. |
| 5,660,603 A | 8/1997 | Elliot et al. |
| 5,679,254 A | 10/1997 | Chakrabarti |
| 5,816,057 A | 10/1998 | Dickey et al. |
| 5,873,262 A | 2/1999 | Max et al. |
| 6,028,234 A | 2/2000 | Heinemann et al. |
| 6,089,022 A | 7/2000 | Zednik et al. |
| 6,106,595 A | 8/2000 | Spencer |
| 6,112,528 A | 9/2000 | Rigby |
| 6,158,239 A | 12/2000 | Max et al. |
| 6,180,843 B1 | 1/2001 | Heinemann et al. |
| 6,245,955 B1 | 6/2001 | Smith |
| 6,296,060 B1 | 10/2001 | McCaslin |

FOREIGN PATENT DOCUMENTS

| | | |
|---|---|---|
| JP | 55055125 | 4/1980 |
| JP | 58109179 | 6/1983 |
| JP | 59029078 | 2/1984 |
| JP | 61025682 | 2/1986 |
| JP | 11319805 | 11/1999 |
| JP | 2000202444 | 7/2000 |
| SU | 997715 | 2/1983 |
| SU | 1006378 | 3/1983 |
| WO | WO 01/04056 | 1/2001 |
| WO | WO01/34267 A1 | 5/2001 |

OTHER PUBLICATIONS

Japanese Abstract, Journal No.: G0941AAk ISSN No: 0453-0683, 1995, vol. 42, No. 7. Accession No.: 95A0492545, File segment: JICST-E.

Max and Chandra, "The Dynamic Oceanic Hydrate System: Production Constraints and Strategies," Offshore Technology Conference, Paper No. 8684, pp. 1-10 (1998).

Max and Dillon, "Oceanic Methane Hydrate: The Character of the Blake Ridge Hydrate Stability Zone, and the Potential for Methane Extraction," *Journal of Petroleum Geology*, vol. 21(3), Jul. 1998, pp. 343-357.

Max, M.D., "Oceanic Methane hydrate: The Character of the Blake Ridge Hydrate Stability Zone, and the Potential for Methane Extraction," Author's correction, *Journal of Petroleum Geology*, vol. 22(2), pp. 227-228 (Apr. 1999).

Max and Lowrie "Oceanic Methane Hydrate Development: Reservoir Character and Extraction," *Naval Research Laboratory* (NRL), OTC 8300, pp. 235-240.

Max and Lowrie, "Oceanic Methane Hydrates; A "Frontier" Gas Resource", *Journal of Petroleum Geology*, vol. 19(a), pp. 41-56 (Jan. 1996).

Max et al., "Extraction of Methane from Oceanic Hydrate System Deposits", Offshore Technology Conference, Paper No. 10727, pp. 1-8 (1999).

Max et al., "Methane-Hydrate, A Special Clathrate: Its Attributes and Potential," *Naval Research Laboratory*, NRL/MR6101-97-7926, pp. 1-74 (Feb. 28, 1997).

Mel'nikov et al. Russian Abstract Publication No. 2166348, May 10, 2001.

Rautenbach et al., Entwicklung und Optimierung eines Hydrat-Verfahrens zur Meerwasserentsalzung, Chemle-Ing.-Techn 45 jahrg. 1973/Nr. 5, pp. 259-254.

Seliber, Methane Cooled Desalination Method and Apparatus, USPTO, Defensive Publication T939,007—Published Oct. 7, 1975.

XP-00213497 SU1328298 English language abstract.

HYDRATE DESALINATION FOR WATER PURIFICATION

This application is a divisional of patent application Ser. No. 09/941,545 filed on Aug. 30, 2001, now U.S. Pat. No. 6,767,471, the entire contents of which are expressly incorporated herein by reference. This application claims the benefit of provisional patent application Ser. No. 60/230,790 filed on Sep. 7, 2000, and of provisional patent application Ser. No. 60/240,986 filed on Oct. 18, 2000.

FIELD OF THE INVENTION

The present invention generally relates to desalination or other purification of water using gas hydrates to extract fresh water from saline or polluted water. In particular, the invention relates to directing the water flow and managing the movement of hydrate to obtain maximum efficient heating and cooling of the water-to-be-treated either by heat absorption or dilution using cool fluids or other cooling in the area of hydrate formation.

BACKGROUND OF THE INVENTION

In general, desalination and purification of saline or polluted water using buoyant gas hydrates is known in the art. For example, U.S. Pat. No. 5,873,262 discloses a water desalination or purification method wherein a gas or mixture of gases spontaneously forms buoyant gas hydrate when mixed with water at sufficiently high depth-induced pressures and/or sufficiently low temperatures in a treatment column. According to prior technology, the treatment column is located at sea. Because the hydrate is positively buoyant, it rises through the column into warmer water and lower pressures. As the hydrate rises, it becomes unstable and dissociates into pure water and the positively buoyant hydrate-forming gas or gas mixture. The purified water is then extracted and the gas is processed and reused for subsequent cycles of hydrate formation. Suitable gases include, among others, methane, ethane, propane, butane, and mixtures thereof.

Methods of desalination or purification using buoyant gas hydrates known prior to Applicant's co-pending application Ser. No. 09/350,906 rely on the naturally high pressures and naturally low temperatures that are found in open ocean depths below 450 to 500 meters when using pure methane (or at shallower depths when using mixed gases to enlarge the hydrate stability "envelope"), and the desalination installations, being fixed to pipelines carrying fresh water to land, are essentially immobile once constructed. In certain marine locations such as the Mediterranean Sea, however, the water is not cold enough for the requisite pressure to be found at a shallow enough depth; this would necessitate using a much longer column, which may be impractical.

In addition to the temperature of the seawater, other heat considerations are relevant to systems for desalination or purification of water using gas hydrates. When gas hydrate forms, it gives off heat in an exothermic reaction due to significantly higher heats of fusion than water-ice. In a hydrate fractionation desalination apparatus, the cold water and high pressures required for natural hydrate formation in the sea are reproduced within the desalination apparatus. According to this approach to water desalination or purification, in order for a gas or mixture of gases spontaneously to form gas hydrate when mixed with treatment water at sufficiently high pressures, the treatment water must be of sufficiently low temperature.

Because the stability of hydrate is governed by both the temperature and pressure of the water-to-be-treated in which the hydrate forms, in certain circumstances, only a certain amount of hydrate can be formed before the heat generated by the exothermic formation of hydrate raises the temperature of the residual water to a level at which hydrate will no longer form. In other words, for a given volume of water-to-be-treated, which volume of water initially is suitable for the spontaneous formation of hydrate when hydrate-forming gas is introduced, the formation of hydrate itself can limit the amount of hydrate which will form because of the associated rise in temperature. Accordingly, there is a need for methods and systems that overcome this effective self-limitation.

Furthermore, laboratory and at-sea experimental experience has shown that causing gas hydrate to form spontaneously in seawater of suitable pressure and temperature can result in different forms of hydrate where the hydrate formation is carried out under different physical chemical conditions. For example, when the hydrate-forming gas is introduced to open ocean seawater that is very undersaturated in hydrate-forming-gas, hydrate formation is generally restricted to a zone at the interface between water and gas resulting in the formation of relatively thin aggregates of hydrate. Hydrate formation under these conditions is less efficient and results in the production of a very large number of small pieces of hydrate which can have shapes which are not as hydrodynamic as larger pieces of solid hydrate. The small pieces of hydrate that are not hydrodynamic rise buoyantly at slower rates than larger pieces of solid hydrate, and thus begin (and likely complete) their dissociation at depths deeper than is desired for optimal conversion of hydrate to water and gas.

SUMMARY OF THE INVENTION

The present invention represents a significant advance over the methodologies disclosed and taught in patent application Ser. No. 09/500,422, filed Feb. 9, 2000, and its precursors. In accordance with the present invention, an apparatus is provided which allows the hydrate formed in the hydrate formation region of a desalination fractionation apparatus to be cooled as it rises in the apparatus. This has the beneficial effect of increasing its stability at lower pressure and reducing the depth at which the hydrate will begin to dissociate. The present invention provides more efficient management of the thermal energy within the system as a whole.

In an additional embodiment, the present invention also allows a high percentage of hydrate to be formed in and extracted from a given volume of water-to-be-treated in a single pass through the desalination apparatus by cooling the hydrate formation region of the desalination apparatus. This increases the efficiency of the system in terms of the movement of water-to-be-treated and the amount of fresh water produced.

In accordance with another aspect of the present invention, an apparatus and method for the desalination or purification of water is provided in which a hydrate-forming-gas (such as methane or some other hydrate-forming gas or gas mixture) is introduced to at least part of the water to be desalinated or purified under pressure-temperature conditions in which the hydrate-forming-gas dissolves to near saturation. The hydrate-forming-gas-saturated water-to-be-treated is thereafter transported to a physical location where additional hydrate-forming gas is introduced under pressure-temperature conditions in which the spontaneous formation of hydrate takes place. Dissolving hydrate-forming-gas in at least part of the water to be desalinated or purified prior to hydrate formation improves the efficiency of converting hydrate-forming gas to solid hydrate, and improves the conversion of hydrate-forming-gas to larger solid hydrate crystals or hydrodynamic aggregates of crystals of approximately the same size. By more efficiently converting the hydrate-forming-gas into larger solid hydrate crystals, this aspect of the present invention allows a more efficient management of the distribution of thermal energy within the apparatus as a whole and creates a more efficient source of desalinated or purified water.

In accordance with the present invention, the pre-treatment of the water to be desalinated or purified with the hydrate-forming-gas may be provided in desalination or purification apparatus which are land-based, sea-based, or in those that are artificially pressurized, although it is illustrated explicitly herein in just a land-based installation.

BRIEF DESCRIPTION OF THE DRAWINGS

The invention will now be described in greater detail in connection with the drawings (including the drawings presented in the '422 application), in which.

DETAILED DESCRIPTION OF PREFERRED EMBODIMENTS

The '422 Application and Its Precursors

Figure 1:
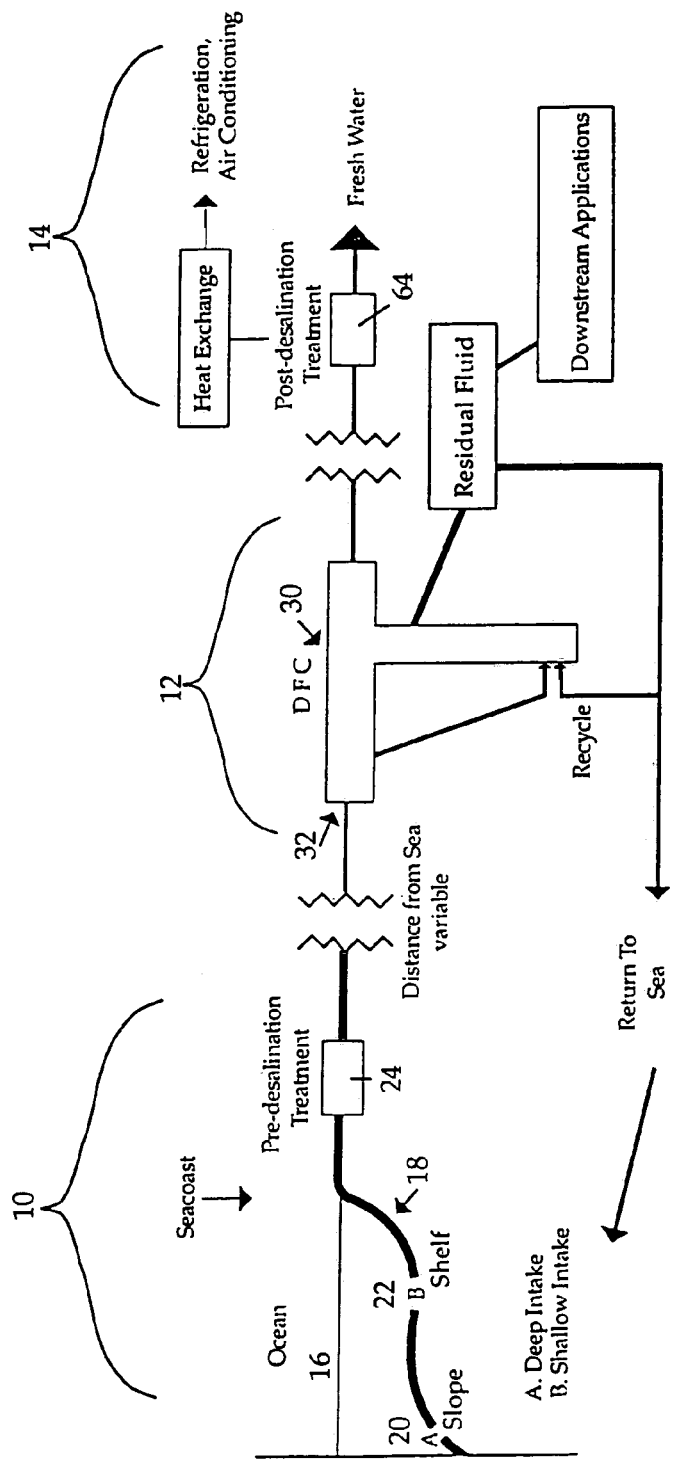
FIG. 1 is a generalized, diagrammatic depiction of a land-based desalination installation, as per the '422 application.

As noted above, the present invention provides a significant advance over the methodologies and apparatus disclosed in the '422 application. A land-based desalination installation as per the '422 application and its precursors is shown schematically in FIG. 1 in generalized fashion. The installation may be divided roughly into three sections or regions: an intake portion 10; a water purification portion 12; and post-processing and downstream usage section 14.

The intake portion 10 consists essentially of the apparatus and various subinstallations necessary to extract seawater from the ocean 16 and transport it to the desalination/purification installation at region 12, including subaquatic water intake piping 18 and pumping means (not shown) to draw the water from the ocean and pump it to shore for subsequent processing. Large volume installations can be located relatively close to the sea to reduce the piping distance of the input water to a minimum, and establishing the installation as close to sea level as possible will reduce the cost of pumping against pressure head.

The intake pipeline 18 extends sufficiently out to sea that it draws deep water, e.g., from the slope 20 of the continental shelf because deep water is more pure and colder than shallow water. Alternatively, water may be drawn from locations closer to land, e.g., from areas on the continental shelf 22 where the distance across the shallow water is too great for practice. The precise depth from which water is drawn will ultimately be determined by a number of factors, including primarily the specific embodiment of the desalination fractionation column which is employed. Ideally, the desalination installation, per se, is located so that the highest part of the fluid-handling system is at or below sea-level to reduce the costs of intake pumping.

Additionally, the water may be pretreated at a pretreatment station 24. Pretreatment consists mainly of de-aeration, filtering to remove particulate matter and degassing, consistent with the requirement that material necessary for hydrate nucleation and growth not be removed from the water.

Figure 2:
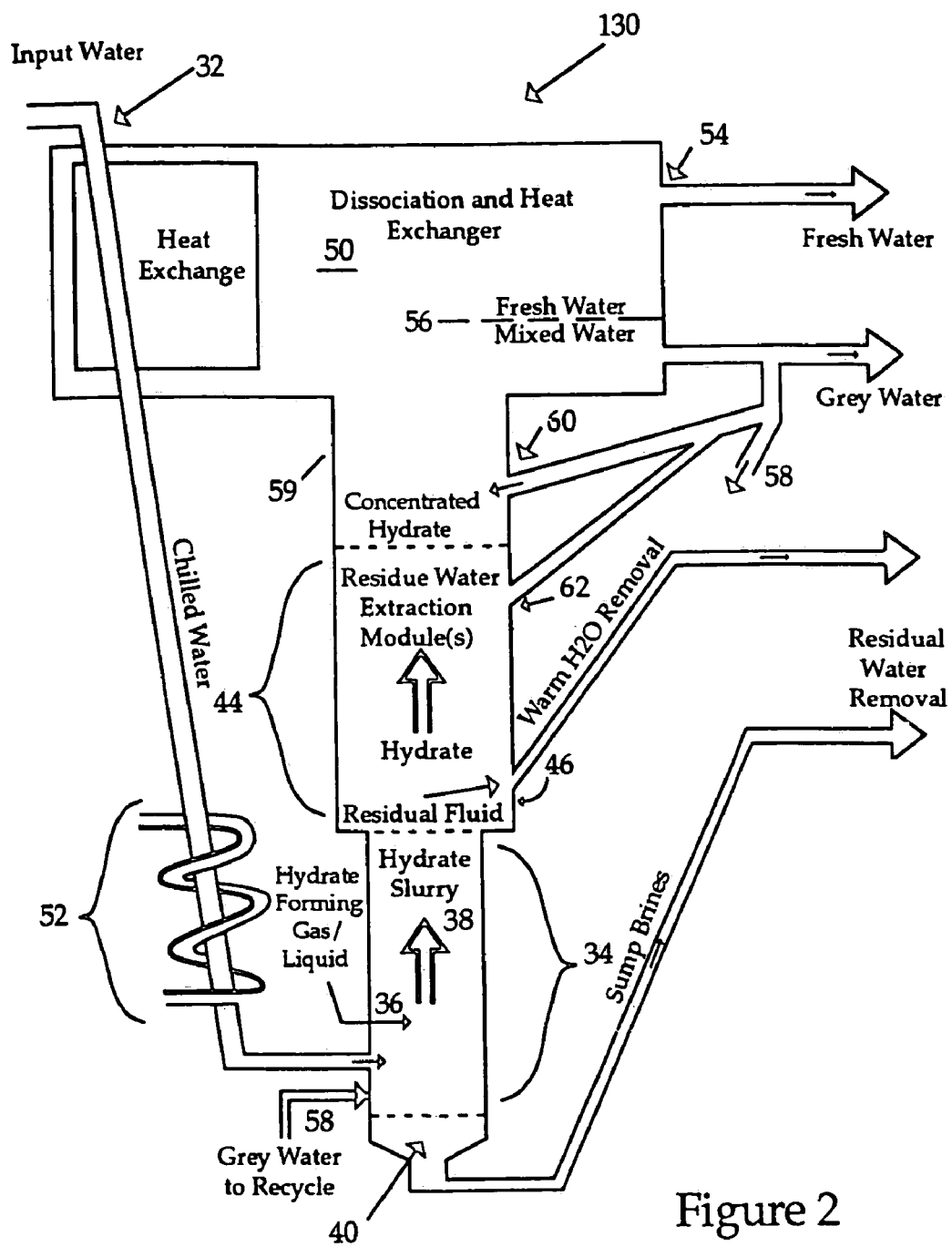
FIG. 2 is a diagrammatic, side elevation view of an embodiment of a desalination fractionation column which utilizes positively buoyant hydrate and which may be employed in the installation shown in FIG. 1, as per the '422 application.
Figure 3:
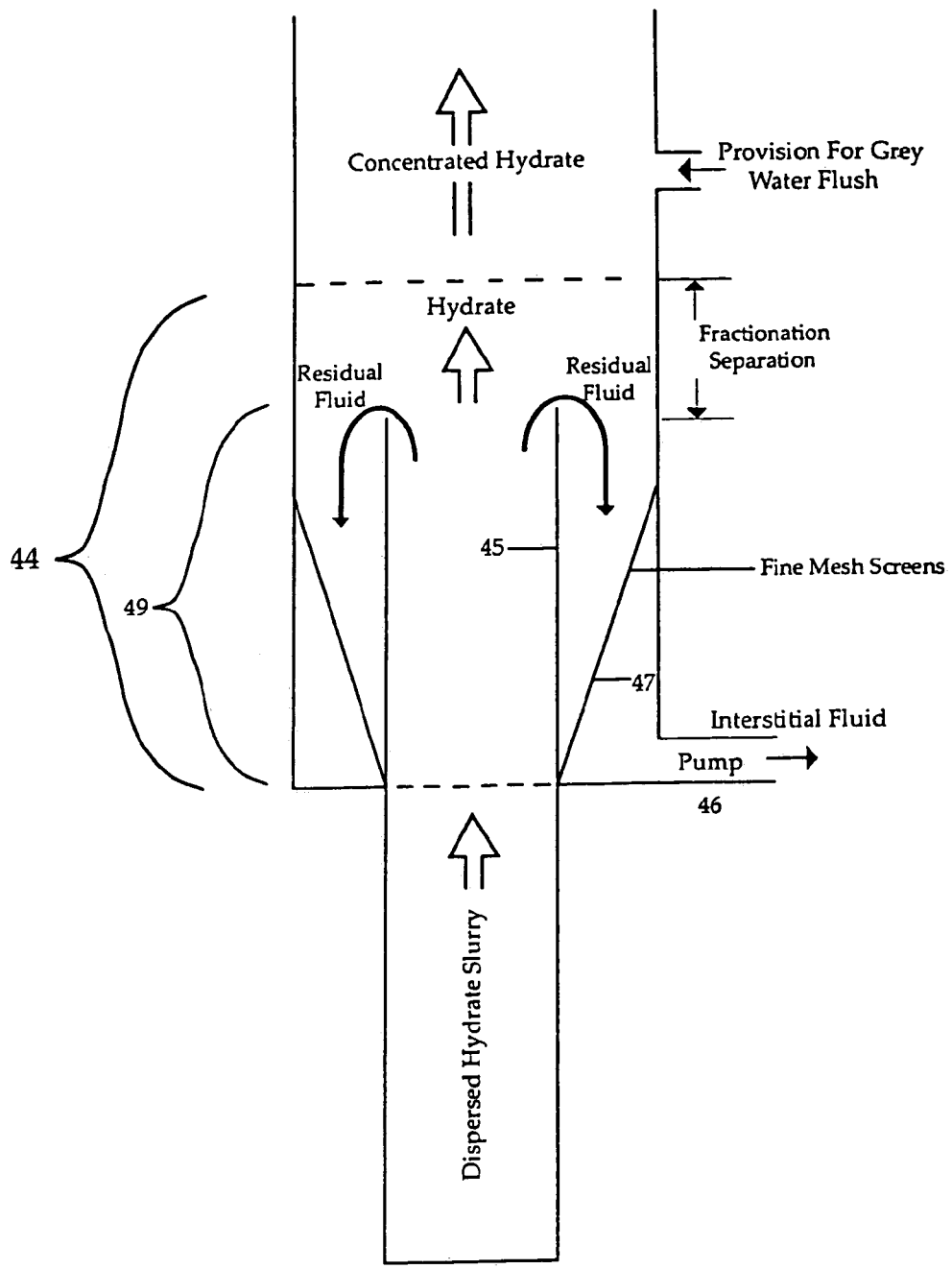
FIGS. 3 and 4 are diagrammatic, side elevation views showing two alternative heat extraction portions of a desalination fractionation column employed in the installation shown in FIG. 1, as per the '422 application.
Figure 4:
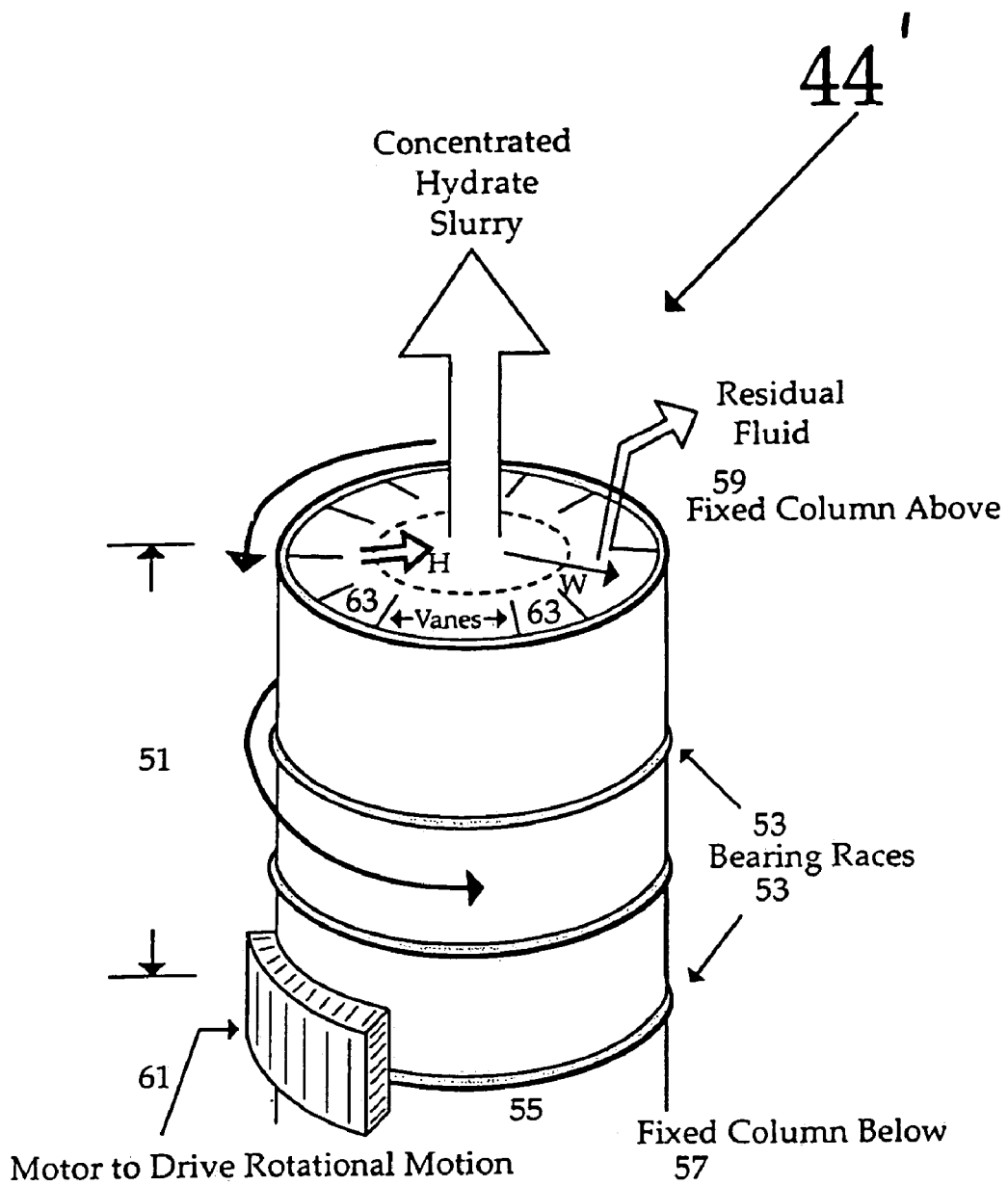

An embodiment of the purification installation 30, per se, as per the '422 application and its precursors is illustrated in FIGS. 2, 3, and 4, which embodiment utilizes positively buoyant hydrate to extract fresh water from seawater. Seawater is pumped into the installation 130 at water input 32 and is pumped down to the lower, hydrate formation section 34 of the installation. The bottom of the hydrate formation section is no more than about 800 meters deep, and perhaps even shallower (again depending on the particular gas or gas mixture being used). A suitable, positively buoyant hydrate-forming gas (or liquid) is injected into the hydrate formation section at 36, and positively buoyant hydrate 38 spontaneously forms and begins to rise through the water column, as is known in the art.

The hydrate-forming gas can be pumped using sequential, in-line, intermediate pressure pumps, with the gas conduit extending either down through the fractionation column, per se, or down through the input water line so that gas line pressure is counteracted by ambient water pressure. As a result, it is not necessary to use expensive, high pressure gas pumps located on the surface. Alternatively, once a gas has been liquefied, it can be pumped to greater depths without further significant compression.

Hydrate formation (crystallization) is an exothermic process. Accordingly, as the positively buoyant hydrate forms and rises automatically through the water column—forming a hydrate "slurry" as hydrate crystals continue to nucleate and grow as they rise, until the hydrate-forming gas is used up—the surrounding water, which will increasingly become a concentrated saline "residue," will be heated by the heat energy released during crystallization of the hydrate.

Below a certain salinity, the heated residual seawater will have a relatively decreased density and will rise in the column along with the hydrate 38. When the salinity of the residual seawater rises high enough due to the extraction of fresh water from it, however, the highly saline residual seawater will sink to the bottom of the water column. This highly saline residual seawater is collected in sump 40 at the bottom of the fractionation column and is removed.

As the slurry of hydrate and heated residual seawater rises in the fractionation column as per the '422 application and its precursors, heated residual seawater is removed from the system in heat extraction portion 44 of the fractionation column at one or more points 46, as per the '422 application and precursors. The heat extraction section 44 is shown in greater detail in FIG. 3. As illustrated in FIG. 3, for one mode of separation of hydrate and slurry as per the '422 application and its precursors, water is pumped from the system as part of the vertical fractionation process. This is accomplished through a two-stage process. An internal sleeve 45 allows a primary separation to take place, as a water trap 49 is formed below the top of the sleeve. Hydrate continues to rise, while water floods the entire section 44. Water is pumped from below the level at which hydrate exits from the top of the sleeve through fine conical screens 47. These are designed to obstruct the passage of particulate hydrate. (The screens can be heated periodically to clear them of hydrate when flow restriction exceeds design limits.) Residual water is drawn off at a slow enough rate that any hydrate that may reside within water drawn toward the screen has a greater tendency to rise buoyantly than the tendency toward downwards or sideways movement associated with the force of suction of the drawn-off water. Very buoyant gas rises and stays within the column.

An alternative configuration 44' of the heat extraction zone is shown in FIG. 4. In this configuration, a centrifuge is used to allow a separate, mechanically-driven density fractionation system to operate. In this configuration, a segment 51 of the column is made mobile and capable of rotary movement. The mobile, rotary centrifuge column segment is carried by bearings 53 at the base 55 and at intervals along its height to keep it in vertical alignment with the entirety of the column, and to allow it to rotate with respect to the portions 57, 59 of the column above and below it. This section is motor-driven, using a hydraulic system 61 driven from the surface. Vanes 63 within the centrifuge section will cause the water column to rotate, which vanes are designed based on turbine vane design to cause the hydrate-residual water in the section to rotate without turbulence and with increasing velocity toward the top of the section where residual water is extracted. Gravity "settling" or fractionation works here in a horizontal plane, where the heavier residual water "settles" toward the sides of the column while the lighter, more buoyant hydrate "settles" toward the center of the column. The hydrate continues to rise buoyantly and concentrates in the center of the centrifuge section. It will be appreciated that more than one such centrifuge section may be employed.

As the hydrate rises into the upper, dissociation and heat exchange region 50 of the desalination fractionation column as per the '422 application and its precursors, the depth-related pressures which forced or drove formation of the hydrate dissipate; accordingly, the hydrate, which is substantially in the form of a slurry, will be driven to dissociate back into the hydrate-forming gas (or mixture of gases) and fresh water. However, regardless of the particular method used to extract the warmed residual seawater, heat energy in the surrounding seawater which ordinarily (i.e., in the prior art with respect to the '422 application and its precursors) would be absorbed by the hydrate as it dissociates is no longer available to the hydrate. Therefore, because heat has been removed from the system by extracting warmed residual seawater in the heat extraction portion 44 of the apparatus, a net or overall cooling bias is created in the upper, dissociation and heat exchange portion 50 of the installation, as per the '422 application and precursors.

This cooling bias can be capitalized upon advantageously. In particular, as indicated schematically in FIG. 2, water being pumped into the system (at 32) is passed in heat exchanging relationship through the regions of dissociating hydrate per the '422 application and its precursors. For example, it is contemplated that the dissociation and heat exchange portion 50 may be constructed as one or more large, individual enclosures on the order of one hundred meters across. The input water will pass via a series of conduits through the regions of dissociating hydrate and will be cooled significantly as it does so. In fact, although some initial refrigeration will be required at start-up of the process, which initial refrigeration may be provided by heat exchange means 52, the installation eventually will attain a steady-state condition in which the amount of heat energy transferred from the input water to the dissociating hydrate is sufficient to cool the input water to temperatures appropriate for spontaneous formation of hydrate at the particular depth of the dissociation column.

Ideally, the input water is stabilized at 4° C. or below. This is because below that temperature, the density of the water increases, which enhances separation of the hydrate-water slurry formed by injection of the gas. Additionally, for a given pressure, hydrate nucleation proceeds faster at colder water temperatures. During the start-up period, the system as per the '422 application and precursors is run in a mode of maximum warm fluid extraction (to create a state of induced thermal bias) before equilibrium or steady-state is reached; although the duration of this start-up period will vary depending on the particular installation parameters, the design goal is that once steady-state is reached, the system can be run for extremely long operating periods without being shut down, i.e., periods on the order of years. Controlling residue water extraction, and thus heat removal, maintains a steady-state condition so that the apparatus does not keep cooling to below steady-state operating conditions.

Once the hydrate has dissociated into its constituent fresh water and gas or gases, the fresh water is pumped off, e.g. as at 54, and the gas is captured and recycled. (Provisions may be made for liquefying certain gases where this is desired.) Additionally, a portion of the water in the dissociation and heat exchange region 50 will be "gray water," which is fresh water containing some small portion of salts that have been removed from the hydrate by washing of the hydrate with water. The distinction between the "gray" or mixed water and pure fresh water is indicated schematically by dashed line 56. The gray water may be suitable for drinking, depending on the salt concentration, or for agricultural or industrial use without further processing. The cold, gray water may be recycled back into the fractionation column, either by pumping it back down to the hydrate formation section 34, as indicated at 58; or it may be injected back into the concentrated hydrate slurry at a region of the fractionation column-located above the heat extraction portion 44, as indicated at 60, to increase the fluid nature of the hydrate slurry and to aid in controlling overall thermal balance of the system. Furthermore, providing gray water at 62 to dilute residual interstitial fluid allows for pre-dissociation washing.

As further shown in FIG. 1, in the post-processing and downstream usage section 14, the fresh water preferably is treated by secondary treatment means 64. The secondary treatment means may include, for example, fine filtering, gas extraction, aeration, and other processing required to bring the water to drinking water standard.

Moreover, depending on operating parameters such as temperature of the source water, the amount of residual seawater extracted in the heat extraction section 44, dimensions of the installation, and other parameters such as viscosities of fluids within the system; depending on buoyancy of the hydrate relative to all fluids within the system; depending on salinity and temperature of residual water; depending on the design output requirements of fresh water; depending on salinity and temperature of input water; depending on the design cooling requirements; depending on system inefficiencies affecting thermal balance; etc., the fresh water produced will be significantly cooled. This cooled water can be used to absorb heat from other applications or locations such as the insides of buildings, and hence can be used to provide refrigeration or provide for air-conditioning.

Finally, according to the '422 application and precursor methodology, once the seawater has been cycled through the desalination fractionation column and downstream processing applications a desired number of times, the residual, concentrated seawater (which may be highly saline in nature) is simply pumped back to sea. Alternatively, it may be retained for those who desire it.

With respect to overall design, engineering, and construction considerations for the system, it is contemplated that the desalination fractionation column 130 will be on the order of 15 to 20 meters in diameter, or even larger. Conventional excavation and shaft-lining methodologies common to the mining and tunneling industry can be used in the construction of the column 130. Overall dimensions would be determined based on the total desired fresh water production desired and relevant thermodynamic considerations. For example, one cubic meter of methane hydrate has the capacity to warm about 90 to 100 cubic meters of water by about 1 C as it forms, and that same cubic meter of hydrate has the capacity to cool about 90 to 100 cubic meters of water by about 1° C. as it dissociates. (Mixes of suitable gases have higher heats of fusion, which makes the process more efficient.) Required cooling therefore will, in part, determine hydrate production rates, and hence dimensions of the system and the choice of gas or gases to meet those production rates.

Preferably, the diameter of the residual fluid removal column segment is larger. This facilitates buoyant, upward movement of the hydrate through the water column while first allowing separation of residue water from the hydrate in the heat extraction region 44 as per the '422 application and its precursors, and then dissociation and heat exchange in the dissociation and heat exchange region 50.

The dissociation and heat exchange region 50 may be constituted not just by a single dissociation "pool," as shown schematically in FIG. 2, but rather may consist of a number of linked, heat-exchanging devices in a number of different water treatment ponds or pools. The actual depth, size, throughput, etc. will depend on the production rate, which will depend, in turn, on the temperature of the input water, the particular gas or gas mixture used to form the hydrate, the rate at which heat can be removed from the system, etc.

The input of water into the base of the fractionation column can be controlled by a device (not shown) that alters the input throat diameter so as to facilitate mixing of the gas and water, thereby promoting more rapid and complete hydrate formation. Alternatively or additionally, hydrate formation can be enhanced by creating flow turbulence in the input water, just below or within the base of the hydrate-forming-gas injection port 36. It may further be desirable to vary the diameter of the desalination fraction column in a manner to slow the buoyant ascent of the hydrate slurry, thereby enhancing hydrate formation.

The dissociation and heat exchange region 50 will be significantly wider and larger than the lower portions of the desalination column. This is because, as per the '422 application and its precursors, hydrate will be floating up into it and dissociating into gas and fresh water at a rate that is faster than that which could be accommodated in a pool that is the diameter of the column itself. Moreover, the requirement for heat will be great; if sufficient heat cannot be provided, water ice will form and disrupt the desalination process. Provision for physical constriction within a column will hold hydrate below the level where it dissociates freely, thus providing for a control on the amount of gas arriving at the surface. This is done for both normal operational and safety reasons.

Because the positively buoyant hydrate floats, fresh water tends to be produced at the top of the section, thereby minimizing mixing of fresh and saline water. To inhibit unwanted dissociation, the heat exchanger apparatus per the '422 application and precursors may extend downward to the top of the residual water removal section. The dissociation and heat exchange pools do not need to be centered over the water column; moreover, more than one desalination fractionation column may feed upward into a given dissociation and heat exchange pool. Similarly, groups of desalination fraction columns can be located close together so as to be supported by common primary and secondary water treatment facilities, thereby decreasing installation costs and increasing economy.

In addition to large-scale installations, relatively small-scale installations are also possible. For these installations, smaller diameter desalination columns can be constructed in locations where lower volumes of fresh water are required. Although overall efficiency of such systems will be lower than larger scale systems, the primary advantage of such small-scale installations is that they can be implemented using standard drilling methods. Furthermore, mass-produced, prefabricated desalination apparatus sections can be installed in the casings of drilled holes; this allows the installation to be completed in a relatively short period of time. Capital cost of such an installation also is reduced, as fabrication of the components can be carried out on an industrialized basis using mass production techniques. The various operating sections of a smaller-scale installation might be replaced by extracting them from their casing using conventional drilling and pipeline maintenance techniques.

Figure 5:
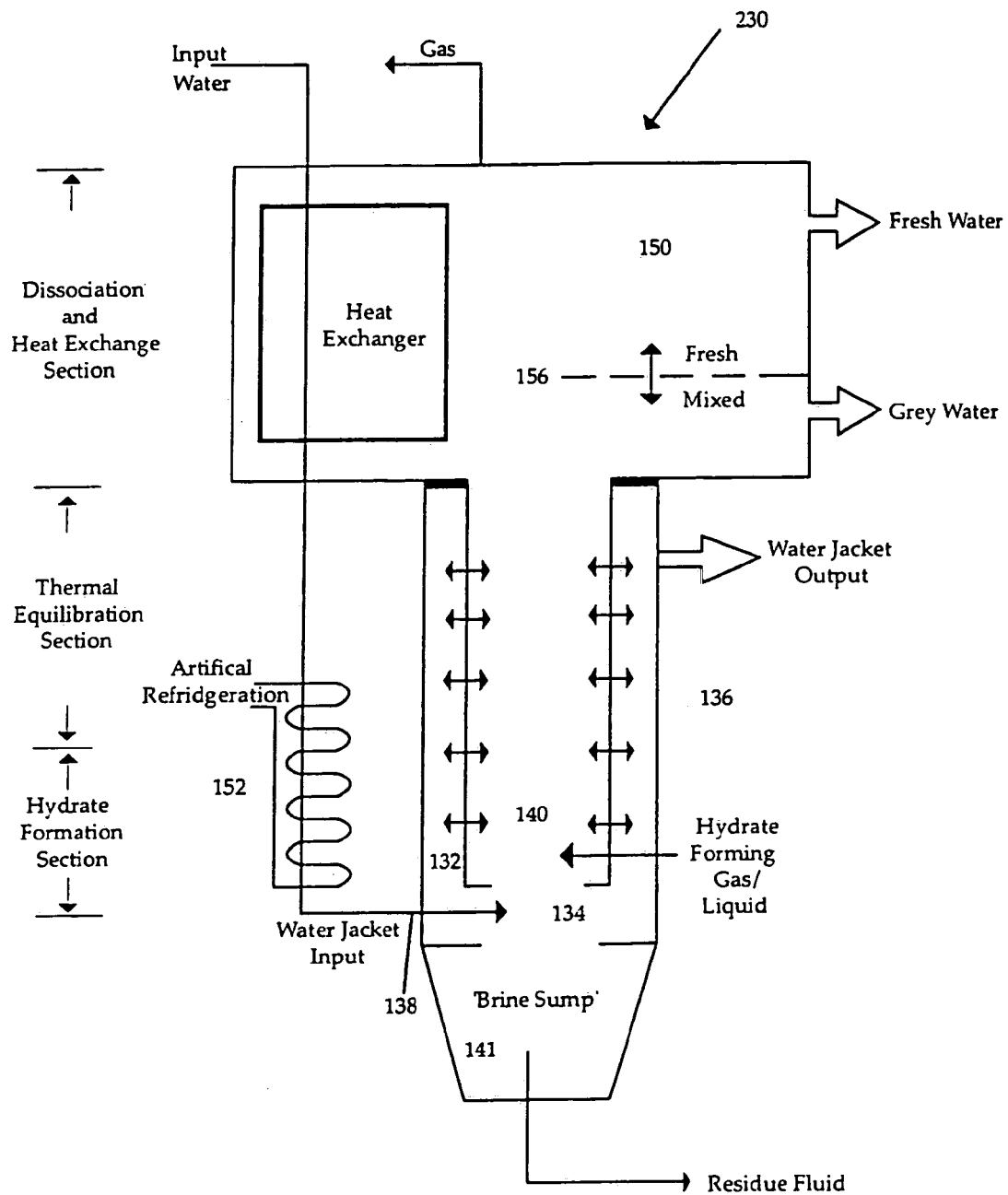
FIG. 5 is a diagrammatic, side elevation view of another embodiment of a desalination fractionation column which utilizes positively buoyant hydrate and which may be employed in the installation shown in FIG. 1, as per the '422 application.

Another embodiment 230 of a desalination fractionation column according to the '422 application and its precursors is shown in FIG. 5. In this embodiment, hydrate formation occurs essentially within a thermal equilibration column 132. The thermal equilibration column 132 has an open lower end 134 and is suspended in shaft 136. In this embodiment, input water is injected near the base of the desalination column 132, e.g. as at 138; after passing through heat exchange and dissociation region 150 of the column 230 in similar fashion to the embodiment shown in FIG. 2. Positively buoyant hydrate-forming gas is injected into the lower portions of the thermal equilibration column 132, as at 140, and hydrate will form and rise within the column 132 much as in the previous embodiment. The embodiment 230 is simplified in that heat of formation of the hydrate is transferred to water surrounding the thermal equilibration column 132 within a "water jacket" defined between the walls of the column 132 and the shaft 136 in which the desalination fractionation column is constructed. To this end, the hydrate formation conduit preferably is made from fabricated (i.e., "sewn") artificial fiber material, which is ideal because of its light weight and its potential for being used in an open weave that greatly facilitates thermal equilibration between residual saline water within the thermal equilibration column 132 and seawater circulating within the water jacket.

As is the case with the embodiment shown in FIG. 2, warmed water is pumped out of the system, this warmed water being water which has circulated within the water jacket. In contrast to the embodiment shown in FIG. 2, however, the intent of removing warmed water from the water jacket is not to remove so much heat energy that the input water is automatically cooled to temperatures suitable for formation of the hydrate at the base of the column, but rather it is simply to remove enough heat energy to prevent water within the interior of the hydrate formation conduit from becoming so warm that hydrate cannot form at all. Accordingly, the rate at which warm water is removed from the water jacket may be relatively small compared to the rate at which warm water is removed from the heat extraction portion 44 of the embodiment shown in FIG. 2. As a result, it is necessary to supplement the cooling which takes place in the heat exchange and dissociation region 150 using supplemental "artificial" refrigeration means 152. Operation is otherwise similar to that of the embodiment shown in FIG. 2: fresh water is extracted from the upper portions of the heat exchange and dissociation portion 150; "gray water" is extracted from lower portions of the heat exchange and dissociation region 150, i.e., from below the line of separation 156; and concentrated brine is removed from brine sump 141.

Figure 6:
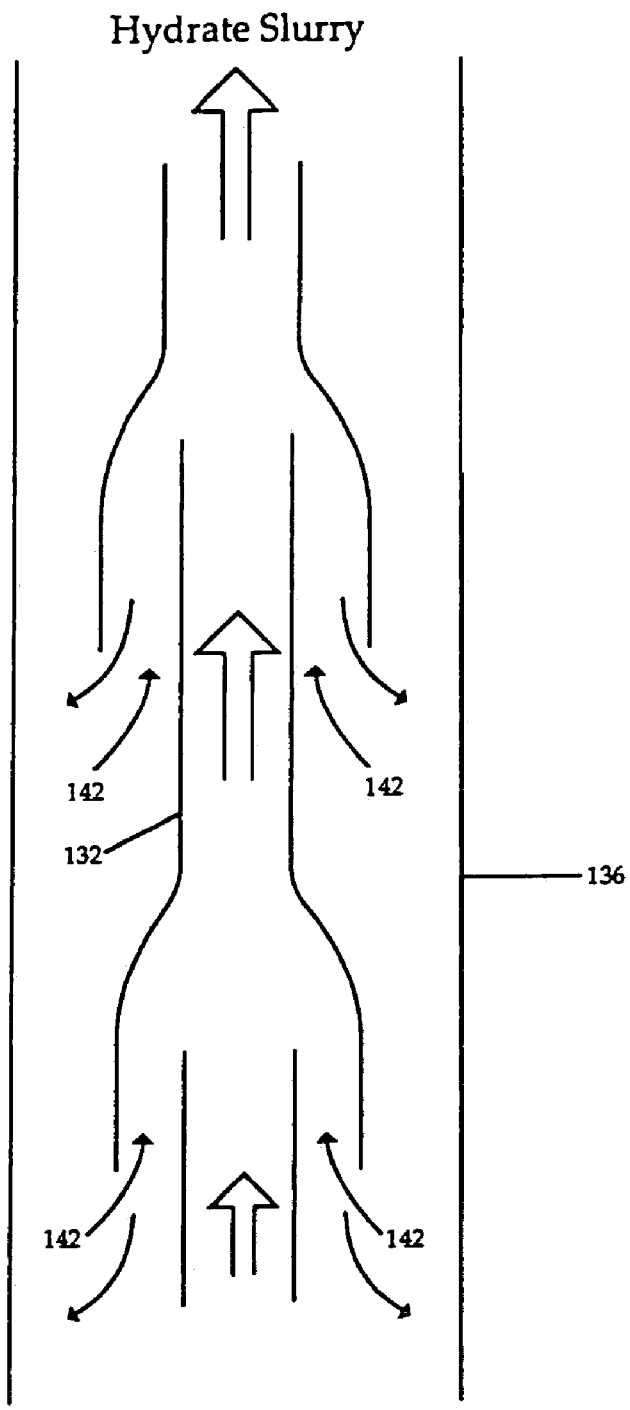
FIG. 6 is a diagrammatic, side elevation view showing overlapping water vents used in the desalination fractionation column shown in FIG. 5, as per the '422 application.

To facilitate "settling out" of brine which is sufficiently dense to be negatively buoyant due to concentration and/or cooling, and to facilitate heat transfer and thermal equilibration, the equilibration column 132 preferably is constructed, per the '422 application and its precursors, with overlapping joints, as shown in FIG. 6. This configuration permits the buoyant hydrate to rise throughout the column, while cooled, more saline water (brine) that has risen with the hydrate slurry can flow out through the vents 142, as indicated schematically.

Figure 7:
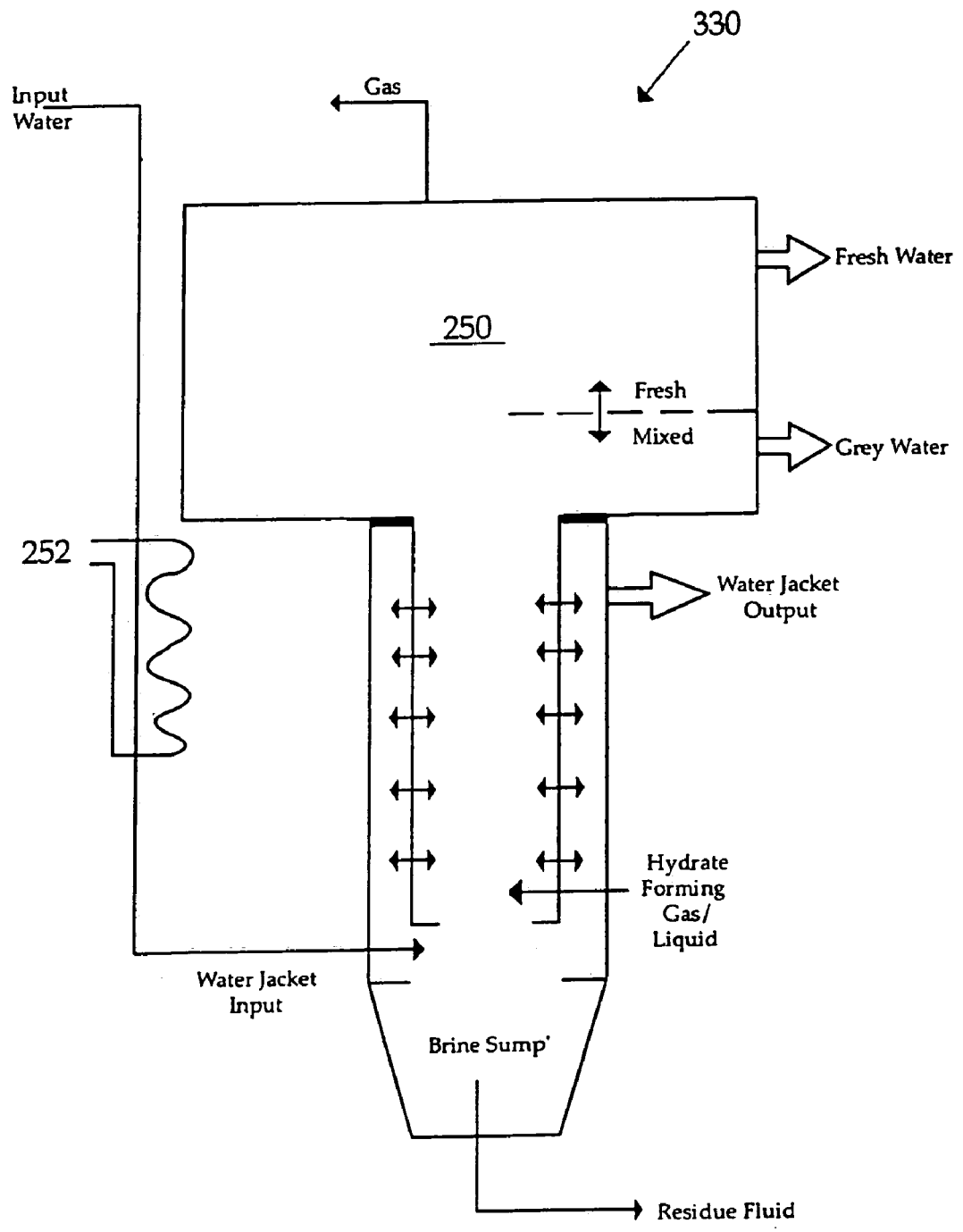
FIG. 7 is a diagrammatic, side elevation view of yet another embodiment of a buoyant hydrate-based desalination fractionation column employed in the installation shown in FIG. 1, as per the '422 application, which embodiment is similar to that shown in FIG. 5.

The desalination fractionation column installation may be further simplified by feeding the input water into the system without passing it through the dissociation section 250 of the embodiment 330 shown in FIG. 7. If the input water is not sufficiently cold, more artificial refrigeration will need to be provided by refrigeration means 252, but operation is otherwise the same as embodiment 230 shown in FIG. 5.

Figure 8:
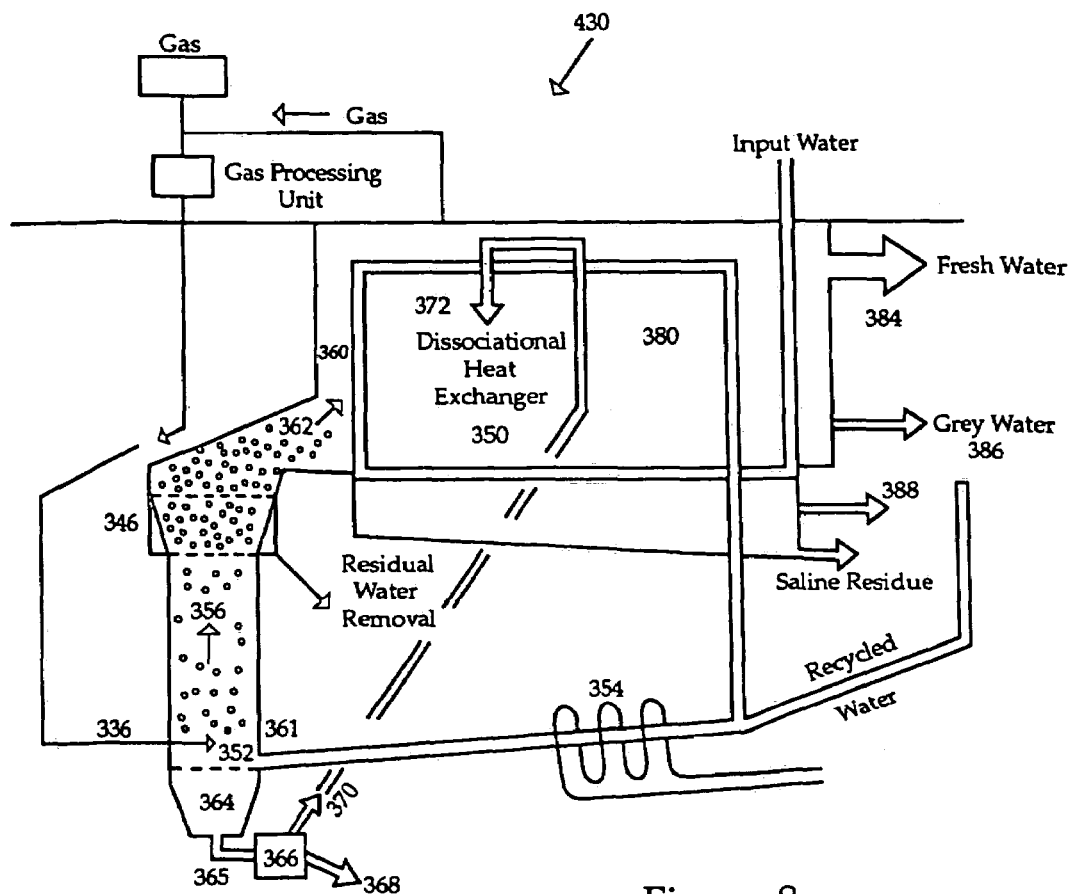
FIG. 8 is a diagrammatic, side elevation view of an embodiment of a desalination fractionation column which permits the utilization of negatively buoyant hydrate and which may be employed in the installation shown in FIG. 1, as per the '422 application.
Figure 9:
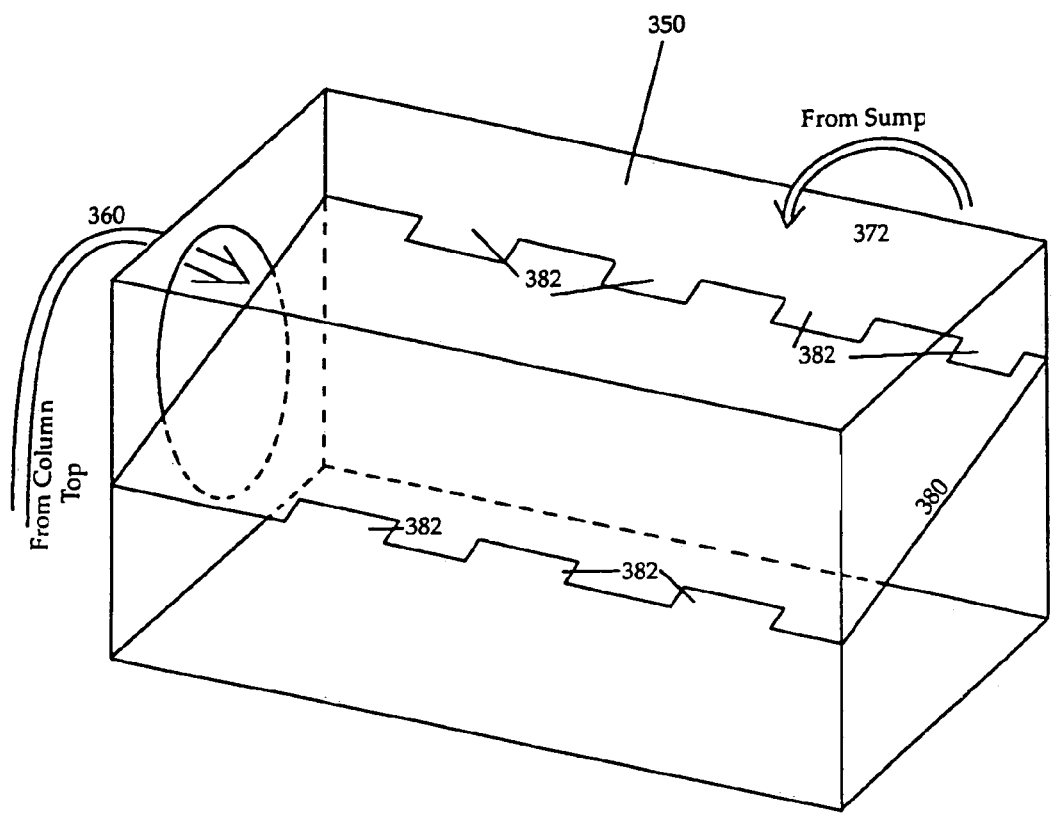
FIGS. 9 and 10 are schematic, isometric and end views, respectively, of the dissociation and heat exchange portion of the desalination fractionation column shown in FIG. 8, as per the '422 application.
Figure 10:
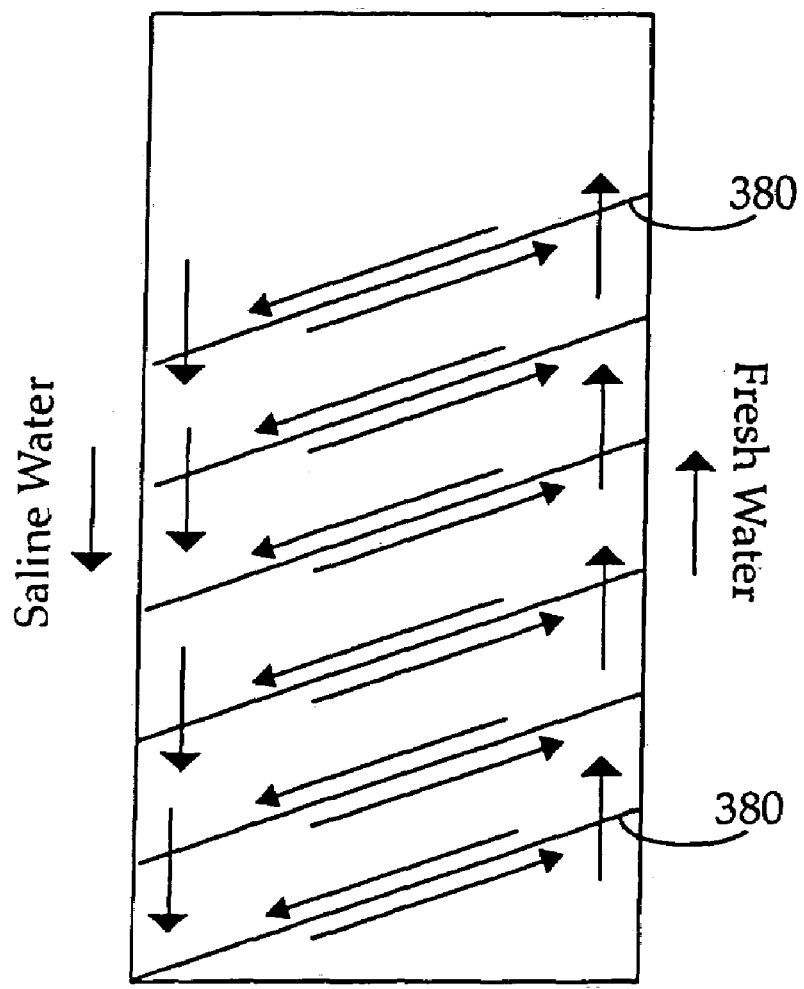

The methods and apparatus according to the '422 application and its precursors can be adapted to accommodate negatively buoyant hydrates. An embodiment 430 of a desalination fractionation "column" configured to permit the use of negatively buoyant hydrate for water purification is shown in FIGS. 8–10. The major difference between this embodiment 430 and the preceding embodiments of desalination fractionation columns is that the heat exchange and dissociation portion 350 of the installation is laterally or horizontally displaced or offset relative to the hydrate formation and heat removal sections 336 and 346, respectively. The hydrate formation and heat removal sections are similar to those in the embodiments described above.

A number of different operating gases can be employed with this configuration. Low molecular weight gases such as O2, N2, H2S, Ar, Kr, Xe, CH4, and CO2 can all form hydrates under different pressure-temperature conditions. Each of the different hydrate-forming gas systems will require special design of the hydrate column which is tailored to the particular gas used in the installation, but the principles of hydrate formation to extract fresh water will remain the same. Additionally, adding small amounts of additive gas(es) to the primary hydrate-forming gas may broaden the hydrate stability field in the same way the methane hydrate stability field is expanded by mixing higher density hydrocarbon gases with methane.

Although a number of different gases that form negatively buoyant hydrate may be used for hydrate desalination, carbon dioxide and the desalination column in which it is used are described in the '422 application and its precursors to illustrate the design requirements and considerations for a desalination system employing hydrate that is naturally less buoyant than seawater. Carbon dioxide (or gas mixtures containing predominantly carbon dioxide, referred to simply as "carbon dioxide" for simplicity) is an ideal gas to use for a number of reasons. In particular, carbon dioxide does not combust under the physical and thermal conditions encountered in the hydrate desalination apparatus, and is thus virtually hazard-free. Carbon dioxide hydrate is stable at shallower depths than methane hydrate (and about the same as mixed gas methane hydrate). Even if present dissolved in relatively high concentrations, carbon dioxide is safe for human consumption and is not offensive to either taste or smell (as would be the case of H2S hydrate). (In fact, fresh water produced using carbon dioxide can be made so as to retain some quantity of the carbon dioxide, thereby providing soda water that is similar to many popular brands but that is different in at least one significant way in that it will contain all the naturally occurring minerals found in seawater in proportion to the remaining salts not removed during the desalination process.) Carbon dioxide hydrate is, like methane, tasteless and odorless. There is considerable relatively recent experimental information which demonstrate clearly the actual marine behavior of the formation and behavior of carbon dioxide hydrate. Carbon dioxide is very common and can be produced locally almost anywhere and is also commonly available as an industrial waste product—particularly in the exhaust gases produced when burning fossil fuel. As further noted in the '422 application and its precursors, the higher heat of fusion of carbon dioxide hydrate will heat the residual water more quickly than methane or methane-mixed gases.

Figure 11:
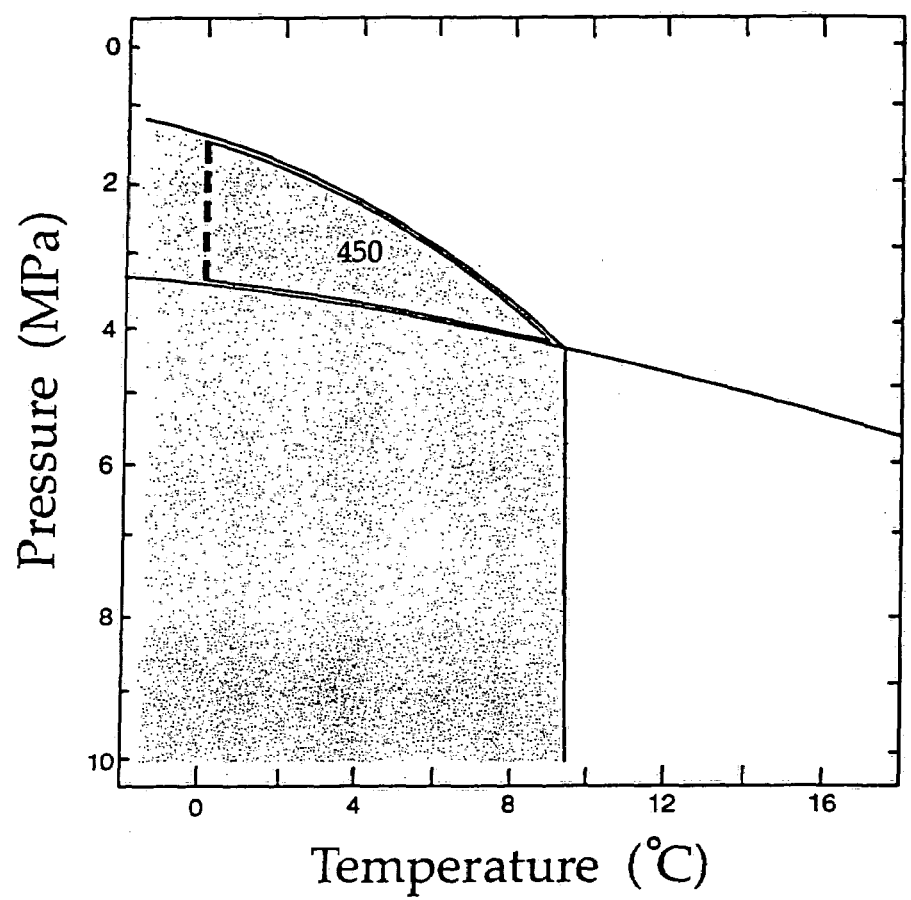
FIG. 11 is a Pressure/Temperature diagram depicting regions of CO2 hydrate stability, the CO2 liquidus, and the operating envelope for a negatively buoyant, CO2 hydrate-based desalination system, as per the '422 application.

Design and engineering of the desalination fractionation column will be determined in large measure based on the phase properties of the particular gas being used. FIG. 11 shows, for example, the carbon dioxide hydrate stability regions superimposed over the carbon dioxide phase diagram. The shaded portion of the diagram indicates that carbon dioxide hydrate (formed from carbon dioxide gas) is stable at from an upper pressure limit of about 18 atmospheres (1.824 MPa), just above 0° C., to about 40 atmospheres pressure (4.053 MPa) at just above about 8° C. With respect to carbon dioxide, per se, the liquidus extends from about 37 atmospheres pressure (3.749 MPa) at just above 0° C., to about 40 atmospheres pressure (4.053 MPa) at just above 8° C. Above the liquidus, carbon dioxide exists as a gas; below the liquidus, carbon dioxide spontaneously compresses to a liquid.

Accordingly, the system is constructed so that, assuming carbon dioxide is used as the operating gas, the carbon dioxide is injected into the hydrate formation portion of the column at ambient temperature and pressure that is within the operating region 450 that consists of the portion of the carbon dioxide hydrate stability zone that lies above the carbon dioxide liquidus and above the freezing point of water. The practical result of this arrangement is that the range of water depths at which carbon dioxide may be used as the operating gas is relatively small and is comparatively shallow. Accordingly, a relatively shallow land apparatus can be constructed, which will reduce construction complexity and cost.

Similar to the embodiments of the '422 application described above, carbon dioxide (or other negatively buoyant hydrate-forming gas, as desired) is injected near the base of the hydrate formation section 336 (e.g., at 352) and mixed with supply or input seawater that has been chilled by being passed through the heat exchange and dissociation portion 350 and/or by "artificial" refrigeration, as at 354. The carbon dioxide hydrate will float only if the formation of the hydrate is incomplete such that a complex, hydrate-gas meshwork is formed. This condition is met when the gas is injected rapidly and in relatively large bubbles. The carbon dioxide hydrate isolates carbon dioxide gas bubbles from the surrounding seawater, thereby preventing further formation of hydrate. The combined gas/liquid carbon dioxide and hydrate is positively buoyant, even though the hydrate per se is negatively buoyant (i.e., has a greater specific gravity than the seawater), and floats upward, as at 356. Additionally, some of the bubbles will burst and new hydrate shells will be formed; hydrate shells with gas bubbles predominantly form new carbon dioxide hydrate rims, which are assisted upward by carbon dioxide gas which tends to adhere to solid hydrate particles.

The system is designed to produce as much hydrate as possible, consistent with leaving enough warm, lower-density, residual fluid to form a "flux" and to allow extraction of heat by removing the residual seawater in the heat extraction section 346, per the '422 application and its precursors. The system furthermore has the capacity for very rapid liquid or gas injection, which may be in time-sequence bursts rather than being continuous. It is intended that not all gas form hydrate, as noted above, to ensure incomplete formation of hydrate. Thus, larger quantities of gas are required for a negatively buoyant hydrate-based system than for a complete hydrate-forming gas system such as the positively buoyant hydrate-based systems described above.

As in the case of positively buoyant hydrate-based embodiments, formation of the negatively buoyant (assisted buoyancy) hydrate is exothermic. Accordingly, according to the '422 application and precursors, heat which is given off during hydrate formation warms the surrounding, residual seawater, which makes the residual seawater more buoyant than the chilled seawater which is being input into the lower part of the column. The residual seawater therefore moves buoyantly upward along with the hydrate as new, denser input water is supplied to the base of the fractionation column, as at 361.

The upward movement of the surrounding residual seawater, as per the '422 application and its precursors, along with the original upward movement of the assisted buoyancy hydrate, has a certain momentum associated with it. This carries the hydrate upward through the column until it reaches a lateral deflection zone 362, where the hydrate/residual seawater slurry is diverted horizontally or laterally relative to the hydrate formation and heat removal sections 336 and 346 and into the dissociation and heat removal section 350. Thus, even though some of the hydrate "bubbles" will burst or crack, thereby releasing the carbon dioxide gas contained therein and losing buoyancy, the hydrate in large measure continues to move upward and over into the heat exchange and dissociation region of the column 350 due to this momentum. As the hydrate loses momentum within the heat exchange and dissociation portion 350, it will settle and dissociate into the gas and fresh water, which will separate from residual seawater as described in greater detail below.

Some of the hydrate, however, will form solid masses without entrapped gas and will sink to the lowermost, sump portion 364 of the column. Concentrated brine will also sink to and settle in the sump portion 364. The sunken hydrate and concentrated residual brine are pumped out of the sump at 365 and separated by appropriately configured separation means 366. The waste saline water 368 is disposed of as appropriate, and a slurry consisting of the sunken hydrate is pumped upwardly as indicated at 370 and is discharged into the heat exchange and dissociation chamber 350, e.g. at 372, where the hydrate dissociates into gas and fresh water.

Within the dissociation and heat exchange chamber 350, the hydrate, whether delivered or transported to the chamber via the lateral deflection portion 362 of the column or pumped from the sump of the desalination fractionation column 364, will dissociate into fresh water and the hydrate-forming gas.

To facilitate separation of fresh water from saline water, transfer of as much hydrate to the upper part of the dissociation and heat exchange chamber 350 as possible is promoted; hydrate is held as high in the dissociation and heat exchange chamber 350 as possible until dissociation of that volume of hydrate is complete; and mixing of the fresh water produced by dissociation and the more saline residual water is kept to a minimum. The configuration of the dissociation and heat exchange chamber shown in FIGS. 9 and 10 facilitates those objectives.

In particular, the assisted buoyancy hydrate slurry rising through the desalination fractionation column enters the chamber as at 360 after being diverted laterally at deflection portion 362, as indicated schematically in FIG. 9. Additionally, hydrate slurry being pumped from the sump, per the '422 application and its precursors, is injected into the dissociation chamber at 372, where it may be placed within special fluid separation devices. The dissociation and heat exchange chamber is constructed with a number of canted separator shelves 380 which extend from one end of the chamber to the other, as well as from one side of the chamber to the other. The canted nature of the shelves allows the denser saline water to sink and the lighter fresh water to rise within and between the shelves, thereby minimizing turbidity and mixing of saline and fresh water. The separator shelves 380 are canted in that they slope downward, both from one end of the chamber to the other as well as from one side of the chamber to the other. The separator shelves have pass-through apertures 382 which allow the denser, saline water to sink within the system and the less dense, fresh water to rise within the system to the top of the chamber as the hydrate dissociates into the fresh water and gas.

Fresh water, which is cooled due to the cooling bias created by the removal of warm residual water as described above in connection with the positively buoyant hydrate embodiments, is removed as at 384 and may be used for cooling as well as for potable water. "Gray" water and saline residue are removed from lower portions of the heat exchange and dissociation chamber 350, as at 386 and 388, and are handled as described above in the context of the positively buoyant hydrate embodiments, e.g., gray water may be used for drinking or industrial applications and the saline residue may be recycled back as input into the base of the desalination fractionation column.

As an alternative to gaseous carbon dioxide, liquid carbon dioxide can be used to form assisted buoyancy hydrate. At the relatively shallow depths appropriate to the formation of hydrate for separation of fresh water, liquid carbon dioxide is more buoyant than seawater (although not as buoyant as gaseous carbon dioxide.) By injecting liquid carbon dioxide energetically into seawater, a resultant meshwork of hydrate and liquid carbon dioxide is formed which is positively buoyant. The meshwork mass will rise spontaneously as a whole immediately upon forming and will behave essentially the same as a hydrate meshwork formed from gaseous carbon dioxide and carbon dioxide hydrate.

(Advantages of liquid carbon dioxide over gaseous carbon dioxide stem from the fact that once the carbon dioxide is compressed, it can be transported to deeper depths without further compression. Thus, injecting liquid carbon dioxide at depths of five hundred meters or more—well below the liquidus—is possible without the need for deep, in-line pumps. Moreover, deeper (i.e., higher pressure) injection of liquid carbon dioxide will promote very rapid crystallization and growth of the hydrate crystals.)

When liquid carbon dioxide is used to form assisted buoyancy hydrate, dissociation is comparatively violent because the unhydrated liquid carbon dioxide trapped within the meshwork produces large volumes of carbon dioxide gas when the mixture rises above the liquidus. Thus, in addition to the carbon dioxide gas released by dissociation of the hydrate (which occurs above the carbon dioxide liquidus), the extra gas produced by conversion of the liquid carbon dioxide to gaseous carbon dioxide has the potential to cause significant turbulence and mixing. Therefore, flow of the hydrate should be controlled such that it enters the dissociation section while still within the hydrate stability field in order to preclude significant dissociation while residual interstitial saline water remains in the slurry.

Additionally, where carbon dioxide liquid is used to form assisted buoyancy hydrate, care should be taken to allow residual fluid to alter its state to gas once the hydrate has risen above the liquidus pressure depth, but while the hydrate remains stable. This will reduce turbulence and mixing when the hydrate finally dissociates.

Figure 12:
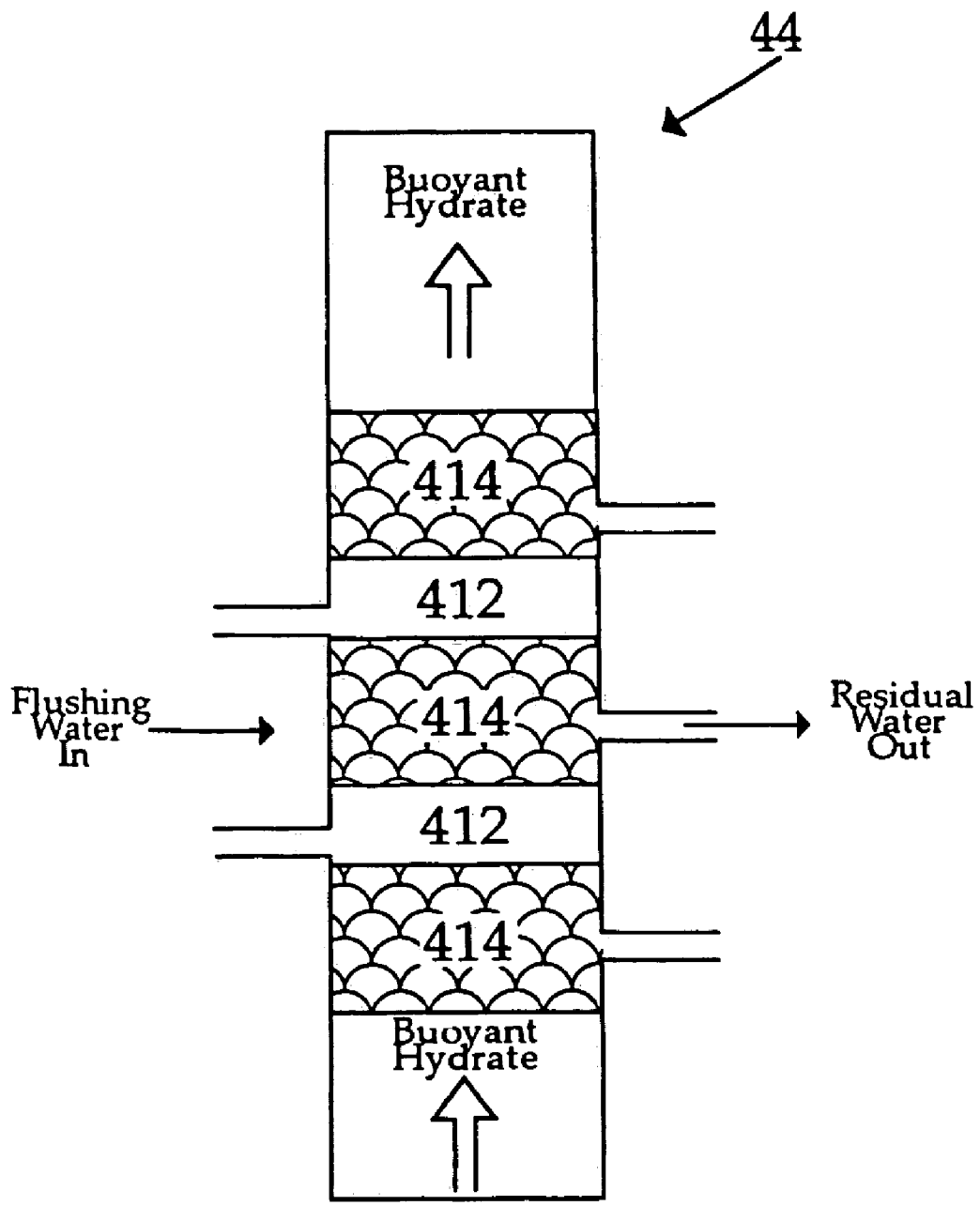
FIG. 12 is a diagrammatic, side elevation view of a residual fluid replacement section designed to facilitate washing of the hydrate slurry, as per the '422 application.

Ideally, according to the '422 application and its precursors, residual saline water should be replaced by fresh water before the hydrate rises into the gas-stable zone and then the dissociation area of the carbon dioxide hydrate phase diagram (FIG. 11). This can be accomplished using multiple water injection points alternatingly arranged between multiple residual or interstitial water removal sections, as illustrated in FIG. 12. In other words, the fluid removal section 44 (FIG. 2) is constructed as an alternating sequence of fresh water injection subsections 412 and fluid removal subsections 414 constructed as shown in either FIG. 3 or FIG. 4.

The benefits of removing the interstitial saline fluid include additional heat removal; washing of the slurry (i.e., removal of pollutants or adhering ions or particulate material from the surface of the hydrate crystals) by fluid replacement; and direct removal of saline interstitial water from the hydrate slurry and dilution or replacement of the original saline interstitial fluid produced by the process of hydrate formation.

Although washing of interstitial water is strongly recommended for the slurry mixture of liquid carbon dioxide and carbon dioxide hydrate—as well as for any hydrate being used for water purification, where possible—so as to minimize turbulence and mixing attributable to the liquid carbon dioxide converting to gaseous carbon dioxide, washing the slurry and flushing saline interstitial fluid therefrom would also provide benefits for any positively buoyant hydrate-based or assisted buoyancy hydrate-based system. In particular, injecting cold water (either fresh or gray) from the dissociation section into the hydrate slurry will remove additional heat from the hydrate at the same time that saline interstitial water is flushed from the hydrate slurry. Moreover, multiple residual water flushings will ensure greater fresh water production.

Figure 13:
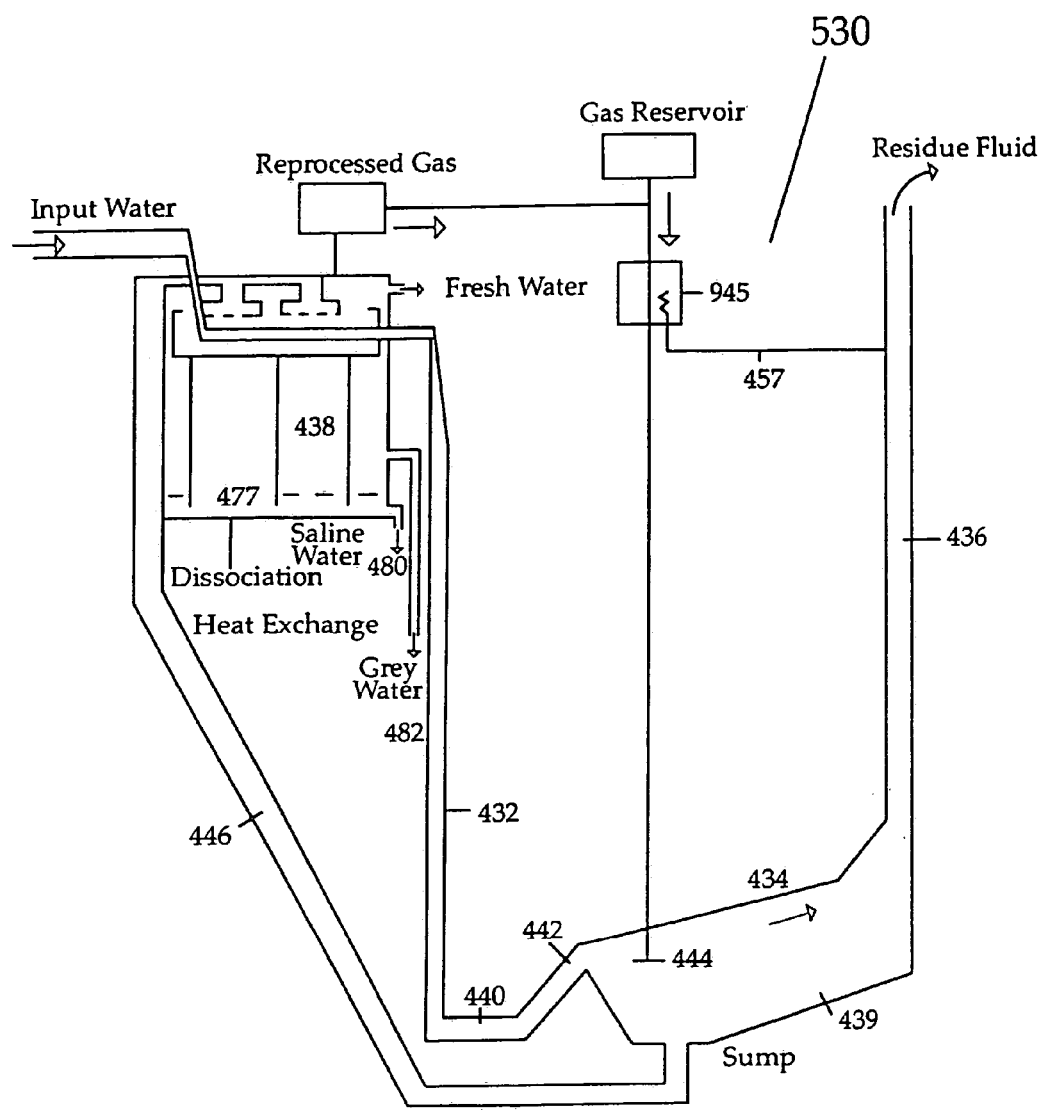
FIG. 13 is a diagrammatic, side elevation view of another embodiment of a desalination fractionation column which permits the utilization of a negatively buoyant hydrate, as per the '422 application, which embodiment facilitates separation of residual seawater from the negatively buoyant hydrate.
Figure 14:
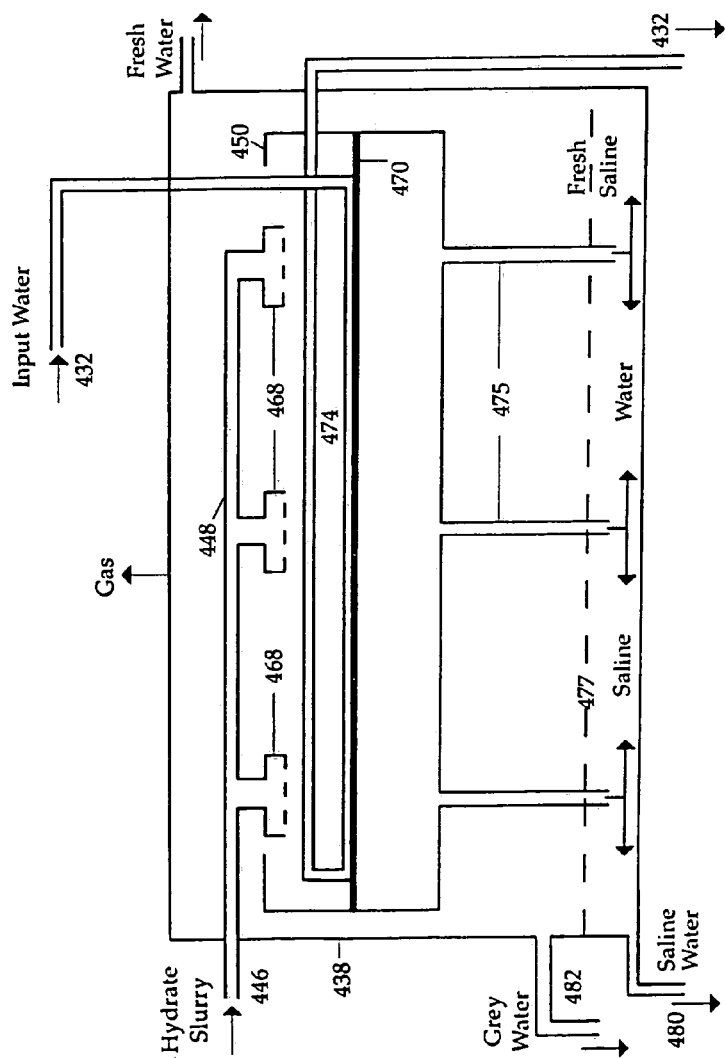
FIG. 14 is a diagrammatic, side elevation view of a slurry-holding, fluid separation apparatus used in the installation of FIG. 13, as per the '422 application.

Another embodiment 530 of a desalination fractionation "column" according to the '422 application and its precursors, which is configured to utilize negatively buoyant hydrate and which facilitates separation of the hydrate and residual seawater, is illustrated in FIGS. 13 and 14. The "column" is configured as an asymmetric, U-shaped installation, which consists primarily of a seawater, input conduit 432, a hydrate formation and catch sump region 434, and a residue fluid riser conduit 436. As in previous embodiments, the seawater input conduit passes through a dissociation and heat exchange region 438 which, in this embodiment, is configured especially as a hydrate "catch basin." As in the previous embodiments of the '422 application and its precursors, the input water is passed through the dissociation/heat exchange catch basin 438 in heat exchanging relationship with dissociating hydrate in order to chill the input seawater.

The input seawater is pumped to the base 440 of the column, where it turns and flows upward and laterally through elbow portion 442 before entering the hydrate formation and catch sump 434. Negatively buoyant hydrate-forming liquid or gas is injected into the input seawater in the hydrate formation and catch sump at 444. (Means 945 for liquefying certain gases are provided; residual fluid can be used in a heat exchanger 457 to provide cooling for the liquefication process.) Injection of the gas or liquid is controlled such that hydrate formation is complete (in contrast to incomplete, as in the case of the previously described, assisted buoyancy embodiment), i.e., such that all gas is utilized to form hydrate. The negatively buoyant hydrate settles to the bottom of the catch sump 434. As the hydrate settles, it displaces the residual seawater, which is warmed by the heat liberated during hydrate formation. The residual seawater therefore rises buoyantly through residue fluid riser conduit 436, and it is pumped out of the system to remove heat and create a cooling bias in the system as in the previously described embodiments.

In this embodiment according to the '422 application and its precursors, the rate of formation and settling of the hydrate is controlled such that it "packs" down to the point of being grain supported. Mechanical apparatus such as a vibration tray is located on the sloping floor 439 of the settling portion of the hydrate-residual fluid chamber 434. This concentrates the hydrate and minimizes residual fluid remaining so that the hydrate can be pumped rapidly, as a slurry, from the base of the sump up into the dissociation/heat exchange catch basin 438 via slurry pumping conduit 446. The hydrate slurry is pumped to the dissociation/heat exchange catch basin 438 at a rate that is generally faster than the rate at which positively buoyant hydrates rises in the previously described embodiments. Decreasing the time required to transfer the hydrate from the formation region (where it is at its maximum stability) to the dissociation region (where it is at its minimum stability) ensures that a greater proportion of the hydrate will dissociate relatively high in the catch basin. This reduces the amount of mixing of fresh and residue water and increases the relative proportion of fresh water that can be recovered.

Pumped hydrate slurry arrives in the dissociation/heat exchange basin in a concentrated form with little more than intergranular saline water present. Care is taken to allow the saline water to separate downward and fresh water upward so that there is a minimum of mixing. This is achieved by placing a slurry holder and fluid separator tank in the upper part of the dissociation/heat exchange chamber 438. This allows the negative buoyancy hydrate dissociation to take place so that saline water is delivered to and collects in the lower part of the dissociation chamber 438, in which the slurry holder and fluid separator tank is placed, without mixing with fresh water.

A preferred slurry holder and fluid separator consists of a fixed, wide-mouthed, upwardly open tank or tanks 450 (FIG. 14) that receive the hydrate slurry from above. Each tank holds the negatively buoyant hydrate from the hydrate slurry transfer system 446 and prevents it from sinking toward the base of the dissociation chamber 438. The hydrate slurry is delivered by pipes 448 to a number of hydrate spreaders consisting of vanes or rotating vanes designed to disperse the granular hydrate 468. The negatively buoyant hydrate separates while falling to a screen shelf 470 in the tank. This allows saline water to sink through the screen shelf at the base of the circulating input water intercooler system 474, which, according to the '422 application and its precursors, transfers heat from the input water to the dissociating hydrate and feeds the cooled water downward to be treated.

A number of residual water delivery pipes 475 extend downward from the base of this slurry holding tank, which allows heavier saline water to flow to the base of the vessel without disturbing the water surrounding these pipes. Thus, even when the fresh water-saline water interface is located in the vessel below the slurry holding tank, no mixing occurs between the residue water purged from each input of hydrate slurry because of a physical separation. According to the '422 application and its precursors, the main interface 477 (dashed line) between fresh and saline water will be located somewhere the lower part of the dissociation/heat exchange chamber 438, where saline water naturally collects below fresh due to density differences. Saline water is removed at the base of the chamber 480, and provision is also made for gray water removal as at 482.

Multiple slurry holding tanks may be placed within a given dissociation/heat exchange chamber so that the flow of hydrate slurry can be rapid enough to prevent clogging or freezing up of any one tank. As per the '422 application and its precursors, circulating input water may be passed first through one slurry holding tank and then through another to minimize temperature of the input water as it exits the dissociation/heat exchange chamber.

All fluids will find their relative positions according to natural buoyancy or through a process of fractionation. All internal piping in the vessel can be fabricated from inexpensive plastic or other material. This method of fluid separation may also be installed in the dissociation/heat exchange section of the assisted buoyancy and pumped sump embodiment shown in FIG. 8.

The slurry pumping conduit 446 may be constructed as a variable volume pipe, in order to permit periodic pumping of hydrate without allowing the hydrate to settle or move upward slowly. Such a variable volume pipe can be fabricated relatively easily by inserting a flexible sleeve within the slurry pumping conduit 446 around which fluid can flood when the pressure within the liner is reduced.

The injection point 444 of the hydrate-forming liquid or gas is positioned above the base of the column 440 so that in the event of incomplete hydrate formation (which would result in the formation of assisted buoyancy hydrate), any excess gas which does not form hydrate (along with assisted buoyancy hydrate) will rise up the residue fluid riser conduit 436. (Very little hydrate will escape with gas up the residue fluid riser conduit 436, and any such hydrate will have dissociated prior to arriving at the top of the residue riser section. Therefore, the amount of fresh water "lost" by being transported by such hydrate will be minimal; recovery of that fresh water is not feasible; and accordingly no connection is provided between the output of the residue fluid riser conduit 436 and the dissociation/heat exchange catch basin 438.)

For proper operation of this embodiment, flow rate controls such as constrictors should be used to keep the rate of flow of fluid through the system low enough to keep solid hydrate from being swept up the residue fluid riser conduit 436. Furthermore, the design of the hydrate formation and catch sump 434, as well as the lower portion of the residue fluid riser conduit, should be designed to facilitate "clean" separation of the hydrate from the residue fluid. Accordingly, the hydrate formation and catch sump 434 is designed to impart lateral movement to the residue fluid as well as to permit upward movement thereof. This causes the hydrate/residue fluid mixture to move initially with a relatively small upward component, which facilitates settling out of the hydrate and which is in contrast to the previously described embodiments, which provide more vertically oriented fluid movement that is comparatively turbid and which have poorer settling and separation characteristics.

In the embodiments of the '422 application described thus far, the weight of the column of water creates the pressures required for hydrate formation. In those embodiments, the minimum pressure depth at which hydrate is stable is far greater than at sea level, where the pressure is one atmosphere (0.10133 MPa). Accordingly, the hydrate begins to dissociate at relatively elevated pressures.

Various ones of the embodiments described above may be modified so as to collect the fresh water released from the hydrate and to capture the released gas at the region of the fractionation column where the dissociation takes place, rather than at the top of the column (surface level; one atmosphere ambient pressure), with certain resultant advantages. In particular, relatively large volumes of hydrate-forming gases and gas mixtures are required to desalinate large volumes of water. Therefore, if the gas is captured, processed for re-injection, and stored while maintained at elevated pressures (e.g., the pressure at which the hydrate begins to dissociate), the volume of gas that must be handled will be much smaller than would be the case if the gas were allowed to expand fully as it rises to the surface and pressure drops to atmospheric. Additionally, if the hydrate-forming gas is kept pressurized, raising its pressure to the pressure required for injection in the hydrate-forming section requires far less recompression of the gas and hence is less costly.

Figure 15:
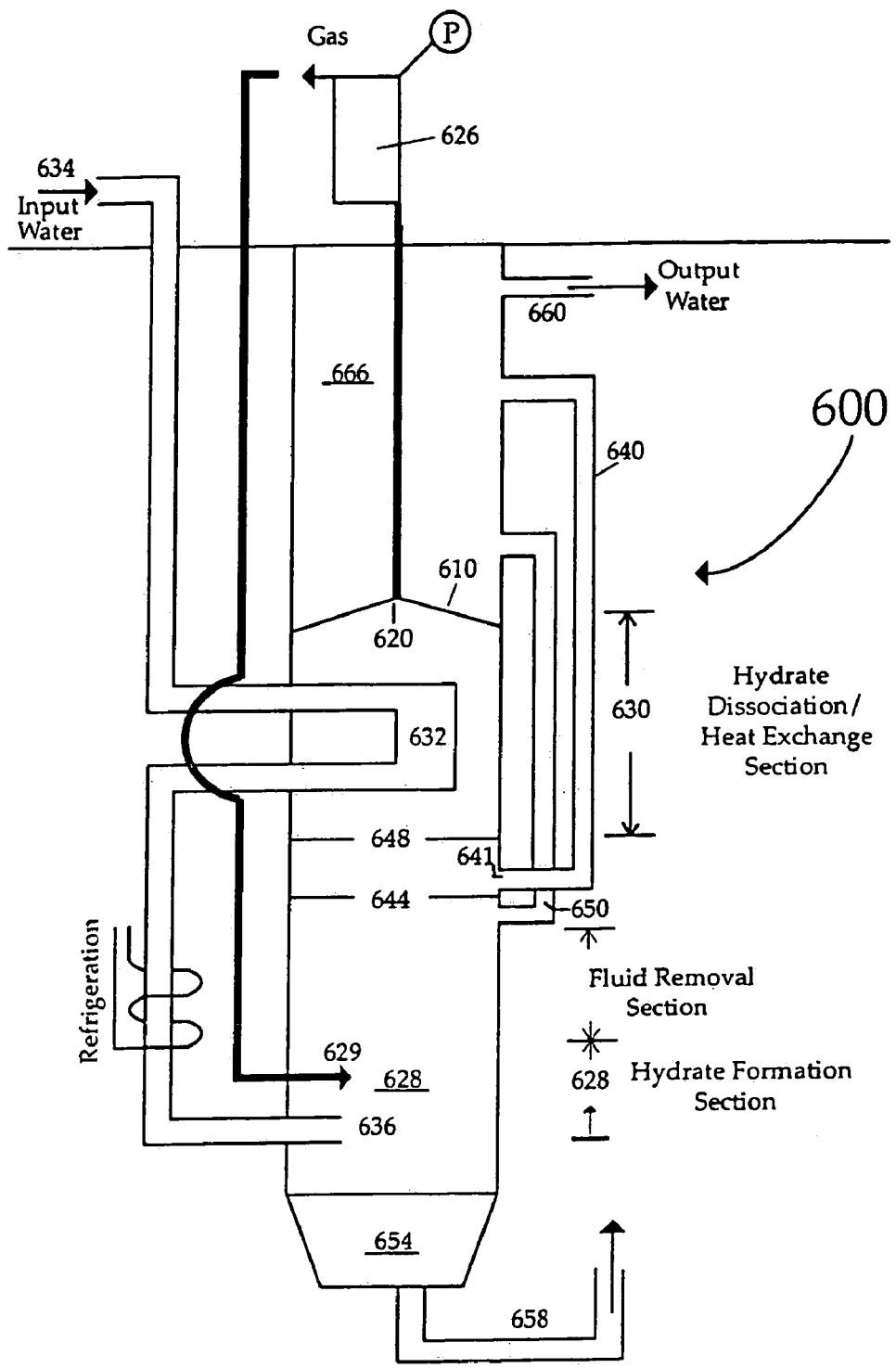
FIG. 15 is a diagrammatic, side elevation view of an embodiment of a desalination fractionation column configured to maintain the hydrate-forming gas at elevated pressure, as per the '422 application.

An embodiment 600 as per the '422 application and its precursors in which dissociation and gas capture and processing are controlled so as to be kept at elevated pressure is illustrated in FIG. 15. In this embodiment, a physical barrier 610 extends across the fractionation column and blocks the upward movement of the hydrate slurry. The location of the barrier 610 depends on the stability limits of the particular hydrate-forming substance used, but will be above the region of hydrate stability (i.e., at lesser pressure depth). As the hydrate dissociates, the released gas forms a pocket at trap 620 and enters a gas recovery and processing system 626 while still at a pressure depth considerably greater than one atmosphere surface pressure. (The gas processing system 626 may contain means for liquefying certain gases.) The gas is processed and re-injected into the hydrate formation section 628 at 629 in the same manner as in the previously described embodiments, except the gas system is maintained at considerably higher pressure.

The hydrate dissociation section 630 extends downward to some particular depth determined by the particular hydrate-forming gas being used. Because the hydrate dissociates under "controlled," elevated pressure, the dissociation reaction will proceed generally more slowly than in the above-described embodiments. Therefore, the heat exchanger 632 present in the dissociation/heat exchanger section (as described in connection with previous embodiments) is designed to accommodate the particular, slower reaction rates. As per the '422 application and its precursors, input water 634 is passed through the dissociation/heat exchange section in heat exchanger 632 and is injected into the base of the desalination fractionation column at 636, as in previously described embodiments.

One or more fresh water bypass pipes 640 communicate with the dissociation region at a point 641 located above the fresh water/saline water interface 644 but below the upper boundary 648 of the hydrate stability field. The pipe(s) 640, which are screened or otherwise configured to prevent hydrate from entering them, deliver fresh water released from the hydrate to fresh water accumulation region 666. A gray water return pipe 650 allows denser, more saline gray water to flow back down into the saline fluid below the fresh water/saline water interface 644. More highly saline residual water and/or negatively buoyant hydrate is drawn from the sump 654 and processed or removed as at 658, as in previously described embodiments. Output fresh water, some of which may be returned to the fluid removal section for purposes of washing interstitial saline water as described above (not shown), is drawn off at 660, near the top of the fresh water accumulation region 666 and well above the physical barrier 610.

It is contemplated that the physical barrier 610, the fresh water and gray water return pipes 640, 650, and the heat exchanger in the dissociation/heat exchange section 630 may be configured such that their positions can be varied, thereby permitting different hydrate-forming liquids, gases, or gas mixtures to be used in the same installation. The physical barrier 610 and heat exchanger might be vertically adjustable, whereas a series of bypass and return pipes 640, 650 having different inlet locations can be provided and opened and closed remotely using suitable inlet and outlet valves. In this manner, changing from one hydrate-forming substance to another can be effected very quickly and conveniently.

By holding and fully processing for re-injection the hydrate-forming gas while it is still under pressure, considerable economies of operation can be achieved. The variation in the pressure of the liquid or gas, from that required for formation of the hydrate down to that at which fresh water is released from the hydrate, can be kept to a minimum. This, in turn, minimizes the energy cost associated with pumping the captured hydrate-forming gas from above the dissociation/heat exchange section back down to the hydrate-forming section at the base of the apparatus, particularly considering the fact that, percentagewise, the greatest change of pressure in a hydraulic column (such as any of the above-described embodiments) takes place in the upper portions of the column. Moreover, the volume of the gas to be handled (and accordingly the size of the gas handling equipment and facility) will also be reduced significantly.

As an alternative (not shown) to the configuration shown in FIG. 15, the upper part of the desalination fractionation column can be sealed and pressurized by means of an associated hydraulic standpipe, thereby causing pressures within the apparatus near the surface to be equivalent to the pressure-height of the standpipe. Where the standpipe is implemented in tall structures (such as adjacent buildings near the desalination facility), relatively high pressures can be created in the topmost part of the dissociation/heat exchange section, which is at ground level.

In further embodiments of the invention as per the '422 application and its precursors, the water may be desalinated or-purified in self-contained, mechanically pressurized vessels. Such embodiments offer a number of advantages, including the fact that the installations can be of various sizes and shapes to suit local conditions, containment constraints, and fresh water requirements. Moreover, whereas the previously described embodiments are relatively large-scale and therefore are of a fixed, permanent nature, self-contained, pressurized embodiments can be more temporary in nature in terms of their construction and their location. Individual pressurized installations can occupy relatively small spaces and produce fresh water efficiently, even in low volumes. Such installations can be fabricated at central manufacturing facilities and installed on site with a minimum of local site construction, which site might be a building or even a ship or other mobile platform.

Figure 16:
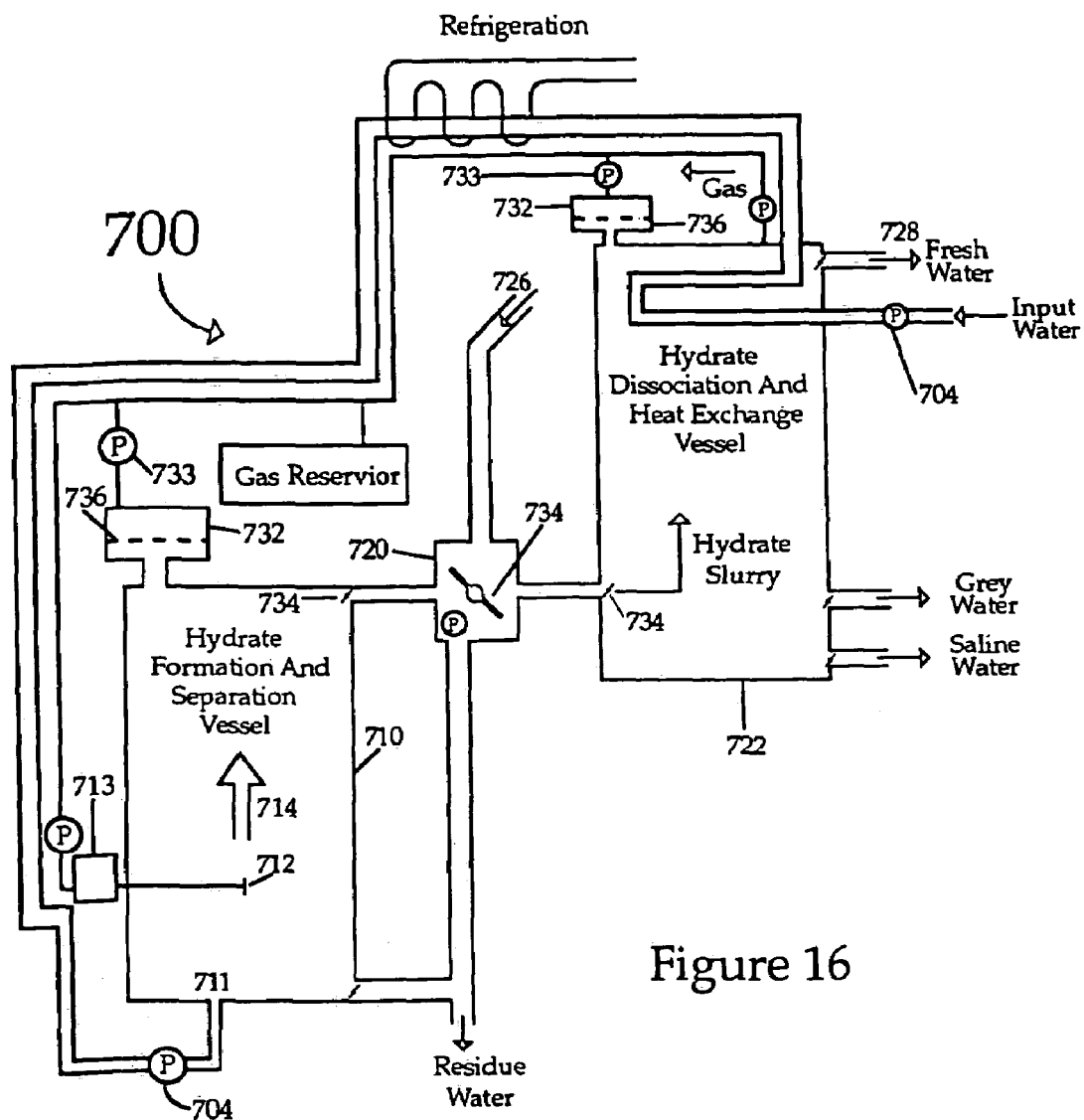
FIG. 16 is a diagrammatic, side elevation view of an embodiment of a mechanically pressurized desalination system configured to use positively buoyant hydrate, as per the '422 application.

A mechanically pressurized installation per the '422 application, configured to use positively buoyant hydrate to extract fresh water from seawater, is illustrated in FIG. 16. Input water is pumped and pressurized from input pressure to the operating system pressure by pump 704. The water enters the pressurized hydrate formation and separation vessel 710 at water input 711, and a suitable, positively buoyant hydrate-forming substance is injected at injection point 712. (Means 713 for liquefying certain gases are provided where this is advantageous to the desalination process.) Positively buoyant hydrate 714 spontaneously forms and rises through the residual water, as in previously described embodiments, to the top of the vessel 710 where it accumulates and concentrates.

The buoyant hydrate slurry is subsequently admitted into transfer and washing section 720, and then into the dissociation/heat exchange vessel 722; (Flow of the hydrate slurry is regulated by valves 734.) While in the transfer and washing section 720, the hydrate may be washed of the residual, intergranular saline fluid using fresh water 726 tapped from the fresh water output 728. More than one wash cycle may be used to completely flush residual fluid, although the number of washings will depend on the effectiveness of separation through fractionation (which may vary for different gases and gas mixtures) and the nature of the crystalline fraction of the slurry. In some cases, no washing may be necessary.

Pressure is maintained in the hydrate formation and separation vessel 710 and in the dissociation/heat exchange vessel 722 by pressure balance reservoir systems 732 (one for each vessel), and movement of fluid from one vessel to the other is controlled by varying pressure and using the in-line valves 734. The systems 732 each have a pressure pump 733 and a diaphragm or gas-fluid interface 736, which are used to raise and lower pressure in each vessel. Pressure in the vessels is controlled so that the hydrate remains stable as hydrate until it is finally collected and concentrated at the top of the dissociation vessel 722. This is because premature dissociation will release considerable amounts of gas and therefore will cause undesired mixing. Moreover, pressure conditions in the dissociation vessel should be controlled to minimize turbulence in the fluid-gas mixture and to promote efficient separation of saline and fresh water.

The dissociation and heat exchange vessel 722 may be constituted by a number of linked, heat-exchanging devices in a number of different water treatment chambers. The actual size, throughput, etc. will depend on the overall system production rate which, in turn, will depend on the temperature of the input water, the particular liquid, gas, or gas mixture used to form the hydrate, the rate at which heat can be removed from the system, etc. Fractionation, concentration, separation, drying, and re-use of the hydrate-forming gas takes place in the same manner as in the previously described embodiments. Additionally, heat produced by liquefying hydrate-forming gas can be absorbed and removed using heat exchangers containing residue or saline fluids.

It will be appreciated that the mechanically pressurized process per the '422 application and its precursors is inherently less continuous than the previously described embodiments and is essentially a batch process. Pressure in the system is controlled so as to simulate the pressure variation in the previously described embodiments: the water-to-be-treated is pressurized and injected into the apparatus, and then pressure is raised and lowered to control the rate of the hydrate formation and dissociation reactions.

Mechanically pressurized embodiments provide increased versatility in that pressures may be controlled to provide the optimum pressures for formation of hydrate and to control the rate of dissociation. Moreover, different liquids, gases, and gas mixtures can be used within the same apparatus, and the same water can be processed more than once using different liquids, gases, and gas mixtures.

Figure 17:
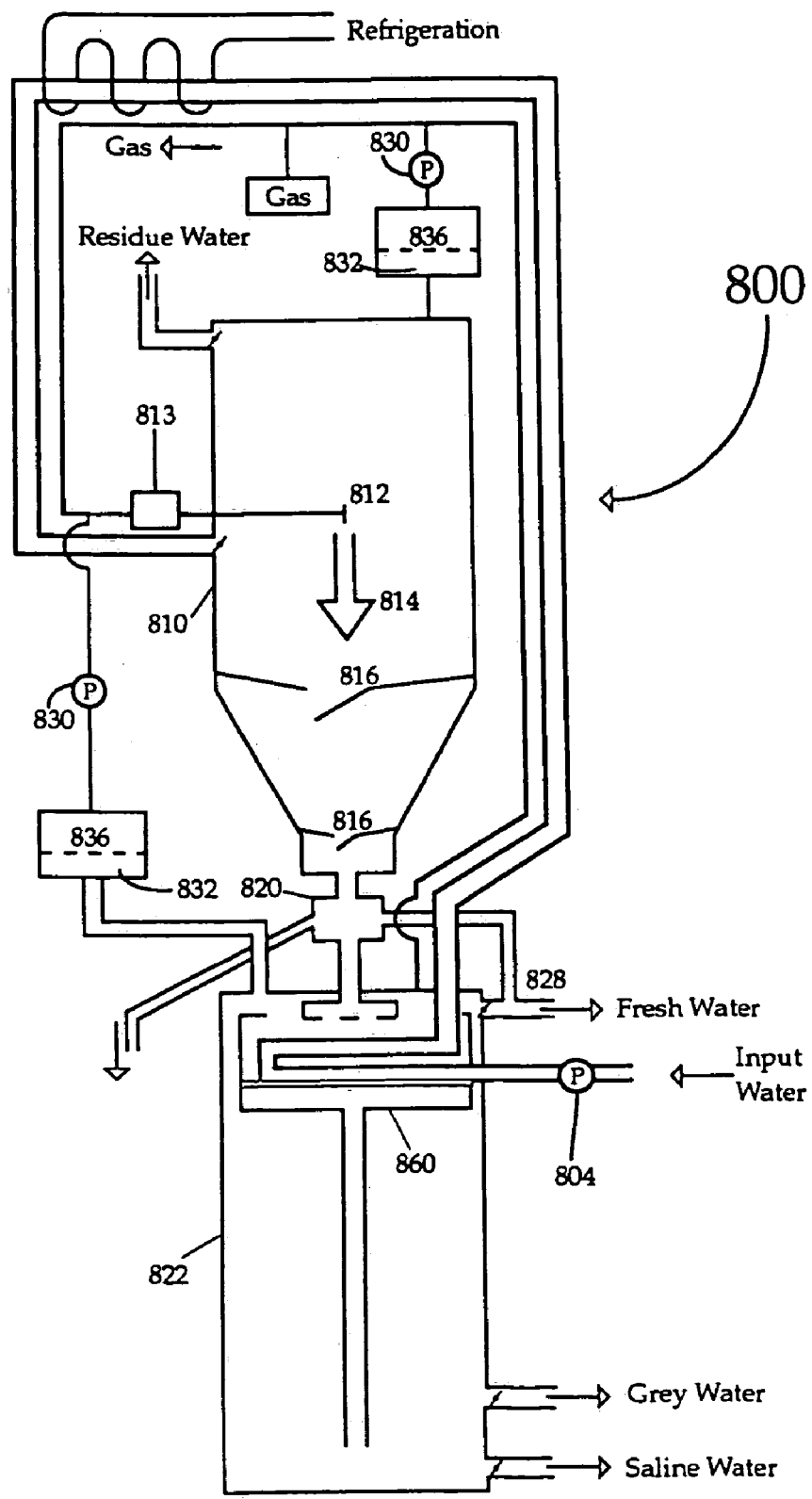
FIG. 17 is a diagrammatic, side elevation view of an embodiment of a mechanically pressurized desalination system which is similar to that shown in FIG. 16 but which is configured to use negatively buoyant hydrate, as per the '422 application.

A further mechanically pressurized embodiment 800 per the '422 application and its precursors, which embodiment utilizes negatively buoyant hydrate to extract fresh water from water-to-be-treated, is shown in FIG. 17. Input water is pumped from input pressure up to the operating system pressure and into the pressurized hydrate formation and separation vessel 810 by pumps 804, and a suitable, negatively buoyant hydrate-forming gas is injected at injection point 812. (Means 813 for liquefying certain gases may be provided.) Negatively buoyant hydrate 814 spontaneously forms and sinks through the residual water, as described in connection with previously described negatively buoyant hydrate embodiments per the '422 application and its precursors, and collects and concentrates in gated sump isolation sections 816, which are opened and closed to control passage of the hydrate therethrough.

As in the previously described mechanically pressurized embodiment, pressure is maintained in the system by pressure balance reservoir systems 832 (one for each vessel), and movement of the fluid can be controlled by varying the pressure in the system compartments. Pressure pumps 830 and diaphragms or gas-fluid interfaces 836 are used to raise and lower pressure in each vessel independently.

As the hydrate slurry passes through the transfer and washing section 820 and into the dissociation/heat exchange vessel 822, it may be washed of the residual, intergranular saline fluid with fresh water tapped from the fresh water output 828, which removes salt from the hydrate slurry prior to dissociation.

Subsequently, the hydrate is permitted to flow downward from the transfer and washing section 820, and into the hydrate dissociation and heat exchange vessel 822, where it dissociates and fresh, gray, and saline water are removed. Heat exchange between the input water and the dissociating hydrate slurry occurs as described in previous embodiments as per the '422 application and its precursors. Dissociation takes place under controlled pressure conditions to minimize turbulence in the fluid-gas mixture and to promote efficient separation of saline and fresh water.

A slurry holder and fluid separator tank 860 is provided in the upper part of the dissociation/heat exchange vessel 822 and is similar in construction to that described above and shown in FIGS. 13 and 14. The tank 860 minimizes mixing of fresh and saline water by providing a conduit for the residual saline water to sink to the bottom of the vessel, which conduit isolates the saline water from the lower density fresh water.

As in the case of the mechanically pressurized, positively buoyant hydrate embodiment of the '422 application and its precursors, the dissociation and heat exchange vessel 822 may be constituted by a number of linked, heat-exchanging devices in a number of different water treatment chambers. The actual size, throughput, etc. will depend on the production rate which, in turn, will depend on the temperature of the input water, the particular liquid, gas, or gas mixture used to form the hydrate, the rate at which heat can be removed from the system, etc. Fractionation, concentration, separation, drying, and re-use of the hydrate-forming substance takes place in the same manner as in the previously described embodiments of the '422 application and its precursors.

Figure 18:
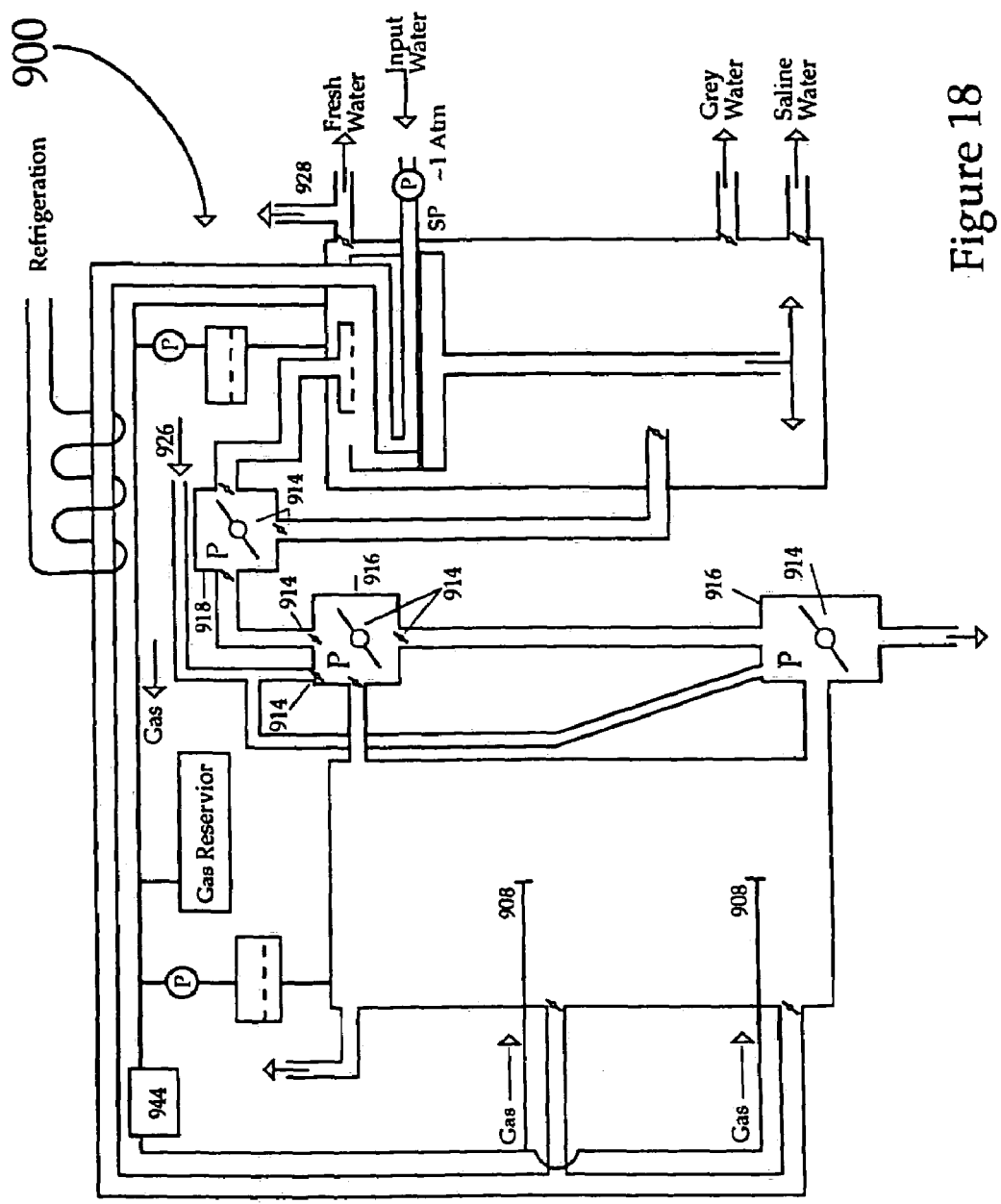
FIG. 18 is a diagrammatic, side elevation view of an embodiment of a mechanically pressurized desalination system configured to use either positively or negatively buoyant hydrate, as per the '422 application.

Another embodiment 900 according to the '422 application and its precursors, which embodiment provides greater versatility by using either positively or negatively buoyant hydrate to extract fresh water from seawater or polluted water, is shown in FIG. 18. Pumps P and in-line valves 914 are provided throughout the system. Operation, depending on the particular hydrate-forming substance used, is as described in the pressurized vessel installations using either positively or negatively buoyant gas hydrate.

This embodiment is useful where the gas or gas mixture supply is uncertain as a variety of gases may be used. Embodiments of this type could be useful in disaster relief or in expeditionary military activity, or at any place where a temporary supply of fresh water is required without a significant construction requirement. This embodiment contains all the attributes of both the positive and negative buoyancy hydrate, mechanically pressurized desalination fractionation embodiments, including use of fresh water 926 from the fresh water output 928 to flush residual saline water. Multiple liquid or gas injection points 908 are provided, as well as provision for handling either positively or negatively buoyant hydrate. In particular, multiple pumping units P and fluid control valves 914 are provided to direct the flow of fluids and hydrate slurries in fluid control and washing units 916 and hydrate slurry control units 918. The gas processing system 944 includes means for liquefying certain recovered gases and gas mixtures.

As in the above-described embodiments in which the weight of the column of water generates the requisite pressures, any of the mechanically pressurized vessel installations may be simplified by feeding the input water into the system without passing it through the dissociation section for heat exchange. More artificial refrigeration will need to be provided, but operation will otherwise be the same as for the positive and negative buoyancy hydrate embodiments shown in FIGS. 16 and 17 and the "combined" pressurized apparatus as shown in FIG. 18.

Figure 19:
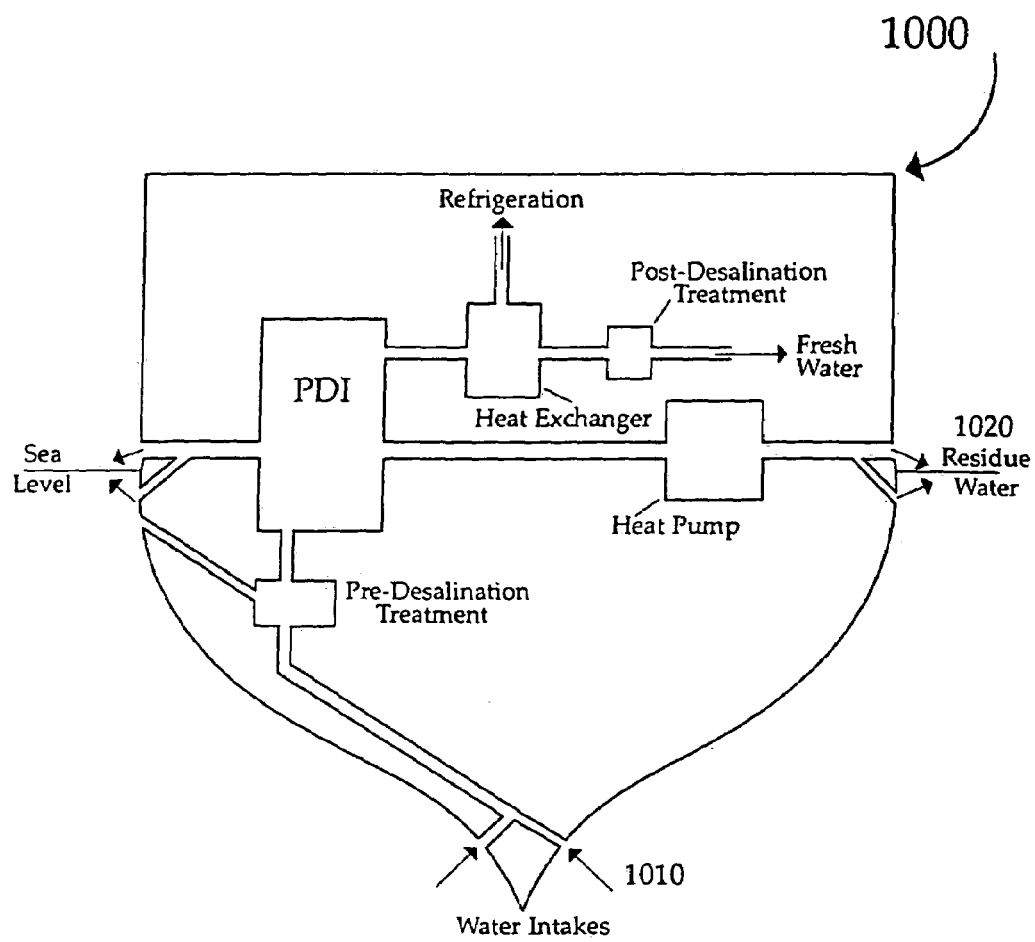
FIG. 19 is a generalized, diagrammatic depiction of a mechanically pressurized desalination system located on a ship, as per the '422 application.

As noted above, mechanically pressurized embodiments of the invention may be extremely mobile. In the case of a ship-borne installation (FIG. 19), for example, water-to-be-treated is processed as described in previous embodiments, but in a smaller and more compact installation built right on board the ship 1000.

Negatively buoyant hydrate formed from a liquid or gas (such as carbon dioxide) that is non-combustible at the pressures and temperatures of this system and the surrounding ambient conditions is preferred, especially where installations are placed in ships or where the handling of combustible gases constitutes a hazard.

In the ship-borne embodiment as per the '422 application and its precursors, some of the heat produced by the hydrate formation reaction is extracted by heat exchangers in the hydrate formation and concentration vessel (which is possible because of the immediate access to seawater), and further heat is extracted from the hydrate slurry in the hydrate slurry transfer system. This pre-dissociation heat extraction maximizes the cooling effect of the hydrate dissociation because removing heat in addition to that removed with the residual treated fluid allows dissociation to begin with the hydrate slurry at a lower temperature than would exist otherwise. Thus, the fresh water produced will be significantly cooled. This cooled water can be used to absorb heat and hence can be used to provide refrigeration or air-conditioning. The fresh water is treated as described in previous embodiments, and warmed residual water may be used as a low-grade heat source (although it is more likely to be pumped back to the sea).

Installation aboard a ship is ideal for the mechanically pressurized hydrate fractionation method of desalination. This is because the residual treated water can be returned to the sea immediately, thereby maximizing efficiency of the heat-removal process. The water intake for the desalination ideally would be placed as low on the keel 1010 of the ship as possible to separate intake and residual water return and to minimize uptake of pollutants, which in the case of oil-based products and many industrial chemicals either float or are usually found in increasing proportion closer to the sea surface.

Aboard ship, the return fluid can have multiple outlets 1020, which allows it to be returned to the sea closer to the surface where the warmer water will float well away from the water intake. In addition, movement of the ship creates considerable turbulence which will promote mixing of the residual water and near-surface water when the ship is under way. When the ship is tied up, water from a shore source can be used or the system can be recycled with fresh water to minimize residual water return, and the desalination fractionation system can be operated at a minimal level, i.e., at a level just sufficient for the thermal balance required for normal operation to be attained quickly. Where the ship is moored or otherwise maintaining a static position, the residual water can be returned to the sea directly. Wind and tide can be taken into consideration to select the return outlet utilized so as to minimize environmental impact and allow the residual water to be carried away from the ship most efficiently.

Similar compact installations can be fabricated as pre-packaged components that can be airlifted or easily flown and trucked to a particular site—for instance, immediately following a disaster such as an earthquake—and assembled rapidly. Where temporary or mobile installations are operated, more compact versions of the intake, outfall, and gas processing apparatus similar to that described for FIG. 1 are employed. These can be specially designed for light weight, ease of deployability, and ability to operate in a variety of conditions. Power generating units or power cables suitable for drawing electricity from any inshore powerboat or other supply are also part of the mobile apparatus, and possibly also part of larger temporary facilities.

Pressurized vessel desalination fractionation installations can also be mounted on pallets for shipment in aircraft or ships or in standard commercial shipping containers (for which cargo handling equipment exists world-wide) to facilitate air and road travel. They can be mounted on vehicles or set up on a pier, or anywhere near seawater or other water to be desalinated or purified.

Finally, once the seawater has been cycled through the pressurized vessel desalination fractionation column and downstream processing applications a desired number of times as per the '422 application and its precursors, the residual seawater is simply pumped back to sea or retained for those who desire it.

As noted above, one reason carbon dioxide is an ideal gas to use for hydrate desalination or purification is that it is extremely common and, in fact, is typically found in industrial waste products—particularly in the exhaust gases produced when burning fossil fuels. For the most part, the exhaust produced when burning fossil fuels typically contains water vapor, hydrogen sulfide, carbon dioxide, carbon monoxide, and nitrous oxides (NOx) and nitrogen which passed through the combustion process in addition to soot and other particulate waste matter.

Figure 20:
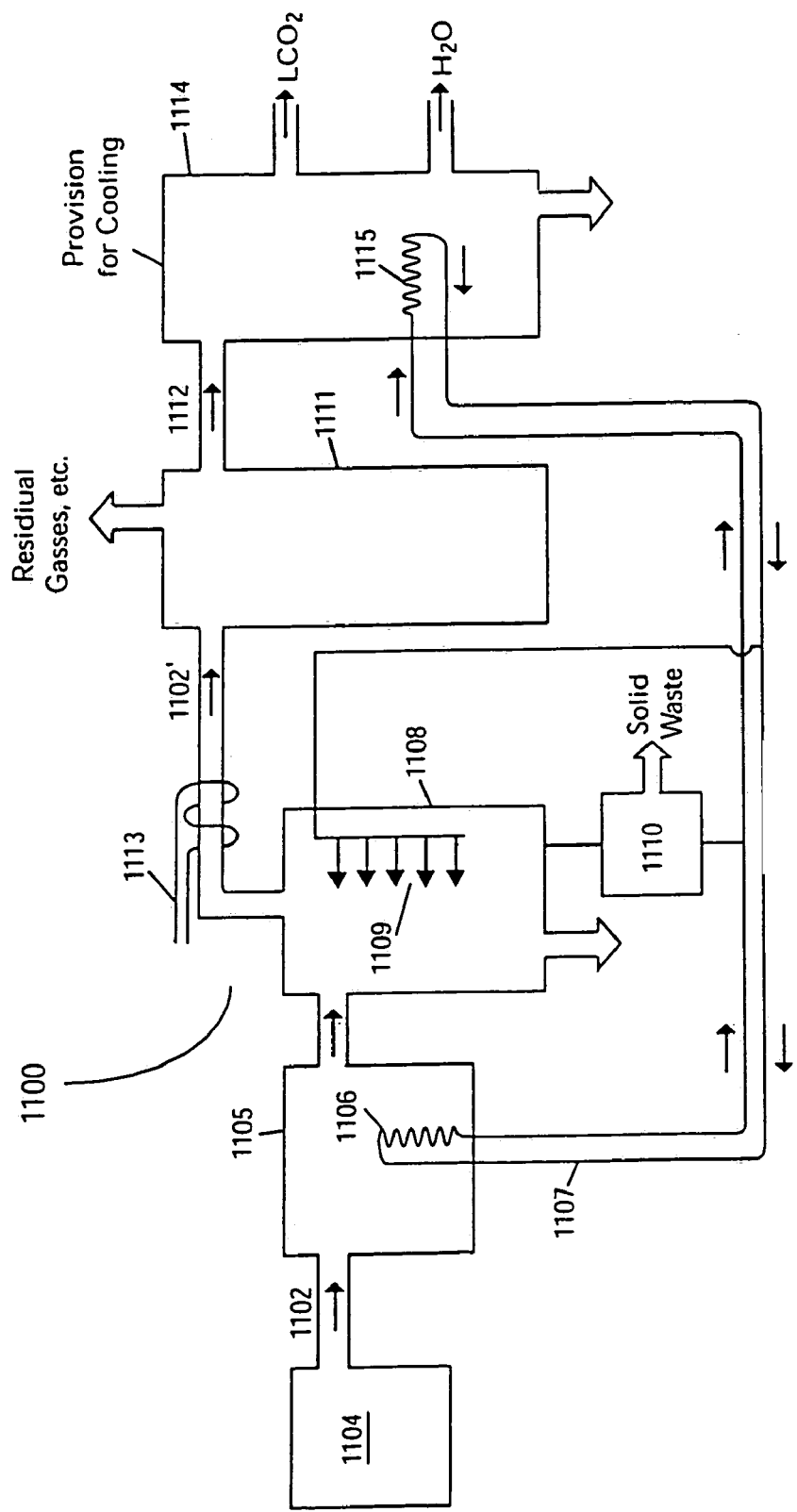
FIG. 20 is schematic diagram illustrating the components of a system configured to produce liquid carbon dioxide and fresh water using industrial exhaust gas as the supply of carbon dioxide to form hydrate, as per the '422 application.

When using industrial exhaust as the source of carbon dioxide for desalinating or purifying water—such purification may be the primary objective of the process, e.g., to produce potable water, or it may be simply a means for capturing carbon dioxide from the waste gas emissions for purposes of reducing "green house gases" and their associated environmental harm, with the production of fresh water being a "side" benefit—certain provisions for pre-processing the gas must be made. In particular, an installation 1100 according to the '422 application for simultaneously capturing carbon dioxide from industrial waste gases and producing desalinated or purified fresh water is illustrated in FIG. 20. Exhaust gas 1102 produced by the combustion of fossil fuels in industrial plant 1104 is fed through dry processing/preprocessing means 11105. The raw exhaust gas is pretreated using filters, absorbents, electrostatic means, chemical sorption techniques, and/or catalysis to remove most of the non-carbon dioxide components. The exhaust gas must also be cooled substantially in order for the carbon dioxide hydrate to form, and the preprocessing means 1105 may include means 1106 for such cooling, e.g., heat exchangers through which the exhaust gas flows.

Figure 21:
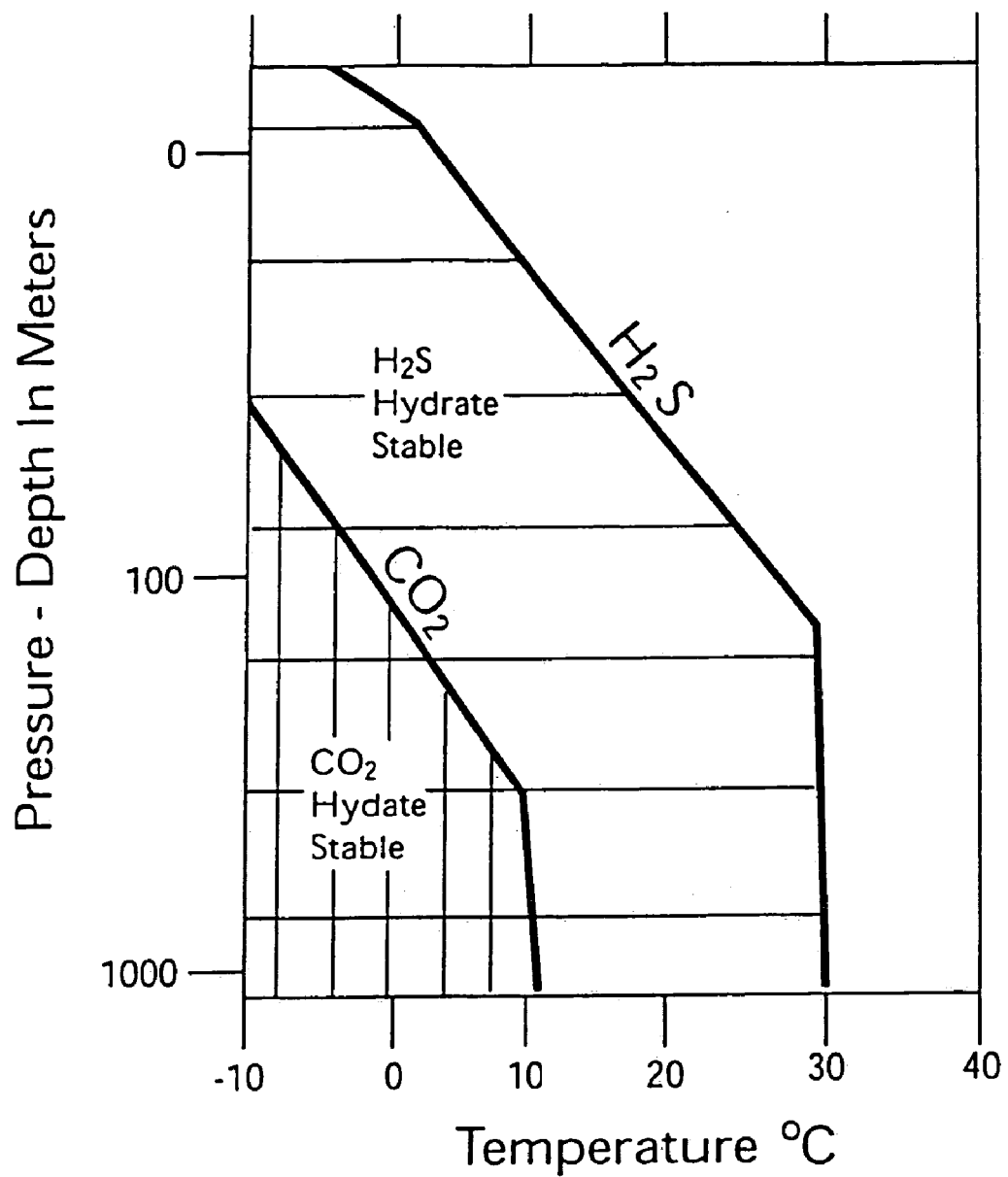
FIG. 21 is a phase diagram illustrating the relative pressure/temperature conditions at which hydrogen sulfide and carbon dioxide hydrate form, as per the '422 application.

Before being introduced into hydrate formation vessel 1111, the exhaust gas passes through washing/hydrate-forming prechamber 1108. Prechamber 1108 may be a largely water-filled chamber that can be pressurized. When the prechamber 1108 is, in fact, so pressurized, the exhaust gas passes through the water in the chamber under pressure conditions sufficient to form hydrogen sulfide hydrate. As illustrated in FIG. 21, hydrogen sulfide hydrate will form at pressure/temperature conditions well above those required for carbon dioxide hydrate to form, and therefore the majority of the hydrogen sulfide components of the exhaust gas not removed in the previous, preliminary processing can be removed by forming hydrogen sulfide hydrates in the prechamber 1108 and then removing it, e.g., in a solid hydrate flush.

The washing residue from the exhaust gas will consist of solids formed from soot, partially combusted hydrocarbons, small amounts of metals and salts, and, when the prechamber 1108 is suitably pressurized and there is hydrogen sulfide in the exhaust gas, hydrogen sulfide hydrate. (The solids will constitute only very small proportions of the exhaust gas.) When it is produced, the hydrogen sulfide hydrate subsequently will dissociate into hydrogen sulfide and water; with the attendant production of sulfuric acid and other hydrogen-oxygen-sulfur compounds, and along with the remaining solid waste will constitute hazardous material in concentrated form which needs to be disposed of using appropriate means that will be known to those having skill in the art.

The density of hydrogen sulfide hydrate, which has not been studied extensively, has been calculated to be 1.05 g/cc and has been measured at between 1.004 g/cc at 1 Mpa and 1.087 g/cc at 100 Mpa. Thus, its density is very close to that of fresh water. Therefore, if the prechamber 1108 is filled with water, the hydrogen sulfide hydrate will not separate from the water in the prechamber 1108 by sinking, particularly when large volumes of gas are rising quickly through the prechamber. Under conditions of low turbidity with gas bubbles rising through the water bath, the hydrogen sulfide hydrate will tend to rise near the surface of the water in the prechamber 1108, where it will accumulate and form a hydrate-rich layer through which the exhaust gas bubbles. On the other hand, because the large volume of exhaust gas rising through the water in the prechamber 1108 will cause extreme turbidity, the hydrogen sulfide hydrate is unlikely to separate out naturally by means of gravity fractionation. Therefore, in the case of a water-filled prechamber 1108, the prechamber will have to be flushed periodically, which precludes operating the process on a continuous basis.

Alternatively, if the prechamber 1108 is pressurized and largely gas-filled, a spray of water 1109 taken from the heat exchange system 1107 can be used to wash and cool the exhaust gas efficiently while allowing hydrogen sulfide hydrates to form. The water spray fills all but the lower part of the prechamber with a mist of droplets that fall to the bottom of the vessel. (Water evaporating out of the mist and subsequently passing into the hydrate formation vessel 1111 would simply become part of the fresh water product.) Solid matter and any hydrogen sulfide hydrate that forms is separated from the wash water, which is heated as it cools the exhaust gas, by means of separation filter 1110. (A separation filter 1110 may also be used in an embodiment per the '422 application in which the prechamber 1108 is pressurized and water-filled, as described immediately above, to filter the wash water.) The solid waste will consist of concentrated hazardous materials that must be disposed of according to recognized practices, and the heated wash water is passed back into the heat exchange system 1107.

After it has been cooled sufficiently by intercoolers 1113 for hydrate to form spontaneously under operational pressure and temperature conditions, e.g. by processes as described previously for cooling the input water, the fully preprocessed exhaust gas 1102' then passes into hydrate formation vessel 1111. The hydrate formation vessel 1111 is pressurized and is configured essentially the same as the pressurized hydrate formation vessel shown in FIG. 17 or, to the extent it is configured for the production of negatively buoyant hydrate, the pressurized vessel shown in FIG. 18. As is the case with those two embodiments, saline or polluted water and the exhaust gas containing the carbon dioxide are introduced into the hydrate formation vessel 1111 and pressure and temperature conditions are controlled so as to form carbon dioxide hydrate, as described previously. (As in the previous embodiments, this will be done on a batch basis as opposed to continuously.) Residual gases such as nitrogen oxide are purged from the system.

The carbon dioxide hydrate 1112 is then transferred to pressurized hydrate dissociation vessel 1114, which may be located below the hydrate formation vessel 1111 as shown in FIG. 17 or, as shown in FIG. 20, adjacent to the hydrate formation vessel (similarly to as shown in FIG. 18). The hydrate dissociation vessel 1114 is shown in greater detail in FIG. 22. It is generally similar to the pressurized hydrate dissociation vessels shown in FIGS. 17 and 18, but differs in that a heating element 1115, which preferably constitutes part of the system's heat exchange subsystem 1107, is provided along with an additional outlet 1120 for the removal of liquid carbon dioxide from the vessel. Concentrated carbon dioxide hydrate slurry is introduced into the vessel 1114, as described previously, and the introduction of it into the vessel is controlled by means of valve mechanism 1122 so that the carbon dioxide hydrate slurry is introduced on a batch basis. (This is necessary because the pressure in the hydrate dissociation vessel will rise to greater than that in the hydrate formation vessel 1111.) Alternatively, according to the '422 application, in-line slurry pumps can be used to maintain higher pressure in the downstream hydrate dissociation vessel. The hydrate is held in the upper part of the vessel 1114 by a screen 1113 within the tray 1124, where the hydrate dissociates.

Figure 23:
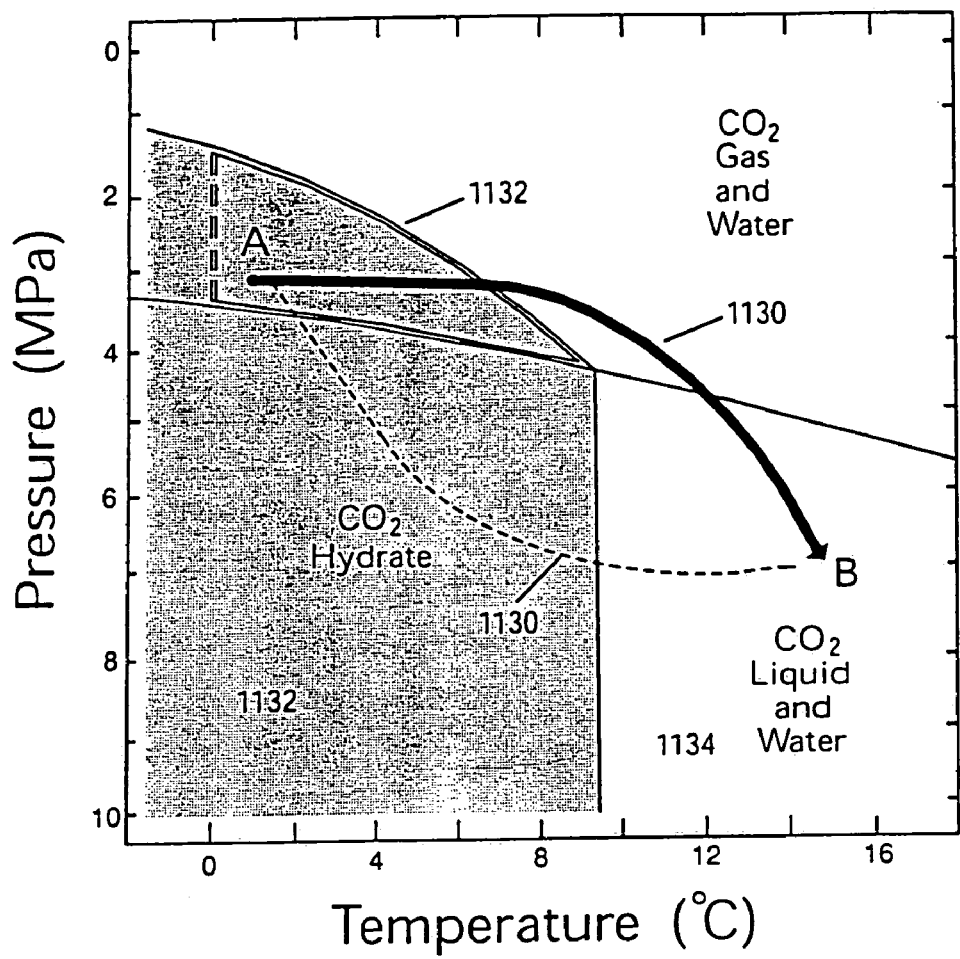
FIG. 23 is a phase diagram illustrating P-T pathways along which carbon dioxide hydrate is allowed to dissociate in the dissociation vessel shown in FIG. 22, as per the '422 application.

By controlling the temperature and pressure conditions within the vessel 1114, dissociation of the carbon dioxide hydrate is managed so as to produce fresh water (as described above in connection with the previous embodiments of the '422 application and its precursors) and liquid carbon dioxide (in contrast to gaseous carbon dioxide). In particular, as shown in FIG. 23, when the hydrate is introduced into the dissociation vessel 1114, it is introduced under pressure and temperature conditions in the hydrate stability field in the vicinity of point A, i.e., under conditions at which the hydrate remains stable. (Pressure within the dissociation vessel 1114 may be controlled by means of a pneumatic standpipe 1126 by admitting an inert gas into the standpipe using valve 1128.) The temperature within the dissociation vessel 1114 may then be permitted to rise, e.g., by absorbing heat from the surroundings or, more preferably, is caused to rise by actively adding heat removed from the hot exhaust gas back into the system via heat exchanger 1115. Alternatively, the temperature may be caused to rise advantageously by passing the hot exhaust gas around the dissociation vessel 1114 through conduits (not shown) before the exhaust gas is preprocessed in means 1106 and 1108.

As heat being input from the heat exchange system causes the temperature to rise, the system moves to the right along the P-T path 1130 and crosses phase boundary 1132 as per the '442 application, at which point the hydrate dissociates into carbon dioxide gas and fresh water. Because the vessel is sealed, however, as the hydrate continues to dissociate, the pressure and accordingly the temperature continue to rise. As the temperature and pressure increase, the system continues to move toward the right along P-T path 1130, but the pressure rises at a sufficient rate that the P-T curve 1130 along which the system moves crosses below the carbon dioxide liquidus, and the carbon dioxide gas condenses to carbon dioxide liquid, as illustrated at point B. (Point B represents just an example of the system temperature/pressure conditions at which dissociation is complete; the exact conditions are less important than making sure that the final pressure/temperature conditions within the hydrate dissociation vessel lie within the field of stability for liquid carbon dioxide.) In operation, the system may pass relatively quickly through the portion of the phase diagram in which carbon dioxide gas exists. In those instances, the hydrate will essentially dissociate directly into carbon dioxide liquid and pure water.

Alternatively, per the '442 application, by controlling the pressurization of the dissociation vessel 1114 using the gas valve 1128, pressure can be increased sufficiently fast so that the carbon dioxide never enters the gas phase. The system will then move along P-T curve 1130' through the lower, hydrate stability zone 1132 and directly into the liquid carbon dioxide/water zone 1134. In either case, however, the result is the essentially immediate production of liquid carbon dioxide and fresh water.

Non-hydrate-forming-components of the exhaust gas, such as nitrogen oxides and nitrogen, will be released from the system through valve-controlled purge system 1150 once the liquid carbon dioxide and water are removed from the system.

(As yet another, less preferred alternative disclosed in the '442 application, if pressure in the system is controlled so as not to rise as high as in these two embodiments, gaseous carbon dioxide instead of liquid carbon dioxide will be released. In that case, the gaseous carbon dioxide can be removed from the hydrate dissociation vessel 1114 at the relatively high gas pressures of the vessel but below those required for hydrate stability (e.g., two hundred to three hundred atmospheres pressure) and compressed to liquid carbon dioxide at relatively low temperature using industry standard apparatus and methods. Compressing the pressurized carbon dioxide from the already pressurized gaseous state to the liquid state would still be easier—and hence less expensive—than the case where gaseous carbon dioxide is compressed to liquid carbon dioxide from approximately normal atmospheric pressure.)

Figure 24:
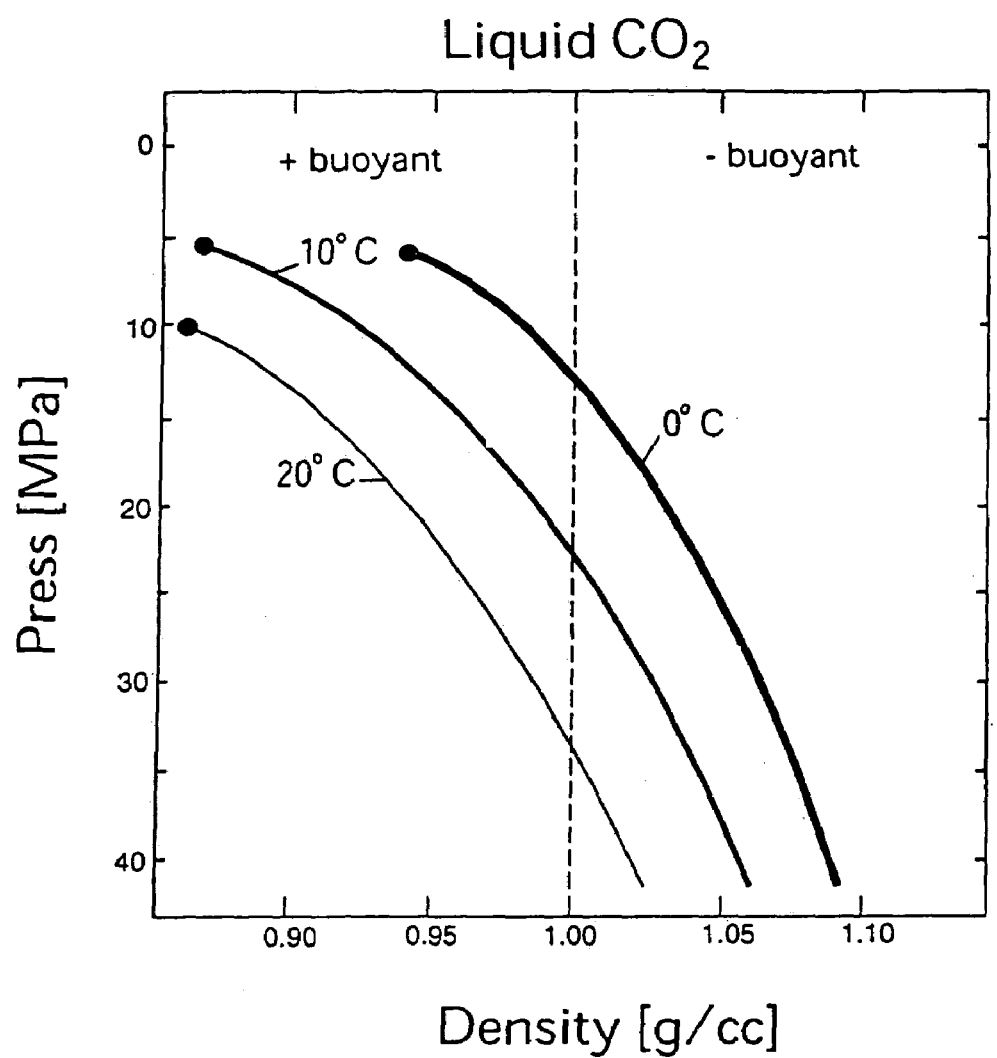
FIG. 24 is a graph illustrating the variation in density of liquid carbon dioxide with varying pressure, as per the '422 application.

As illustrated in FIG. 24, at the pressure and temperature conditions that exist at the dissociation end point B, the liquid carbon dioxide will be positively buoyant with respect to the fresh water produced from dissociation of the carbon dioxide hydrate. Moreover, the liquid carbon dioxide and the fresh water are essentially immiscible. Accordingly, the liquid carbon dioxide will float on top of the fresh water released by the hydrate, with an interface 1152 (FIG. 22) between the two. The fresh water is then extracted by valve-controlled outlet 1154, and the liquid carbon dioxide is extracted by valve controlled outlet 1120. The fresh water will be saturated with dissolved carbon dioxide and may contain micro-droplets of liquid carbon dioxide that can be withdrawn under pressure. The fresh water may then be used for any desired purpose, e.g., drinking water, and the carbon dioxide may be transported away quite conveniently in its liquid form and either used in a variety of existing commercial applications or disposed of (e.g., by being pumped to great ocean depths for sequestration.) Any residual saline water, which will settle to the very bottom of the system, is extracted via a valve-controlled outlet 1156, as described previously, and disposed of. Preferably, even though the carbon dioxide and water are essentially immiscible, a conduit 1158, arranged to carry the more dense fresh water down below the less dense liquid carbon dioxide, is provided extending from the bottom of the tray 1124 so that the separated water can flow downward without having to flow through the carbon dioxide.

Figure 22:
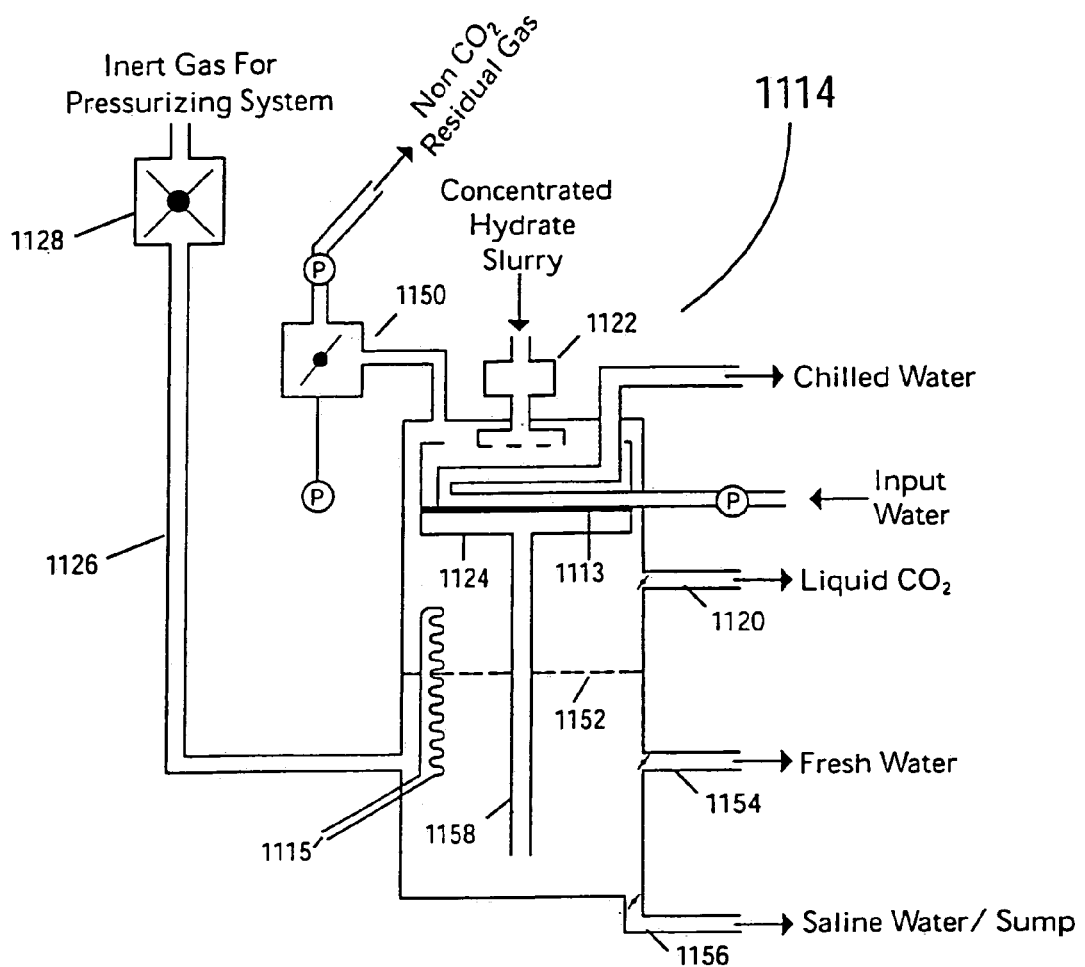
FIG. 22 is a schematic diagram illustrating a dissociation vessel in which carbon dioxide hydrate is allowed to dissociate so as to produce liquid carbon dioxide and fresh water, as per the '422 application.

Additionally, according to the '422 application, FIG. 22 shows the system input water as passing through the dissociation vessel 1114 as in the previously described embodiments. It will be appreciated, however, that because heat is being added to the system through the heat exchange system 1007 so as to move the temperature to the right in the phase diagram shown in FIG. 23, less heat will be absorbed out of the input water by the endothermic dissociation of the hydrate, and therefore the input water will not be chilled to the same extent as in the previously described embodiments. Accordingly, additional supplemental cooling may be necessary in order for the hydrate to be formed.

Finally, with respect to the '422 application, although just a single one of each is shown, more than one dry processing/preprocessing apparatus 1105, prechamber 1108, hydrate formation vessel 1111, and/or hydrate dissociation vessel 1114 may be employed in a single installation. For example, it may be desirable or even necessary to cycle the exhaust gas a number of times prior to introducing it into the hydrate formation vessel 1111 in order to reduce the levels of non-carbon dioxide materials which otherwise might cause the water to taste poor.

The Present Invention

Figure 25:
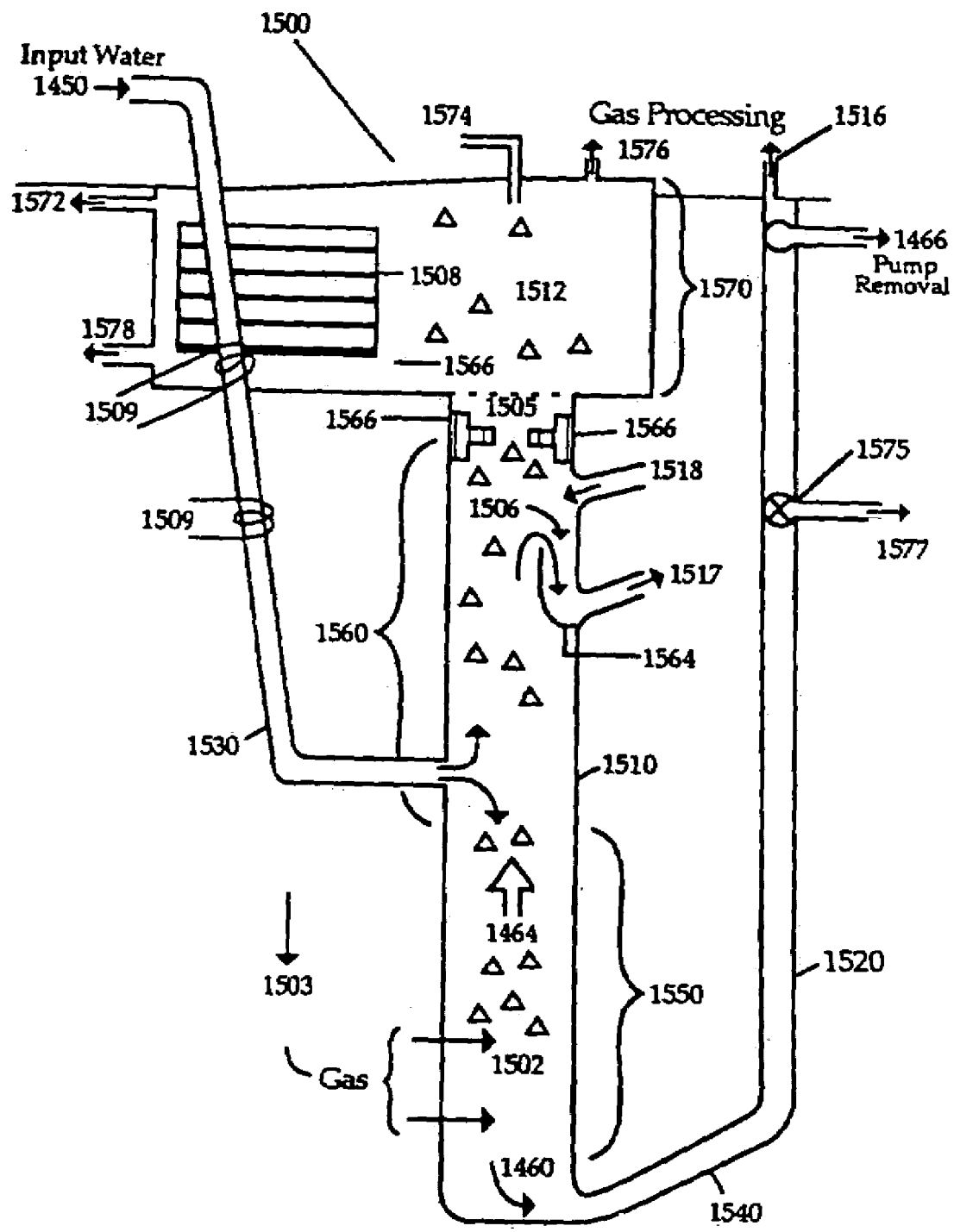
FIG. 25 is a diagrammatic, side elevation view of an embodiment of a desalination fractionation column which employs downward flow of input and residual fluids in the desalination fractionation apparatus to promote cooling of the hydrate and maximize efficiency of the system in accordance with the present invention.

As noted above, the present invention represents a significant improvement over the desalination systems disclosed in the '422 application and its precursors. One embodiment of a desalination fractionation apparatus 1500 in accordance with the present invention is illustrated in FIG. 25. The apparatus 1500 includes a hydrate formation section 1550 located in the lower portion of fractionation shaft or column 1510, and a hydrate dissociation and separation section 1570 (including dissociation-region 1512), where hydrate actually dissociates into its constituent hydrate-forming gas and fresh water. A hydrate concentration section 1560 is located above the hydrate formation section, where hydrate that has essentially floated up "out of" the residual fluid concentrates and the slight amount of remaining residual water of elevated salinity is displaced by fresher water descending from the dissociation and separation section 1570.

Hydrate-forming gas 1502 is introduced into the fractionation column 1510 via input gas line 1503, which can be a pipe or any other suitable structure for carrying gas as known to persons skilled in the art. The input water-to-be-treated 1450, is introduced into the fractionation column 1510 via water intake pipe 1530. In this particular embodiment, input water 1450 is introduced into the fractionation column above the level at which the hydrate-forming gas 1502 is injected.

As explained in the '422 application and above, the input water is typically cooled to a temperature at which, for a given pressure depth, conditions exist for the spontaneous formation of hydrate in the presence of appropriate hydrate-forming gas. In addition, the water-to-be-treated may be treated prior to hydrate-formation so that the amount of gas in solution that aids the formation of the required type of hydrate is increased or brought to some desired concentration, as explained further below. After the suitable, positively buoyant hydrate-forming gas is injected into the hydrate formation section 1550, positively buoyant hydrate 1464 spontaneously forms and begins to rise through the water column.

As explained above, the hydrate formation is an exothermic reaction, and the heat liberated by that reaction tends to heat the surrounding residual fluid in the hydrate formation region 1550. Recently discovering that the overall efficiency of hydrate desalination is fundamentally a function of the difference in temperature between the dissociation and formation regions, I have modified my previously disclosed methodologies to remove that heat of hydrate formation from the hydrate formation region far more quickly so as to minimize heating of the hydrate formation region, thereby improving efficiency. Thus, to that end, the overall movement of water through the system, including residual water, is controlled so as to be substantially downward and out from the bottom portion of the installation. The buoyancy of the hydrate 1464, however, is greater than that of either the heated residual fluid or the input water-to-be-treated 1450, and therefore it will rise and concentrate in the dissociation region 1512 as noted above. Thus, according to the desalination method of the present invention, water flow through the apparatus is controlled such that the hydrate separates from the residual fluid at or near the point of hydrate formation, thereby remaining cooler and more stable longer than previously and increasing efficiency of the system.

The brines or residual fluids 1460, which may be mixed somewhat in turbid regions of the hydrate formation section, are drawn downward and extracted from the fractionation column 1510, out through column 1540, by pump 1466 or by natural flow driven by density within the system as a whole. Although some small amount of warm residual fluid will rise, it will mix with new input water and cool and, because it will be more saline than the newly input water-to-be-treated, it will sink back into the hydrate formation region where it will be subject to further hydrate formation. Thus, per the invention, virtually all the water that is residual from the hydrate formation process exits the fractionation column 1510 apparatus at its base through column 1540, from which it can be pumped or allowed to flow for further treatment and/or disposal. This is in distinct, inventive contrast to my previous methodologies described above and claimed in my referenced co-pending applications.

By locating the output of the input water pipe 1530 above the hydrate formation region 1550, hydrate formed in the hydrate formation region tends to be additionally cooled as it rises in the apparatus by virtue of the incoming water-to-be-treated passing over it and carrying away liberated heat of formation. (In view of this heat-flushing function of the water-to-be-treated, generally more seawater may be passed through (i.e., out of) the apparatus for a given volume of fresh water to be extracted than in the above-described embodiments.) This has the beneficial effect of increasing the stability of the hydrate at lower pressures and reducing the depth at which the hydrate will begin to dissociate, which permits more efficient management of the distribution of thermal energy within the apparatus as a whole.

In cases where the residual fluid resulting from formation of the hydrate is cooler than the input water-to-be-treated prior to any cooling, it may be advantageous to return the residual fluid to heat exchanger 1508 for heat exchange with intake water-to-be-treated, in the dissociation region 1512, or, alternatively, to a region where external, artificial refrigeration is carried out as disclosed in the '422 application and described above. In such cases, more hydrate would be recovered from a given volume of input water because the water would be passed through the apparatus more than once, and less energy would be required to cool the recycled water to the necessary temperature for formation of hydrate than in the case of cooling of warmer, untreated water.

The control valve and pump assembly 1466 is used to regulate water flow through the apparatus and permits close control over the requisite, generally higher (as compared to my earlier embodiments) extraction rate of residual water from the base of column 1510. The control valve and pump assembly 1466 permits the residual fluid to be directed either back to the input water for recycling through another hydrate formation cycle or to disposal. Because a small amount of hydrate in the form of less hydrodynamic and/or less buoyant flakes may be removed from the fractionation column in the residual water, provision is made for capture of the hydrate-forming gas released when dissociation of those flakes takes place using gas capture apparatus similar to that used in the main hydrate dissociation region 1512. Gas released at the top of the brine pipe 1520 is returned to the main gas capture and processing system as soon as possible.

Because the flow of the input water-to-be-treated 1450 is generally downward in the column 1510, it may retard slightly the upward movement of the hydrate 1464. However, as the hydrate rises into the relatively more static input water located above the input water injection point, its rate of rise increases. Care must be taken to ensure that the buoyant ascent rate of the hydrate is greater than the downward flow rate of both the input water 1450 as well as the general downward movement of residual water out through the base of the column 1510. The density of the hydrate, and hence its buoyancy, is little affected by its temperature or the temperature of the surrounding water. Hence, although the temperature of each watermass affects the density of the water, the solid hydrate coefficient of expansion ensures that over the small range of temperature variation encountered, the change of volume (and hence density) of the hydrate is insignificant.

In a preferred embodiment of the present invention, a valve mechanism is provided that can completely close the shaft 1510 to rising hydrate 1464. For example, as illustrated in FIG. 25, valve 1566 is provided which is a sphincter or circular-section, camera-shutter type valve in which a series of curved metal plates advance obliquely in a rotational manner, thereby closing an orifice symmetrically. Other types of valves also may be used. Valve 1566 is located immediately below the depth 1505 at which hydrate ceases to be stable in any particular apparatus and serves a number of purposes. For example, closing of this valve upon system start-up allows a large amount of hydrate produced in the hydrate formation section 1550 to concentrate over a period of time. Then, when the valve is opened, large volumes of hydrate are released into the hydrate dissociation region 1512 so that the heat-sink potential provided thereby is large from the beginning of any production run. This facilitates start-up and reduces the time during which start-up can take place. Additionally, where there is danger of gas escape within the system due to natural disaster such as a major earthquake, fire, or gas main breaks, such that it may be necessary to shut down the system rapidly without allowing gas to be passed back into the supply system or to be stored safely on the surface, hydrocarbon or other potentially combustible gases can be safely stored as hydrate within the shaft of the apparatus since hydrate is a safe way of storing and compressing gas which, in its gas phase, is otherwise potentially explosive or combustible.

The presence of valve 1566 greatly enhances safety. For example, in the case of a minor emergency, where shutdown could be made in a controlled manner over a period of time, the valve would be closed and all the free gas in the system would be pumped to the hydrate formation region where hydrate would form. Thus, the gas would be safely stored as hydrate in the upper part of the shaft. When released following passage of the emergency, system restart would be very rapid because of the large heat-sink that would be provided by the released hydrate within the hydrate dissociation region 1512.

Where the emergency was more severe and little shutdown time was allowed, all the gas present in hydrate that was rising in the column could be trapped within the column by quickly closing the cut-off valve 1566. At any moment of operation of a hydrate fractionation desalination apparatus, most of the gas in the system will be present in the form of hydrate. Other gas in the system could either be stored within the gas recovery and processing and injection systems or vented by flaring to protect the system as a whole. The hydrate-forming gas stored in the hydrate would be essentially inert, but if pressures in this stored hydrate region did drop for any reason and result in conditions of hydrate instability, hydrate dissociation would be slow because of the "negative feedback effect" resulting when hydrate dissociation causes cooling to the point that the water released may freeze to water-ice, thereby increasing conditions of hydrate stability, and the produced gas would dissipate or be flared. Or course, the desalination apparatus in accordance with the present invention could be constructed and operated without cut-off valve 1566 if so desired.

Provision is made for the removal of slight remaining amounts of residual fluid, present as interstitial water, near the upper part of the column 1510 at interstitial water extraction point 1517, in a manner similar to that described in the '422 application and above. This allows a portion of the cold input water-to-be-treated to rise interstitially in the hydrate slurry and provide additional cooling to the hydrate, thus allowing the hydrate to remain stable at lower pressures. Fresher interstitial water that flows down from the dissociation region 1512 displaces the interstitial, residual water and remains above the interstitial water-to-be-treated or interstitial residual water because of their density contrast and facilitates better, more efficient conversion of hydrate and its residual water matrix to fresh water.

Where this extracted water 1517 is lower in temperature than uncooled input water-to-be-treated, it may be recycled through the apparatus, thereby reducing the total amount of water-to-be-treated by producing a greater volume of fresh water from a given volume of water-to-be-treated. The extraction of residual water is accomplished by drawing it off so that the hydrate continues to rise, albeit at a slower rate, above a "water trap" 1564 (a physical baffle), which provides a downward path for water being drawn off within the apparatus but down which the buoyant hydrate will not pass because of its positive buoyancy and upward progress.

In addition, lower salinity "wash" water taken from the dissociation region is injected into the column at injection point 1518 in order to dilute the slight amounts of interstitial residual water. This injected water, in addition to or in place of water descending from the dissociation region 1512, will lower the total dissolved solids in the resulting fresh water. The injected water may be either fresh or "grey" water, that is, water having a salinity between fresh water and water of the salinity of normal seawater, and may be derived from another hydrate fractionation apparatus or from an external source.

Injection of the hydrate-forming gas 1502, water-to-be-treated 1450, and "wash" water 1518 may be continuous or varied so as to achieve the best desired results. In addition, the extraction of residual water may be either continuous or varied so as to achieve the desired results. Baffles (not shown) may be provided within the hydrate-forming region to control turbulence and direct water flow and constrain hydrate movement so as to achieve design goals for the most efficient formation of hydrate and separation by fractionation of the different density liquids and the hydrate.

The water-to-be-treated 1450 is carried downward in the shaft liner, or in a pipe within the shaft, or in a separate passage 1530 as shown in FIG. 25. A connection between the shafts is made at the base of the shaft 1540, which may be inclined or horizontal as determined by final design to achieve operational objectives. The input water-to-be-treated 1450 may be passed through a heat exchanger 1508 in the dissociation section 1512. Alternatively, if the benefit of the cooling effect of hydrate dissociation is not required by the design of an installation, the input water can be passed solely through an artificial refrigeration apparatus 1509, if necessary.

The exact, relative placement of the input water injection point and hydrate-forming gas injection point in the hydrate formation region is determined by the particular requirements for each installation. For instance, where a particular percentage of hydrate is desirable to form for the particular water and apparatus, hydrate can be formed at various levels, with different percentages of water being extracted by hydrate formation from the water-to-be-treated at the different levels. This serves to distribute the production of heat over a greater vertical distance in the hydrate formation region 1550 and promotes turbulence in the region as a whole. In addition, hydrate-forming gas and water inputs can be interleaved, with some water-to-be-treated being input below at least one of the hydrate-forming gas injection points (not shown in FIGS. 1 and 2). This may be desirable where some local cooling is required, where certain percentages of hydrate formation are required, or where turbulence is to be further promoted. Provision is allowed for some installations to have multiple water and gas injection points, although the overall flow of residual water remains essentially downward and some of the cold water-to-be-treated may rise to balance the movement of water in the system as a whole.

To provide for extra cooling of input water-to-be-treated if necessary, further refrigeration apparatus 1509 is applied, if necessary, on the water inlet 1530, as illustrated in FIG. 25. The exact placement of the refrigeration apparatus and its overall length in the column is not fixed, but will be adjusted to achieve maximum desired effect for the particular requirements of each installation.

In the embodiment shown in FIG. 25, fresh water is drawn off near the top of the hydrate dissociation region, at fresh water extraction point 1572. Furthermore, provision is made for extraction of small amounts of water at tap 1574, preferably located near a restricted area of water collection near the gas extraction point 1576. The water immediately below the gas interface may be enriched in particulate material—particularly very small material such as bacterial or viral contamination concentrated by continuous gas flow through the produced fresh water—and its separation aids water quality and purity. (Such provision for the removal of finely concentrated material of this type also may be provided in other hydrate fractionation desalination and water purification apparatus, as described above.) Provision is also made for extraction of water near the base of the dissociation and separation section 1578, as it may be necessary to remove "grey" or produced fresh water which has too high a salinity to use as high quality product water but which may have use in agricultural or other applications or as wash water 158 in the apparatus.

Figure 26:
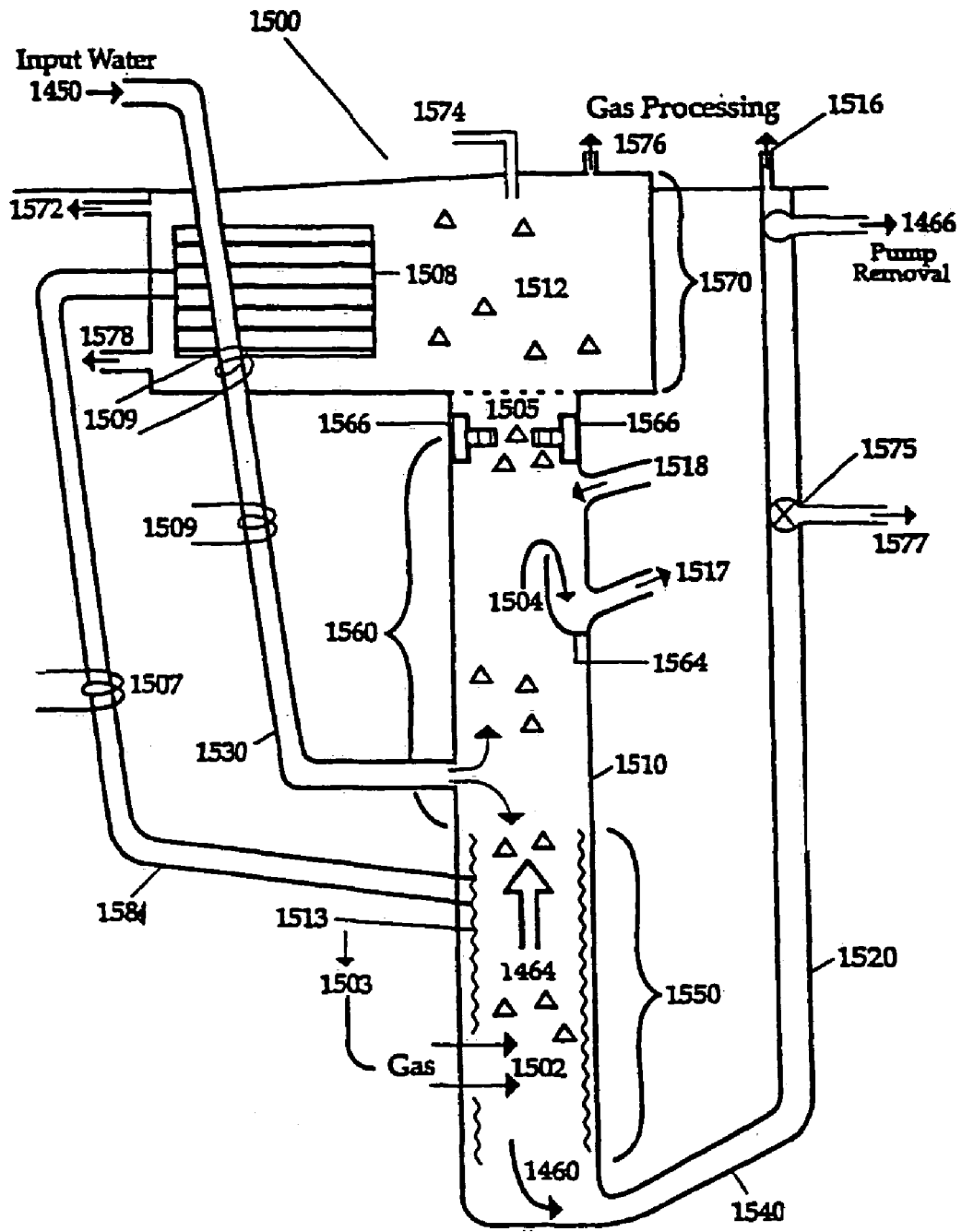
FIG. 26 is a diagrammatic, side elevation view of another embodiment of a desalination fractionation column which employs downward flow of input and residual fluids in the desalination fractionation apparatus to promote cooling of the hydrate and maximize efficiency of the system in accordance with the present invention.

In another embodiment of the present invention, illustrated in FIG. 26, artificial refrigeration is provided in the hydrate formation region so that a higher proportion of fresh water can be extracted from a given volume of water-to-be-treated by formation of hydrate than can be accomplished without artificial cooling. For example, as illustrated in FIG. 26, artificial refrigeration elements 1513 are provided in the hydrate formation region 1550 of column 1510. The artificial refrigeration elements 1513 can include, for example, means for standard refrigeration techniques such as heat transfer from one region to another using another fluid in a closed system of pipes and radiators as the heat exchange medium. In another embodiment, direct cooling of the refrigeration apparatus in the hydrate formation section 1513 can be accomplished by thermoelectric techniques or other techniques, where some or all of the residual water 1460 is used as the heat sink in or near the hydrate formation section. The effect of cooling the hydrate forming reaction results in the formation of more hydrate per unit volume of input water-to-be-treated than if the hydrate forming region were not artificially cooled. This enhanced formation of hydrate, which results in higher volume percentages of fresh water production, can be implemented in embodiments of both naturally and artificially pressurized apparatus.

According to one approach to providing such cooling, used either alone or to supplement standard refrigeration techniques, dissociation of the hydrate (which has a demand for heat energy about equal to the heat produced by the formation of all the hydrate) can provide most, if not all, of the heat-sink capacity for the refrigeration apparatus 1513 in the hydrate formation region. Although implementing an artificial cooling system adds to overall cost of a hydrate fractionation desalination apparatus, the cooling it provides will allow much higher proportions of fresh water to be recovered from a given quantity of treated water.

On the other hand, operation with little or no cooling in the hydrate formation section at all may be possible or allowable where energy costs are sufficiently low or discounted as an operating cost; where the costs of pumping larger amounts of water-to-be-treated is not prohibitive; or where only slightly enhanced salinity residual water produced by the formation of hydrate is either desired or required, e.g., where the surrounding marine ecosystem must be minimally disturbed. The treated water must then be cooled in situ in the hydrate formation region 1550 because the indefinite heat-sink of the ocean is not available (unless large quantities of cold, deep water can be pumped through the apparatus).

In the embodiment illustrated in FIG. 26, the water-to-be-treated is cooled in the hydrate formation region 1550 as the hydrate is formed. Injection of the water-to-be-treated 1450 (as in the embodiment illustrated in FIG. 25) is above the injection point for the hydrate-forming gas 1502, and the residual fluids are extracted at the base of the column 1510 as described in connection with FIG. 25. Hydrate 1464 separates from the residual fluid at or substantially at the point of formation and rises through the input water-to-be-treated, collecting and concentrating in the dissociation region.

As with the embodiment of FIG. 25, cooling of any remaining residual fluid along with the hydrate strongly affects the density of the residual fluid, which, instead of being partially slightly positively buoyant, is negatively buoyant and therefore sinks to the bottom of the system. The density of the residual fluid increases as hydrate is increasingly formed because the residual fluid being produced is increasingly saline while the temperature remains within a required range, e.g., about 3° C. to 7° C. The increased salinity of water-to-be-treated, where it is chilled residual water, will have some impact upon decreasing the field of hydrate stability (an inhibitor or antifreeze effect), but this effect will not significantly affect the formation of hydrate. The range of temperatures extant in the hydrate formation region is kept well within the pressure-temperature range of hydrate formation and stability. In addition, depending on the original temperature of the water-to-be-treated, the final residual water is likely to be cooler than the original temperature of the input water-to-be-treated prior to its being taken from the sea, and it can be used to pre-cool raw input water that is at the ambient temperature of the source water (likely to be quite elevated in low latitude desert countries, for instance).

In the embodiment illustrated in FIG. 26, the dissociation section is designed to facilitate the formation of variable amounts of hydrate with cooling provided by (but not necessarily entirely from) heat transfer between the hydrate formation region and the heat-sink of the dissociation section 1512. The water-to-be-treated is kept cool by refrigeration so that the temperature range in the hydrate formation section remains suitable for the spontaneous formation of hydrate. Located above the hydrate formation section, and similar to the embodiment in FIG. 25, is a hydrate concentration section 1560, where any slight amount of remaining residual water of elevated salinity is displaced by fresher water descending from the dissociation and separation section 1570, and possibly from external sources 1518.

The cooling potential of the heat exchange provided by the dissociation of hydrate in the hydrate dissociation region 1512 will exceed the cooling requirements of the input water alone when high proportions of water are extracted from given volumes of treated water in the hydrate formation section 1550 (by forming large proportions of hydrate). This additional cooling potential can be taken advantage of by cycling coolant fluid through heat exchangers 1508 in the dissociation region and then to the refrigeration apparatus 1513 in the hydrate formation section 1550 via shaft 1581. This use of the heat-sink provided by the dissociation reaction to provide substantial cooling potential to the refrigeration system in the hydrate formation section dramatically cuts the cost of the artificial refrigeration. If the heat removed in the residual brines and interstitial waters, as per the previously described embodiments, is a significant proportion of the overall heat in the system with respect to the cooling demand (cooling input water-to-be-treated plus cooling the hydrate formation region that is being heated by formation of hydrate), it is possible that relatively little or no artificial cooling 1507, 1509 may be required, even where relatively high proportions of hydrate are formed in water undergoing treatment.

Where the lower part of the hydrate fractionation desalination column is drilled, special liners carry all passages and communication lines. Controls and valves are designed to be replaceable using Remotely Operated Vehicles within the flooded shaft, so that maintenance and repairs can be effected without shut-down. Line cleaners are either hydraulic pressure driven or mechanical, or both, as design indicates. Where the shaft is larger, replaceable pipes can be affixed within the shaft to achieve the desired water flows.

Redundancy (multiple or fall-back systems) of all piping and controls will provide the greatest potential for continuous production of water, even during major maintenance periods. Provision is made for spot heating to melt hydrate encrustations as necessary. All released hydrate rises buoyantly and contributes to the production of fresh water.

For both naturally and artificially chilled embodiments, close monitoring of temperature and salinity—along with other physical parameters required to be known for optimal control of the process of hydrate formation, separation, and concentration—will be maintained so that input of water-to-be-treated and extraction of residual water can be controlled to keep the thermal and salinity gradients within the embodiments in the most suitable ranges.

Installation of either of the herein described embodiments, combined with a general downward flow of water-to-be-treated and, in particular, the residual fluids, results in improved performance over the embodiments of the '422 application and simpler construction. In accordance with the present invention, in contrast to the '422 application, enhanced salinity residual water produced as a byproduct of hydrate formation flows downward instead of upward, with the heat of formation largely being carried away with it and the hydrate being separated from it at or near the point of formation. The bulk of the residual water is removed from the main hydrate fractionation column or shaft at a level near or below the hydrate-formation region near the base of the apparatus. In this embodiment, the bulk of the water-to-be-treated is carried downward in the shaft liner or in a pipe within the shaft, and the return flow of saline residual water is either carried upward in a separate pipe or specially designed watercourse within the shaft liner or in a separate lined pipe drilled to the base of the desalination fractionation column.

Figure 27:
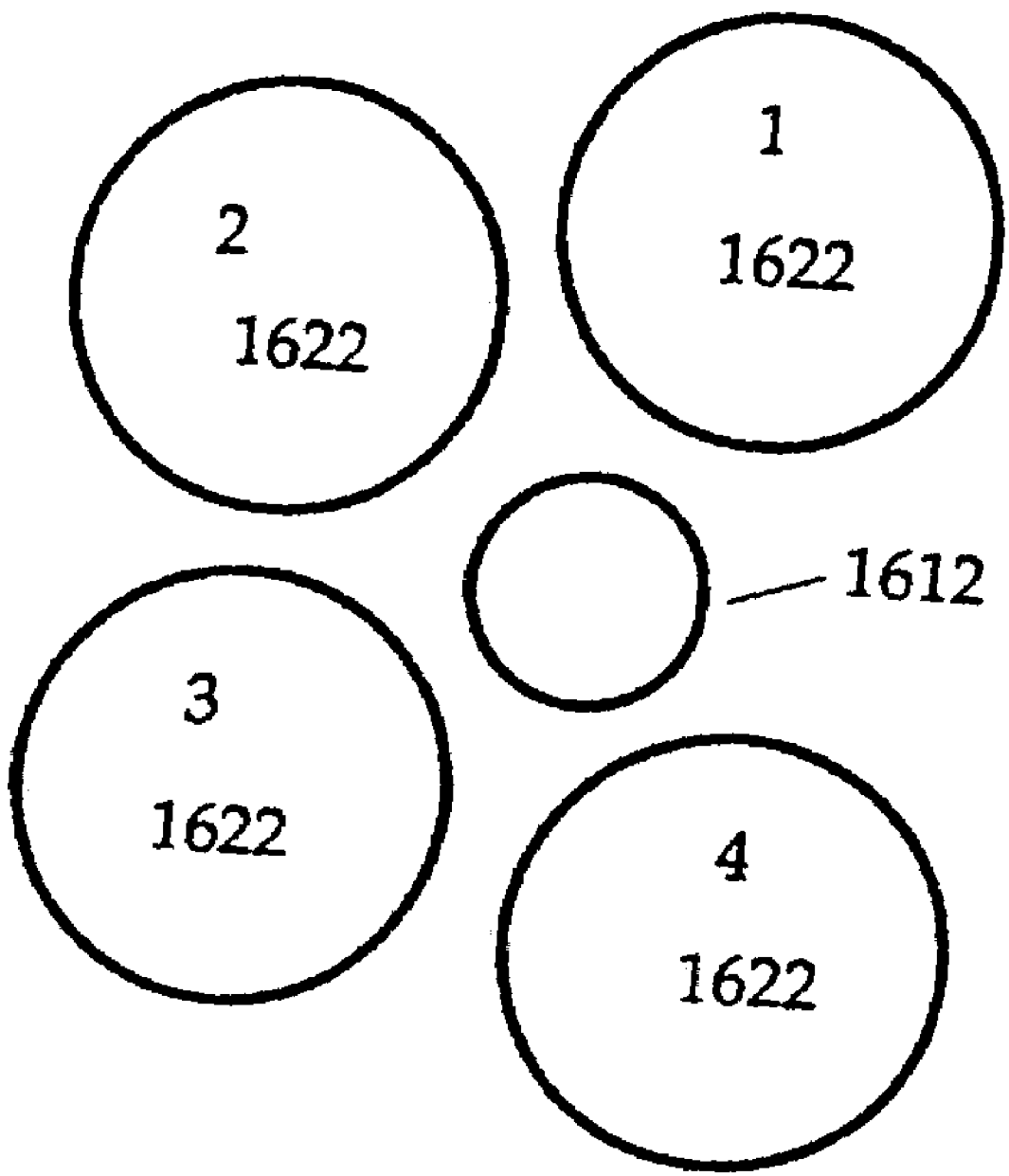
FIG. 27 is a schematic plan view illustrating the distribution of desalination fractionation columns grouped about a residual saline water return shaft in accordance with the present invention.

Many variations of lay-out of this embodiment are possible. The precise lay-out of the input and residual water streams are engineered for each situation to achieve best results. For example, as illustrated in FIG. 27, shafts are drilled and lined appropriately for operation of a downward flow hydrate fractionation desalination column. This lay-out allows close spacing of a number of desalination apparatus which all feed into a single residual fluid collection column, which is reserved for saline water return 1577 to the ocean or to the surface for disposal or further non-desalination utilization.

The amount of hydrate which exits the fractionation shaft or column into the residual return shaft is likely to be small in proportion to the amount of input and fresh water produced. However, provision for recovering hydrate-forming gas from the residual water to be returned 1516 is made to comply with good business and environmental practice. The residual water stream to be returned to the ocean may be further degassed. The return shaft can be narrower in diameter and lined more simply, for instance with little or no insulation, which will result in a low-cost connection to the base of the desalination columns.

In accordance with the embodiment of the present invention as illustrated in FIG. 27, grouping a number of desalination fractionation shafts 1622 that feed their residual saline water into a single water return shaft 1612 will economize on the number of holes that must be sunk, and thus the cost of the installation. Four desalination shafts 1622 are shown in FIG. 27 for illustration only; the actual number of shafts will depend on engineering objectives and other concerns, but may be either more or less than the number herein illustrated. In yet another embodiment illustrated in FIG. 28, a symmetrical distribution of desalination fractionation columns (water-to-be-treated shafts) 1614 and residual water return shafts 1624 results in a very efficient use of surface area for an installation based on a number of shafts/holes rather than a single or a very small number of much larger holes, which have a greater cross-sectional efficiency for allowing hydrate to buoyantly rise. The dissociation chambers which are near or at the surface may have groups of shafts feeding hydrate to them, or they may be offset laterally, as dictated by the design of each installation so as to take into consideration construction, operational, and environmental concerns.

Where shafts are carrying water of different density, the level at which water is fed into or removed from each shaft may be implemented in such a way as to result in balanced pressures within the system as a whole, even for the generation of a controlled driving force that will pull intake water into the system and expel it naturally. For example, if the height of the water take-off point from residual water column is such that the weight of more dense water in the brine shaft 1520 is less than the weight of the sum of different waters and hydrate in the main hydrate fractionation shaft or column 1520, then the natural flow of water will be through the system as a whole, which may remove the requirement to expend energy pumping water through the system. Further, if the system is located so that its top is below sea level, water will flow naturally into the system as well as through the system. Further, where the residual brines are piped to the ocean, ideally at a greater depth than the input water, its natural density will cause it to flow naturally from the pipe into the sea, where it can mix and disperse. If these aforementioned conditions are met, then little artificial pumping of water into, through, or out of the system and back to the sea may be required. Because of the density changes within the system, and its generally unobstructed nature, the design of each system will be optimized for the local conditions, especially with respect to the temperature of the watermass to be treated.

Figure 28:
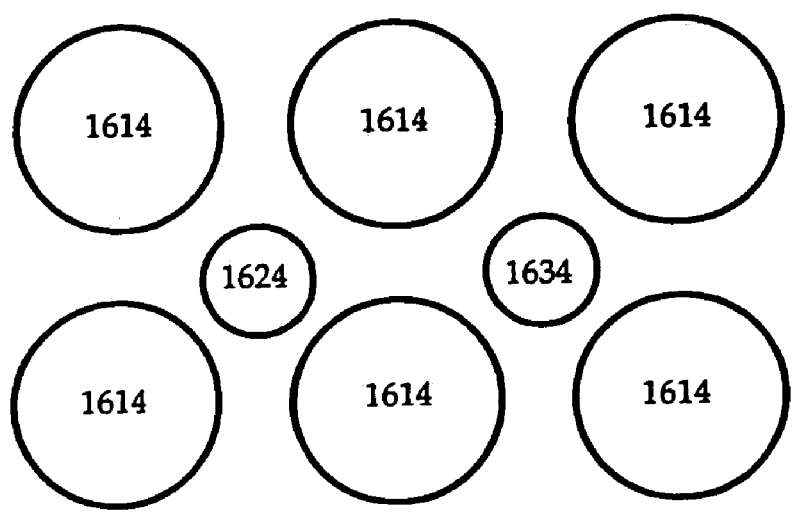
FIG. 28 is a schematic plan view illustrating a symmetrical distribution of desalination fractionation columns, residual saline water return shafts, and input water shafts in accordance with the invention.

The economics of construction of a desalination facility may favor the drilling of many holes, as these can be drilled while the hole is wet and lined during and/or after drilling, with wireline methods used for the extraction of core or crushed rock extraction where surface drilling muds and ponds are not a significant issue. Sunk shafts, on the other hand, involve construction under essentially dry conditions, which requires very high pumping, debris removal, and manpower costs in comparison to drilling. A symmetrical distribution of replicate shafts (as shown in FIG. 28) will allow not only for use of the same drilling technique for each of the different types of hole but for mass production of the required liners and control apparatus, which can be the same in a variety of different sites. In addition, a symmetrical distribution allows a group of desalination fractionation shafts 1614 to efficiently share input and residual shafts, and for a facility initially composed of a minimum number of water-to-be-treated input shafts 1634 and residual saline residual water shafts 1624 to be expanded without the need to cease production of that part of the facility already in production. Because it should be possible in many cases to put the control building, dissociation chambers, and gas handling and processing apparatus directly above the various shafts, an efficient use of area for desalination installations of this type (e.g., a small footprint) is possible.

A hydrate fractionation installation comprised of a number of shafts has other advantages where a large proportion of the energy consumed is used to cool intake water from very hot water sources, such as in restricted seas adjacent to desert areas. When this cooling charge is relatively high, producing as high a proportion of fresh water from any particular volume of water-to-be-treated will have the effect of lowering the overall cost of produced fresh water. Where the proportion of hydrate that can be formed in water-to-be-treated is desired to be less than the maximum proportion of fresh water extraction desired because of the physical character of the fluid, for instance, the residual water from one column can be cooled and input into another for a further cycle of relatively high proportion hydrate formation. Passing a particular volume of water through a process that extracts the maximum amount of fresh water from water-to-be-treated in the form of hydrate more than once will have the effect of recovering extremely high proportions of fresh water from any given volume of water.

In another embodiment (not shown), cooling and/or refrigeration apparatus can be affixed to pressurized hydrate fractionation desalination apparatus which may be employed in artificially pressurized installations. In such an embodiment, heat is removed from the hydrate-formation chamber or chambers so that the proportion of water that can be extracted from a particular volume of water-to-be-treated by hydrate formation is not limited by the heat produced by the exothermic hydrate formation reaction. This is beneficial to the cost of fresh water production because all water used must be fully pressurized artificially; thus more fresh water can be recovered from a given volume of water-to-be-treated. The elements of the cooling apparatus can consist of only heat exchangers where the ambient temperature of the surrounding environment is suitably cold, but may also consist of a refrigerator unit so that very cold fluid circulation provides for efficient cooling regardless of the ambient temperature in the environment surrounding the pressurized desalination apparatus. In addition, the heat sink of the hydrate dissociation reaction may be used to cool input water-to-be-treated. The refrigerator coils can be placed entirely on the outside of the pressurized apparatus but communicating with heat exchanger vanes within the vessel, or the refrigerator coils can extend into the vessel, as determined by individual installation design.

Where the ambient temperature is cold, the heat extracted from the hydrate formation stage of the desalination and water purification process may be used for heating habitations or for other purposes.

The difference in volume between the volume of water-to-be-treated and the volume of residual water is the volume of water extracted by the process of formation of hydrate. Close monitoring of the water and hydrate volumes is required because the actual act of desalination takes place when hydrate is formed by extracting water molecules from the seawater. One cubic meter of hydrate contains on the order of 0.87 cubic meters of water; thus, as the volume of hydrate in the apparatus varies, it will displace variable amounts of water. Long operating runs during which a small range of variation in all components within the system are maintained is thus an important operational objective.

In considering the costs of building and operating a desalination installation of the hydrate fractionation type, the overall pressures required control the size and strength of the apparatus to a large extent. Where an apparatus must reach to deep depths to provide for a long column of water to provide pressure in the hydrate formation region, or where the apparatus must be strong enough to withstand high internal pressures, its costs will be relatively high. Thus, it is important to consider means by which pressure in the apparatus as a whole can be lowered in order to lower costs.

Hydrate formation depths vary depending mainly on temperature and pressure, which control the formation and stability of gas hydrates. The chemistry of the water in which hydrate may form may have a lesser affect on modifying the field of hydrate stability.

Different gases and mixtures of gases have substantially different ranges of stability and these are of particular interest where hydrate-forming-gas mixtures suitable for forming hydrate from seawater or polluted water can be used to extract water molecules into the hydrate and restore them to liquid (fresh water) upon concentration and dissociation. For example, where ethane, propane, butane, or some other gas that in the mix lowers the pressure and/or raises the temperature at which hydrate will form may be mixed with methane in different proportions, the pressure-depth of hydrate stability at various temperatures is significantly shallower than the pressure-depth for methane alone. This has important ramifications where operational variables of a hydrate fractionation desalination system are to be determined for the most efficient operation.

For instance, one of the major cost factors of projected shaft and combined shaft and artificial pressurized desalination fractionation installations is the length of the shaft that is necessary to provide required design pressures. It is anticipated, for instance, that up to approximately 5% of propane in methane in the hydrate-forming-gas is an achievable operational gas mix, although a higher proportion is also possible. Use of this propane mix in methane indicates that the total pressure required is about one-quarter of that for methane alone, with virtually any propane mixed with methane halving or more than halving the minimum total pressure required to produce gas hydrate. Where the installations can be operated at lower pressures, economies can be achieved in both the capital cost of the building of a hydrate fractionation desalination installation and its operating costs. (One or more of ethane, butane, or other gases can also be used in addition to or instead of propane, with similar advantage.)

Figure 29:
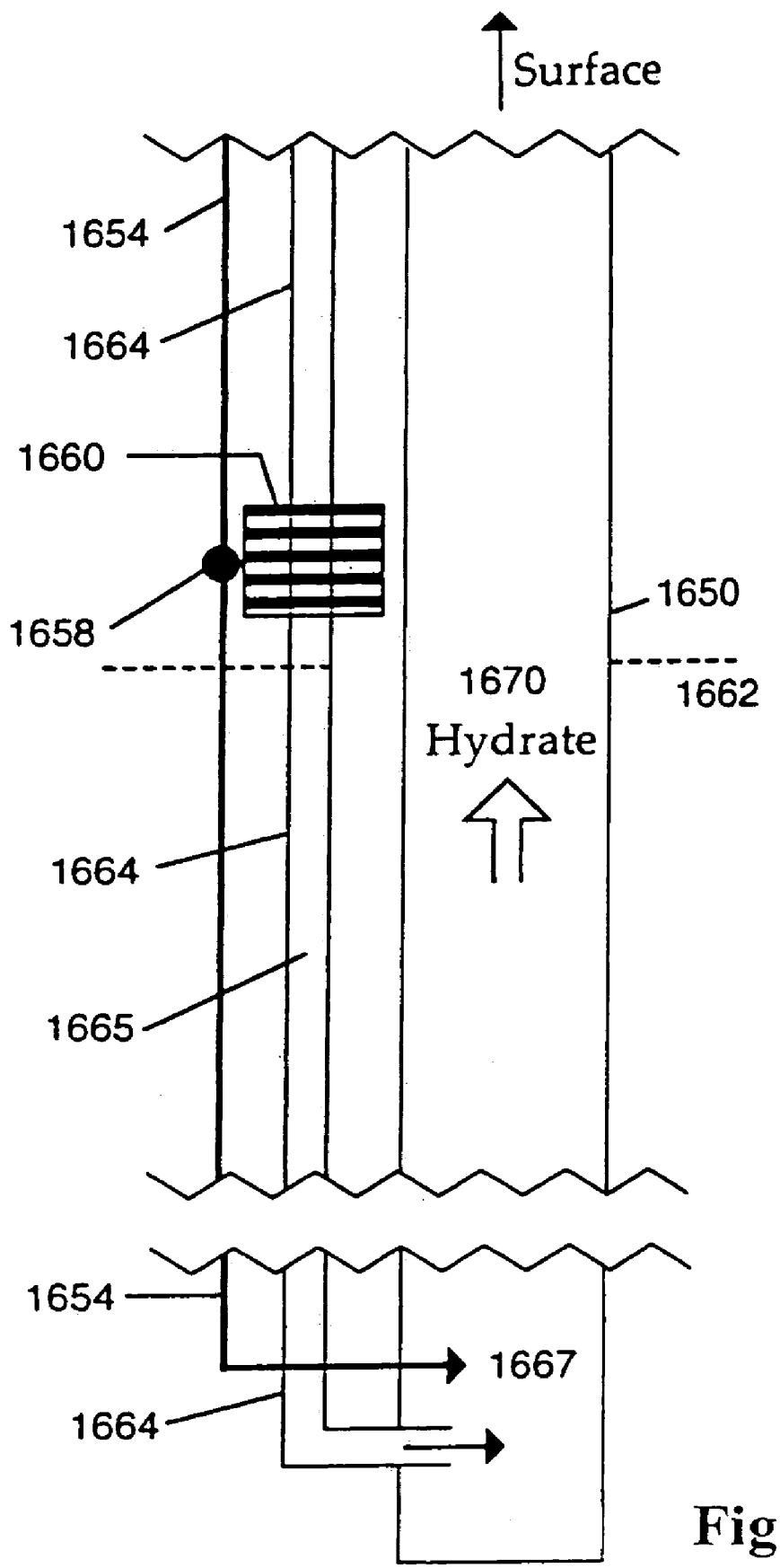
FIG. 29 is a diagrammatic, side elevation view of an embodiment of a desalination fractionation column which provides for saturating the water-to-be-treated with hydrate-forming gas or gas mixtures prior to hydrate-formation in a land-based installation.

Finally, as noted above, it may be preferable to dissolve an amount of hydrate-forming gas in at least part of the water to be desalinated or purified prior to it being injected into the desalination fractionation apparatus and being mixed with hydrate-forming gas or gases under the conditions conducive to formation of hydrate. FIG. 29 illustrates a portion of a desalination fractionation column in accordance with that aspect of the present invention, which provides for saturating the water-to-be-treated with hydrate-forming gas or gas mixtures prior to hydrate formation in a land-based installation.

As illustrated in FIG. 29, a hydrate fractionation desalination and water treatment installation made on land uses a shaft or large diameter drill hole 1650 to reproduce the pressure found naturally at sea. In this embodiment, the hydrate-forming-gas line 1654 and the input water-to-be-treated pipe/conduit 1664 are separate from the main shaft or hole 1650 where the hydrate 1670, once formed, can rise buoyantly. The hydrate-forming-gas line 1654 and water-to-be-treated pipe/conduit 1664 are shown separately here for clarity, but each, or both, may be carried within the liner to a single shaft rather than in separate courses. Hydrate-forming-gas is taken from the gas pipe 1654 by a controlled regulator 1658 and supplied to a mixing chamber 1660 where it is mixed with the input water in a turbulent manner so that a maximum amount of the hydrate-forming-gas is absorbed by the water-to-be-treated. The controlled regulator 1658 meters the hydrate-forming-gas so that desired amounts of that gas can be dissolved in the water-to-be-treated present in the mixing chamber 1660. Alternatively, a separate gas line (not shown) may be used to introduce a gas or gas mixture different from that of the hydrate-forming gas. The mixing chamber 1660 is preferably located above the pressure depth (illustrated by line 1662) at which hydrate will spontaneously form as determined by the water within the system and the temperature of the water-to-be-treated.

This gas mixing pre-treatment process can be continuous, in which case almost all of the water is pre-treated, or intermittent, in which case not all of the water is pre-treated. The precise method will vary for each site and on changing environmental conditions, such as changes in the temperature of the water-to-be-treated.

After the gas mixing pretreatment process, the gas pre-treated water 1665 is directed to hydrate formation region 1667 of the column 1650. The gas pre-treated water 1665 is mixed with the hydrate-forming-gas from gas pipe 1654 to spontaneously form hydrate 1670, and pure water is obtained from that hydrate in accordance with the methods disclosed above.

It will be appreciated that the embodiments disclosed herein are illustrative, and that numerous variations to and departures from the specific embodiments disclosed herein can be made while remaining within the spirit of the invention. All such modifications to and departures from the disclosed embodiments are deemed to be within the scope of the following claims.

What is claimed is:

1. Apparatus for desalinating or purifying saline or otherwise polluted input water, said apparatus comprising:
   a desalination fractionation installation having a hydrate formation region disposed at a lower portion thereof and a hydrate dissociation region disposed at an upper portion thereof;
   a mixing chamber;
   an input water conduit which is arranged to provide input water to said mixing chamber and to said hydrate formation region; and
   a gas supply conduit which is arranged to provide hydrate-forming gas to said mixing chamber and to said hydrate formation region;
   wherein hydrate-forming gas is dissolved into at least a portion of the input water in said mixing chamber prior to being input into said hydrate formation region.

2. The apparatus as set forth in claim 1, wherein said input water conduit which is arranged to provide input water to said mixing chamber and to said hydrate formation region constitutes a first input water conduit arranged to provide input water to said mixing chamber and a second input water conduit arranged to provide input water to said hydrate formation region.

3. The apparatus as set forth in claim 1, wherein said gas supply conduit which is arranged to provide hydrate-forming gas to said mixing chamber and to said hydrate formation region constitutes a first gas supply conduit arranged to provide hydrate-forming gas to said mixing chamber and a second gas supply conduit arranged to provide hydrate-forming gas to said hydrate formation region.

* * * * *